(12) United States Patent
Wiener et al.

(10) Patent No.: US 10,572,903 B2
(45) Date of Patent: Feb. 25, 2020

(54) EXTENDING AUDIENCE REACH IN MESSAGING CAMPAIGNS USING PROBABILISTIC ID LINKING

(71) Applicant: ORACLE INTERNATIONAL CORPORATION, Redwood Shores, CA (US)

(72) Inventors: David Abraham Wiener, Redwood City, CA (US); James Kong Hsu, Redwood City, CA (US); Stephen J. Papa, San Jose, CA (US); Sherene Wael Hilal, Bellevue, WA (US); Kendra Mariko Chen, San Jose, CA (US); Vernon W. Hui, Bellevue, WA (US); Ben Hekster, Mountain View, CA (US); John Patrick Connelly, Santa Cruz, CA (US)

(73) Assignee: Oracle International Corporation, Redwood Shores, CA (US)

(*) Notice: Subject to any disclaimer, the term of this patent is extended or adjusted under 35 U.S.C. 154(b) by 960 days.

(21) Appl. No.: 14/995,755

(22) Filed: Jan. 14, 2016

(65) Prior Publication Data
US 2016/0132938 A1 May 12, 2016

Related U.S. Application Data

(63) Continuation-in-part of application No. 14/831,565, filed on Aug. 20, 2015.
(Continued)

(51) Int. Cl.
*G06Q 30/02* (2012.01)

(52) U.S. Cl.
CPC .............. *G06Q 30/0269* (2013.01)

(58) Field of Classification Search
None
See application file for complete search history.

(56) References Cited

U.S. PATENT DOCUMENTS 7,376,714 B1  5/2008 Gerken
2009/0327449 A1* 12/2009 Silverman ......... H04M 1/72527
                                              709/217
(Continued)

OTHER PUBLICATIONS

Sinitsyn et al. A Synchronization Framework for Personal Mobile Servers, Proceedings of the Second IEEE Annual Conference on Pervasive Computing and Communications Workshop, Jan. 2004. (Year: 2004).*
(Continued)

*Primary Examiner* — William A Brandenburg
*Assistant Examiner* — Christopher C Busch
(74) *Attorney, Agent, or Firm* — Kilpatrick Townsend & Stockton LLP

(57) ABSTRACT

A server receives incoming data records comprising an ID value and respective user attributes corresponding to a user activity that originates at a user device. Characteristics of the activity and/or characteristics of the user device are considered in order to assign a probabilistic confidence value, which is in turn used to generate links from an incoming data record to other previously-received data records, and in so doing, generates a probabilistic link between one set of user attributes from the incoming data record and another set of user attributes from previously-received data records. A messaging campaign specification that describes target user attributes is used to identify a matching set of target audience member records. The determination of a match or not is based on the probabilistic confidence value and a threshold can be varied to extend audience reach. The identified set of target audience member records are transmitted over a network.

20 Claims, 32 Drawing Sheets

Related U.S. Application Data

(60) Provisional application No. 62/103,663, filed on Jan. 15, 2015, provisional application No. 62/040,197, filed on Aug. 21, 2014.

(56) References Cited

U.S. PATENT DOCUMENTS

| | | |
|---|---|---|
| 2010/0146398 A1 | 6/2010 | Evans et al. |
| 2012/0226700 A1 | 9/2012 | Chang et al. |
| 2013/0013500 A1 | 1/2013 | Purves et al. |
| 2013/0065584 A1 | 3/2013 | Lyon et al. |
| 2013/0110583 A1 | 5/2013 | Ormont et al. |
| 2013/0275228 A1 | 10/2013 | Milazzo |
| 2013/0281084 A1 | 10/2013 | Batada et al. |
| 2013/0339185 A1 | 12/2013 | Johnson |
| 2014/0136312 A1 | 5/2014 | Saksena et al. |
| 2014/0136346 A1 | 5/2014 | Teso |
| 2014/0330651 A1 | 11/2014 | Klemm et al. |
| 2016/0027055 A1* | 1/2016 | Dixon ............... G06Q 30/0261 705/14.58 |
| 2016/0055527 A1 | 2/2016 | Wiener et al. |
| 2016/0055540 A1 | 2/2016 | Chan et al. |
| 2016/0055542 A1 | 2/2016 | Hui et al. |
| 2016/0055546 A1 | 2/2016 | Chan et al. |
| 2016/0125467 A1 | 5/2016 | Scott et al. |
| 2016/0125471 A1 | 5/2016 | Hsu et al. |
| 2018/0067937 A1 | 3/2018 | Bauman |

OTHER PUBLICATIONS

U.S. Appl. No. 14/831,565, First Action Interview Pilot Program Pre-Interview Communication dated May 31, 2018, 4 pages.

International Search Report and Written Opinion dated Jan. 14, 2016 for related PCT Patent Application No. PCT/US2015/058165, 11 pages.

Google Maps, "The blue circle comes to your desktop", Jul. 9, 2009, 4 pages.

Google Maps Help, "See your location on Maps", 2015, 3 pages.

U.S. Appl. No. 14/831,565, First Action Interview Office Action Summary dated Jul. 12, 2018, 6 pages.

U.S. Appl. No. 14/831,595, First Action Interview Office Action Summary dated Jul. 12, 2018, 6 pages.

U.S. Appl. No. 14/831,595, First Action Interview Pilot Program Pre-Interview Communication dated Jun. 12, 2018, 4 pages.

Sinitsyn; Alexander, "A Synchronization Framework for Personal Mobile Servers", Proceedings of the Second IEEE Annual Conference on Pervasive Computing and Communications Workshop, The Computer Society, Mar. 14-17, 2004, 5 pages.

U.S. Appl. No. 14/734,473, Notice of Allowance dated Jun. 12, 2019, 10 pages.

U.S. Appl. No. 14/831,595, Final Office Action dated Mar. 6, 2019, 15 pages.

U.S. Appl. No. 14/734,473, Final Office Action dated Aug. 9, 2018, 15 pages.

U.S. Appl. No. 14/734,473, Non-Final Office Action dated Oct. 6, 2017, 10 pages.

* cited by examiner

FIG. 3D

| Class | Tier | ID Tier Description | Probabilistic or Deterministic | Identity Scope | Trusted or Untrusted | Initiate Merge | # of IDs that can link to a single profile | Example IDs |
|---|---|---|---|---|---|---|---|---|
| 0 | 0 | Person ID | Deterministic | Person | Trusted | Y | Single | Hashed SSN |
| 1 | A | ID generated by email | Deterministic | Person | Trusted | Y | Multiple | Hashed email |
| 1 | B | Verified Partner Generated 1st Party IDs - User Scope (Authenticated) | Deterministic | Person | Trusted | Y | Multiple | Any 1P ID so long as it is scoped to an authenticated user, not just a single device/browser |
| 2 | C | Carrier ID | Deterministic | Device | Untrusted | Y | Multiple | Carrier-provided ID |
| 2 | D | Mobile Advertising Device Generated ID | Deterministic | Device | Untrusted | Y | Multiple | Mobile platform ID |
| 2 | E | Generated 1st Party ID (Partner domain cookie) | Deterministic | Browser/App | Trusted | Y | Multiple | First-party cookie |
| 2 | F | 3rd Party ID | Deterministic | Browser/App | Trusted | Y | Multiple | Third-party cookie |
| 3 | G | Verified Partner Generated 1st Party IDs - Device/Browser Scope | Deterministic | Device, Browser/App | Trusted | Y | Multiple | First-party cookie |
| 4 | H | Unverified Partner Generated ID | Deterministic | Any (Person, Device, Browser/App) | Untrusted | N | Multiple | Partner-provided ID |
| 5 | I | Statistical ID | Probabilistic | Device | Trusted | N | Multiple | Statistical ID |
| 5 | J | Partner Statistical ID | Probabilistic | Any (Person, Device, Browser/App) | Untrusted | N | Multiple | Partner name |

Origin Indication 342
Characteristics of the Origin 343
Nature of Data Record 344
Characteristics 346

Higher Accuracy Tiers / Lower Accuracy Tiers
Higher Probabilistic Values / Lower Probabilistic Tiers

3D00

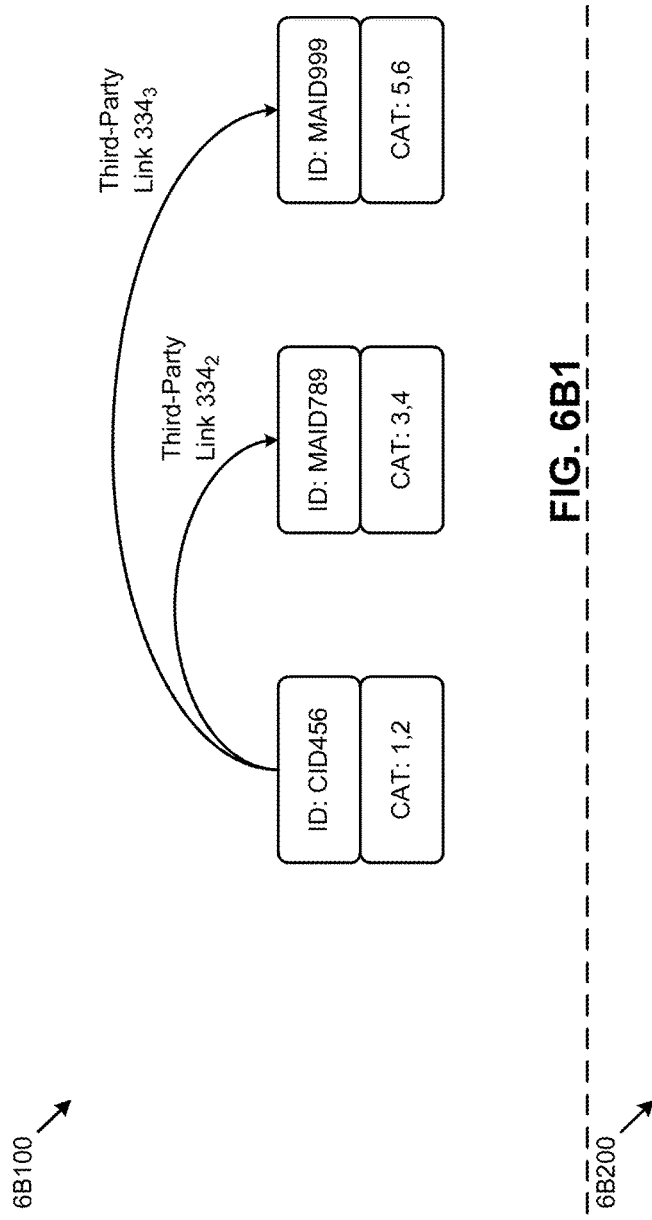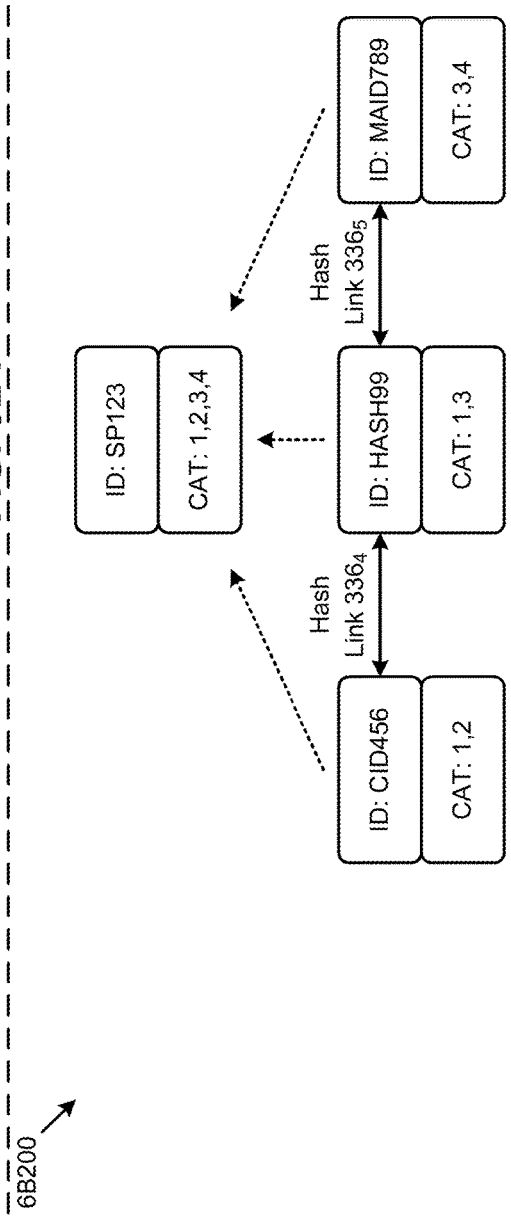
FIG. 6B1
FIG. 6B2

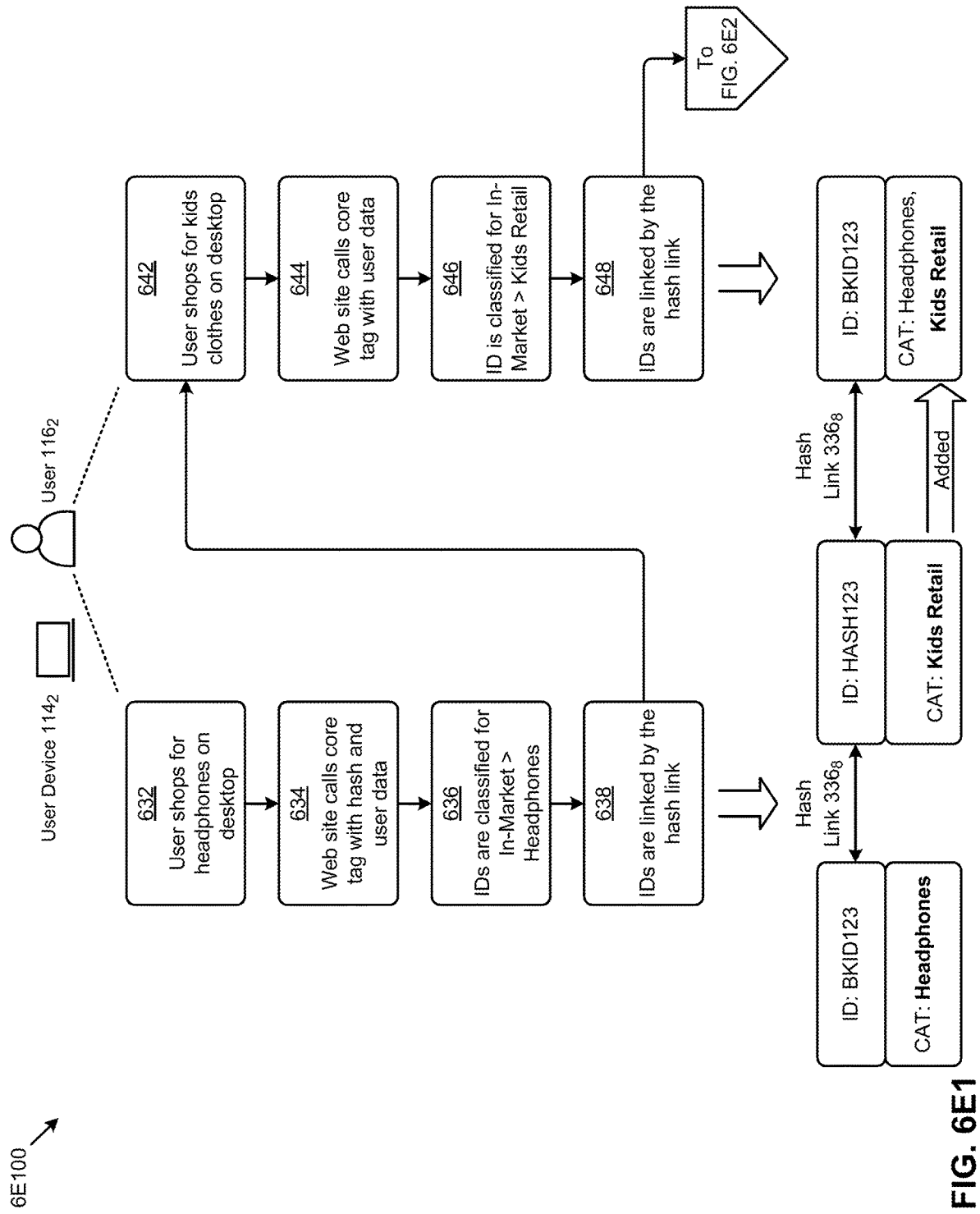
FIG. 6E1

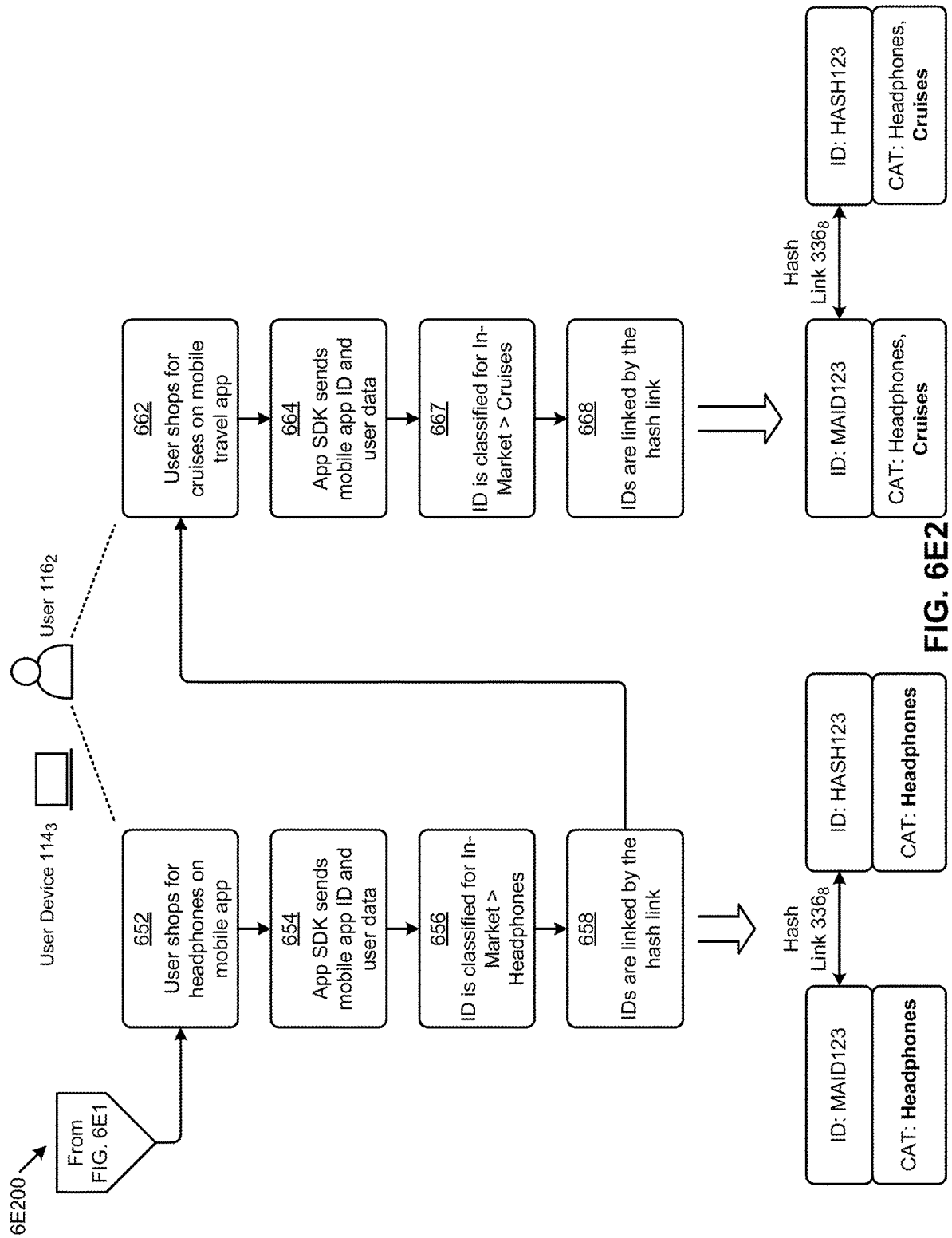
FIG. 6E2

EXTENDING AUDIENCE REACH IN MESSAGING CAMPAIGNS USING PROBABILISTIC ID LINKING

RELATED APPLICATIONS

The present application claims the benefit of priority to U.S. Provisional Patent Application Ser. No. 62/103,663, titled "METHOD AND SYSTEM FOR INGESTING AND ASSOCIATING DISPARATE ONLINE USER DATA", filed on Jan. 15, 2015. The present application is a Continuation-in-Part of co-pending U.S. patent application Ser. No. 14/831,565, titled "EXTENDING AUDIENCE REACH IN MESSAGING CAMPAIGNS USING PROBABILISTIC ID LINKING", filed on Aug. 20, 2015, which claims the benefit of priority to U.S. Provisional Patent Application Ser. No. 62/040,197, filed on Aug. 21, 2014, titled "A MULTI-TIER REGIME FOR CREATING AND MANAGING ONLINE USER PROFILES". The present application is also related to co-pending U.S. patent application Ser. No. 14/831,595, titled "EXPENDING AUDIENCE REACH IN MESSAGING CAMPAIGNS USING SUPER PROFILES", filed on Aug. 20, 2015. All of these applications are hereby incorporated by reference in their entirety

FIELD

This disclosure relates to the field of Internet-enabled messaging campaigns, and more particularly to techniques for extending audience reach in messaging campaigns by linking user attribute records.

BACKGROUND

Messaging campaigns in today's "always on, always connected" world are ubiquitous. To support such campaigns, marketers and advertisers demand fast and reliable access to a vast and diverse array of anonymous user data captured from multiple channels, devices and touchpoints. Specifically, for example, with the proliferation of mobile devices (e.g., smartphones, tablets, etc.), the average person now owns multiple devices (e.g., averaging upwards of three in the US, according to some surveys) and is using these devices at different times of the day for various mobile activities (e.g., work, email, web browsing, online shopping, watching TV, watching movies, etc.). These same device users can also have one or more devices at home (e.g., laptop computer, desktop computer, internet TV, etc.) that they further use for additional online activities. Various techniques have been developed to record the user activity (e.g., search terms, clicks, device IDs, etc.) in the mobile and online environments. In addition, users can perform various offline activities that can be recorded using more traditional means (e.g., customer relationship management or CRM systems, point of sale or POS systems, etc.).

To improve the effectiveness (e.g., reach, conversion rate, optimized media spend, etc.) of messaging campaigns (e.g., online advertising campaigns, etc.), advertisers attempt to gain exposure to each potential customer in as many settings as possible. For example, advertisers may be able to reach a customer based on a stored cookie regardless of whether the user is using Internet Explorer or FireFox. Privacy laws or privacy expectations may prevent advertisers from getting too much information about each user beyond each advertiser's direct interactions with the user. Techniques are needed to reach larger target audiences in a messaging campaign, regardless of the particular device that an audience member might be using, regardless of the source of information (possibly from different potential advertisers) that would make a particular audience member a good target for the marketing message, and without violating the privacy laws or privacy expectations of any individuals.

Legacy approaches to identifying a user from data received from multiple sources or settings (e.g., home and office settings) have limitations. What is needed is a technique or techniques to more broadly identify users who might benefit from the messaging of a marketing campaign.

BRIEF DESCRIPTION OF THE DRAWINGS

The drawings described below are for illustration purposes only. The drawings are not intended to limit the scope of the present disclosure.

FIG. 3D is a hierarchy chart depicting an ID tiering rule regime to be used by graph processors in systems for extending audience reach in messaging campaigns by linking user attribute records, according to an embodiment.

FIG. 6B1 illustrates an ID transfer technique as implemented in systems for extending audience reach in messaging campaigns by linking user attribute records, according to an embodiment.

FIG. 6B2 illustrates an ID amalgamation technique as implemented in systems for extending audience reach in messaging campaigns by linking user attribute records, according to an embodiment.

FIG. 6E1 is a flow diagram showing online desktop ingestion and storage examples as used in systems for extending audience reach in messaging campaigns by linking user attribute records, according to an embodiment.

FIG. 6E2 is a flow diagram showing mobile application ingestion and storage examples as used in systems for extending audience reach in messaging campaigns by linking user attribute records, according to an embodiment.

DETAILED DESCRIPTION

Figure 1A:
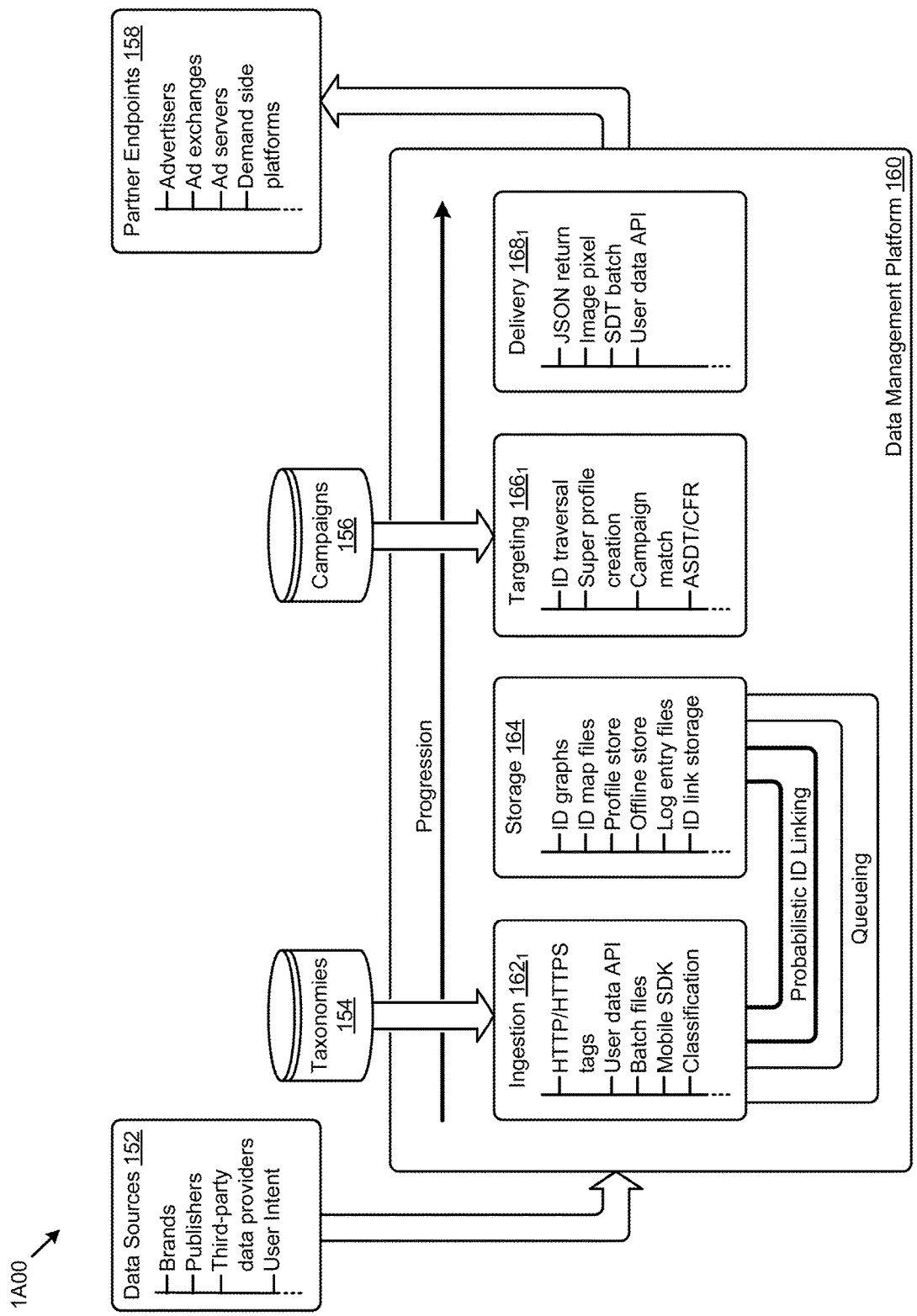
FIG. 1A presents an end-to-end flow of a system for extending audience reach in messaging campaigns by linking user attribute records, according to an embodiment.

Some embodiments of the present disclosure address the problem of identifying a user from data received from multiple channels, devices and touchpoints, and activating the user for a given messaging campaign, and some embodiments are directed to approaches for (1) providing a tiered accuracy regime for selecting links between unique identifiers to collectively represent a single view of a user and (2) for combining multiple user profiles in a super profile and activating the super profile for targeting and delivery against messaging and delivery campaigns. More particularly, disclosed herein and in the accompanying figures are exemplary environments, systems, methods, and computer program products for extending audience reach in messaging campaigns by linking user attribute records.

Overview

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents an end-to-end flow 1A00 of a system for extending audience reach in messaging campaigns by linking user attribute records. As an option, one or more variations of end-to-end flow 1A00 or any aspect thereof may be implemented in the context of the architecture and functionality of the embodiments described herein. Also, the end-to-end flow 1A00 or any aspect thereof may be implemented in any environment.

FIG. 1A is one embodiment a data management platform 160 connecting certain data sources 152 (e.g., brands, publishers, third-party data providers, etc.) and certain semantics (e.g., user intent) with certain partner endpoints 158 (e.g., advertisers, ad exchanges, ad servers, demand side platforms or DSPs, etc.) for activation of various messaging campaigns. For example, an advertiser can use the data management platform 160 to access aggregated data from multiple instances of the data sources 152 to activate a campaign on various channels (e.g., display, social, mobile, etc.). Specifically, the data management platform 160 can receive certain taxonomies 154 (e.g., for classification of user interests) and certain campaigns 156 (e.g., defining a target audience) from an advertiser (or other partner endpoint) to identify and deliver an audience of users that accurately matches the campaigns. As shown, according to some embodiments, the end-to-end flow 1A00 from the data source 152 to the partner endpoints 158 comprises four components: ingestion $162_1$, storage 164, targeting $166_1$, and delivery $168_1$. In ingestion $162_1$, the data management platform 160 collects and classifies user data received from various data sources. For example, user data can be received from various sources in the online, mobile, and offline environments.

Specifically, ingestion $162_1$ entails extracting user attributes from the received data and mapping the attributes to categories (e.g., user interests) defined by classification rules included in one or more instances of taxonomies 154. As shown, the user data can be received using various electronic communication protocols and structures such as HTTP or HTTPS tags, user data API commands, batch files, mobile SDK commands, etc.

In storage 164, the attributes ingested and classified can be further processed and stored in various storage facilities. For example, as shown, the attributes can be assigned to certain identifiers or IDs, and such IDs can be associated in ID graphs. Further, storage 164 might store ID map files, an ID queue, a profile store (e.g., online real-time data store with category data), offline data storage, and other data used by the data management platform 160.

Further details regarding general approaches to ingestion are below in conjunction with the descriptions of FIGS. 9-12.

The targeting $166_1$ component can use the information stored in storage 164 to perform ID linking and super profile creation so as to enable the matching of users to the target audiences define in campaigns 156. Asynchronous targeting techniques (e.g., asynchronous server data transfer or ASDT, continuous fast ramp or CFR, etc.) can further be implemented by targeting $166_1$. The delivery $168_1$ component transfers the results of targeting $166_1$ to the partner endpoints 158. The partner endpoints 158 can use the results (e.g., list of target audience members) to target, model, and/or optimize messaging to users on a website, display, mobile app, social channel, search channel, and/or other media execution platforms. The target audience members can be codified as target audience member values that are, or are derived from an ID, or GUID, or a representation of the ID or GUID, and can include additional information in a data structure or packet comprising timestamps, origin information, category descriptions, etc.). A system for implementing the data management platform 160, according to one or more embodiments, is shown in FIG. 1B.

Figure 1B:
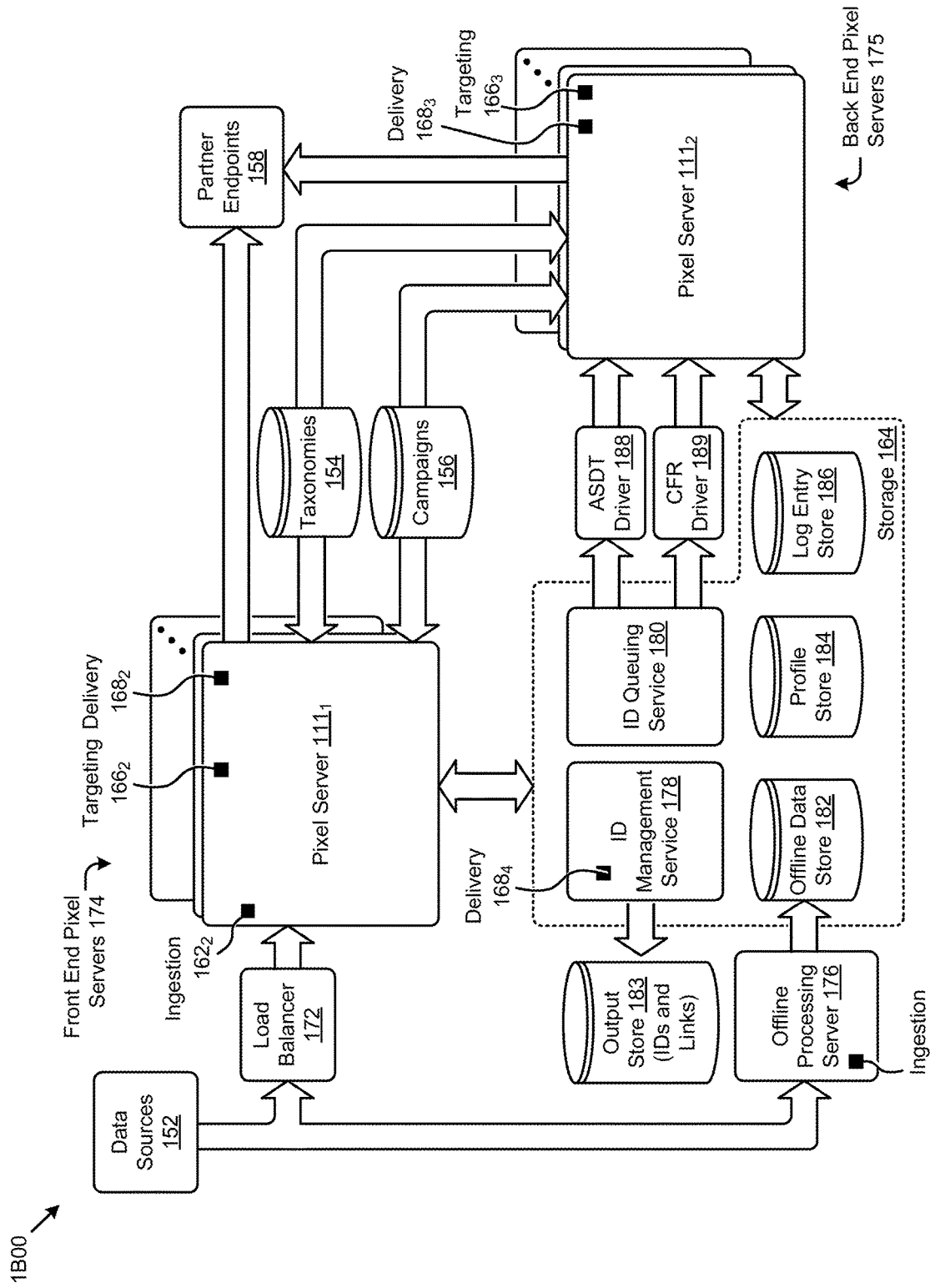
FIG. 1B is a block diagram showing a data flow of a system for extending audience reach in messaging campaigns by linking user attribute records, according to an embodiment.

FIG. 1B is a block diagram showing a data flow 1B00 of a system for extending audience reach in messaging campaigns by linking user attribute records. As an option, one or more variations of data flow 1B00 or any aspect thereof may be implemented in the context of the architecture and functionality of the embodiments described herein. Also, the data flow 1B00 or any aspect thereof may be implemented in any environment.

The embodiment shown in FIG. 1B is merely one example of an implementation of the data management platform 160 shown in FIG. 1A. Specifically, the data flow 1B00 shows online ingestion (e.g., ingestion $162_2$) can be implemented using a load balancer 172 coupled to a plurality of front end pixel servers 174 (e.g., pixel server $111_1$). The load balancer 172 redirects the large volume of incoming user data to the front end pixel servers 174 (e.g., more than 300 servers). The data flow 1B00 further shows offline ingestion (e.g., ingestion $162_3$) can be implemented using an offline processing server 176 coupled to an offline data store 182 in the storage 164. For example, a third-party data provider might upload offline data files comprising ID mappings, user profile data, and other offline data. As earlier described, the ingestion process further comprises classification of user data, and other operations, which can be implemented in the pixel server $111_1$.

The data resulting from the ingestion process can be stored in various storage facilities in storage 164 such as an ID management service 178, an ID queuing service 180, an offline data store 182, a profile store 184, and a log entry store 186. The information stored in storage 164 can be used by the front end pixel servers 174 for targeting (e.g., targeting $166_2$) and delivery (e.g., delivery $168_2$) to the partner endpoints 158. In some cases, such targeting and delivery of users activated for certain taxonomies 154 and campaigns 156 by the front end pixel servers 174 can be used to implement real-time responses to user activity (e.g., serving a banner ad to a web page the user is browsing). As shown, the information stored in storage 164 can also be used by back end pixel servers 175 for targeting (e.g., targeting $166_3$) and delivery (e.g., delivery $168_3$) to the partner endpoints 158. Or, the information stored in storage 164 can be used by the ID management service 178 for targeting and delivery (e.g., delivery $168_4$) to the partner endpoints 158. In one embodiment, the back end pixel servers 175 (e.g., pixel server $111_2$) can receive user data from an asynchronous server data transfer or ASDT driver 188 and/or a continuous fast ramp or CFR driver 189 to asynchronously target and deliver users activated for certain campaigns 156 to the partner endpoints 158. One embodiment of a protocol among a portion of the components described in FIG. 1B is discussed as pertains to FIG. 1C. In another embodiment, the ID management service 178 includes an output processor that can output IDs and links (e.g., links formed by ID linking) to a memory or cache and/or to an output store 183 for later delivery to partner endpoints 158

Figure 1C:
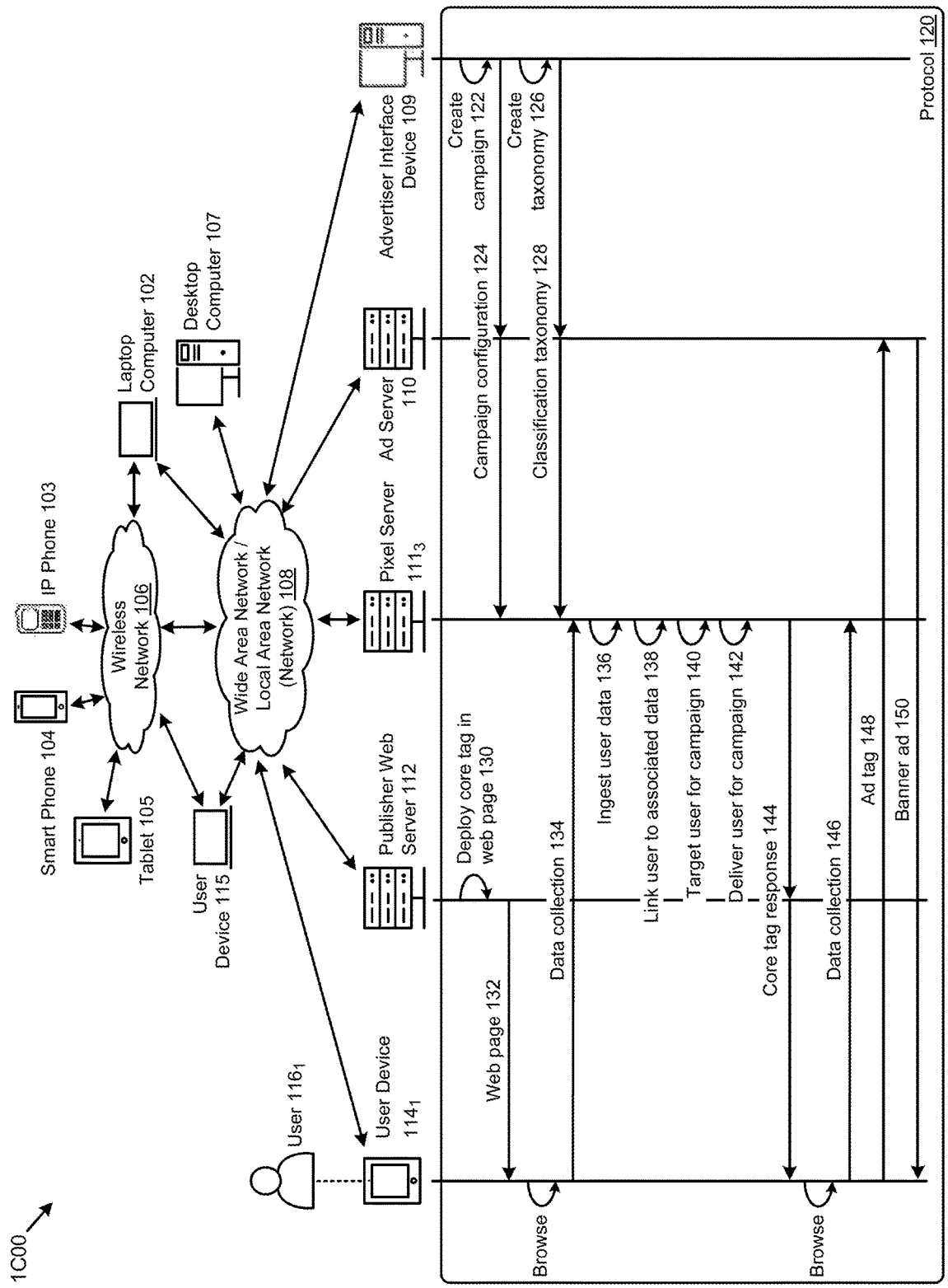
FIG. 1C depicts an environment in which systems for extending audience reach in messaging campaigns can operate, according to an embodiment.

FIG. 1C depicts an environment 1C00 in which systems for extending audience reach in messaging campaigns can operate. As an option, one or more variations of environment 1 C00 or any aspect thereof may be implemented in the context of the architecture and functionality of the embodiments described herein. Also, the environment 1C00 or any aspect thereof may be implemented in any environment.

As shown in FIG. 1C, environment 1C00 comprises an instance of pixel server $111_3$, an instance of a publisher web server 112, an instance of an ad server 110, an instance of an advertiser interface device 109, and an instance of a plurality of user devices (e.g., user device $114_1$). A variety of other devices (e.g., a desktop computer 107, a laptop computer 102, an IP phone 103, a smart phone 104, a tablet 105, etc.) or any other sort of user device 115 (e.g., a set-top box (STB)) that can communicate using a protocol over a network can comprise the plurality of user devices. The aforementioned servers and devices can communicate through a wireless network 106 and a network 108 (e.g., a wide area network (WAN), a local area network (LAN), etc.).

A protocol 120 depicts operations and communications (e.g., messages) on and among the user device $114_1$, the pixel server $111_3$, the publisher web server 112, the ad server 110, and the advertiser interface device 109. In the example shown in protocol 120, a user $116_1$ operates the user device $114_1$. Specifically, the protocol 120 can represent operations and communications that can occur when implementing systems for extending audience reach in messaging campaigns by linking user attribute records. For example, referring to FIG. 1A and FIG. 1B, the pixel server $111_3$ might represent an instance of the front end pixel servers 174 in the data management platform 160 operated by a data management provider. Further, the publisher web server 112 might be associated with a publisher (e.g., see data sources 152), and the advertiser interface device 109 and the ad server 110 might be associated with an advertiser and an ad serving partner (e.g., see partner endpoints 158).

Specifically, the servers and devices in environment 1C00 are designed and configured to enable the advertiser to create a messaging campaign using the advertiser interface device 109 (see operation 122). The resulting campaign configuration can then be forwarded to the ad server 110, and the pixel server $111_3$ (see message 124). Further, the advertiser can create a user attribute classification taxonomy (see operation 126) and also forward to the ad server 110 and pixel server $111_3$ (see message 128). The publisher can also deploy a core tag from the data management provider in the publisher's web page (see operation 130) and serve the web page to user device $114_1$ (see message 132). When the user $116_1$ browses the web page on the user device $114_1$, the core tag in the web page fires and sends (e.g., using an HTTP tag call) the user data to the pixel server $111_3$ to be collected (see message 134). The pixel server $111_1$ can then ingest the user data (see operation 136) and link the user to associated data (see operation 138). For example, the ingested user data might be determined to be associated with an existing user profile, and then linked to that profile. The pixel server $111_3$ can then respond to the ingested user data by targeting the ingested user data (see operation 140) and linking user attributes for any currently active campaigns. If the user matches one or more campaigns, the user can be delivered for such campaigns (see operation 142). In some cases, delivery can comprise delivery of the user data (e.g., universally unique identifier or UUID, user categories, etc.) to a data consumer (e.g., data buyer). In other cases, as shown, the pixel server $111_3$ can respond by sending a core tag response to the user device $114_1$ (see message 144). For example, the core tag response might include content to be included in the web page to track further activity of the user $116_1$, and/or alert data partners, and/or display visual data (e.g., banner ad) to the user $116_1$. In the case shown, when the user $116_1$ continues to browse the web page, further user data is sent to the pixel server $111_1$ (see data collection message 146). A log file entry and an ad tag is sent to the ad server 110 (see message 148). The ad server 110 can then respond to the ad tag by issuing a creative asset (e.g., banner ad) for display on the user device $114_1$ (see message 150).

Figure 1D:
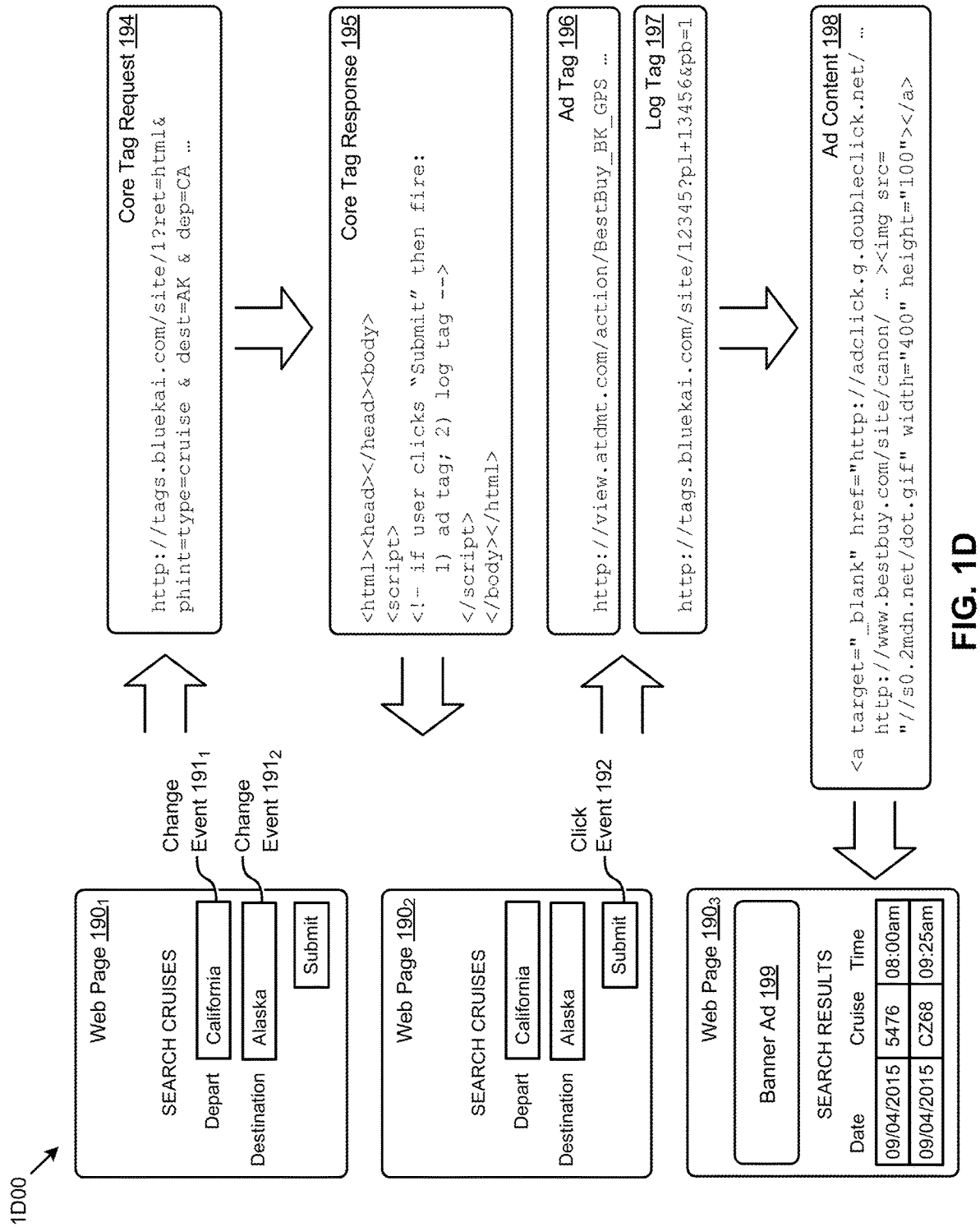
FIG. 1D presents a selection of messaging campaign operations to illustrate interactions as used in systems for extending audience reach in messaging campaigns can operate, according to an embodiment.

FIG. 1D presents a selection of messaging campaign operations 1D00 to illustrate interactions as used in systems for extending audience reach in messaging campaigns can operate. As an option, one or more variations of messaging campaign operations 1D00 or any aspect thereof may be implemented in the context of the architecture and functionality of the embodiments described herein. Also, the messaging campaign operations 1D00 or any aspect thereof may be implemented in any environment.

The messaging campaign operations 1D00 shown in FIG. 1D illustrate the interaction of request and response code with one or more web pages displayed on a user device (e.g., user device $114_1$) in systems for extending audience reach in messaging campaigns. Specifically, messaging campaign operations 1D00 shows an example web page $190_1$ being displayed. For example, the web page $190_1$ can be a page from a travel website that allows a user to "Search Cruises". As shown, the user has entered a departure port of "California" and a destination port of "Alaska". As an example, the HTML, code of web page $190_1$ can comprise a core tag (e.g., from a data management provider) such that the entering of the text "California" and "Alaska" triggers a change event $191_1$ and a change event $191_2$, respectively, initiating a core tag request 194.

As described in FIG. 1D, the core tag request 194 is structured to query a server at a specific URL (e.g., "tags.bluekai.com") and include the entered information from the web page $190_1$. For example, as shown, the core tag request 194 can include a page hint (e.g., a "phint") comprising the user data structured as key-value pairs (e.g., "dest=AK", "dep=CA"). When the core tag request 194 is received and processed (e.g., ingested, classified, graphed, linked, and checked against active campaigns), and matches one or more campaign configurations, a core tag response 195 is delivered back to the browser application at the user device. In some cases, the core tag response 195 will not modify the content displayed to the user, as shown in web page $190_2$. Specifically, the core tag response 195 can include HTML, response code comprising a client-side script that will monitor user input for a click event 192 (e.g., click of a "Submit" button), and when the click event 192 occurs, will fire an ad tag 196 and a log tag 197. For example, the ad tag 196 can be sent to an ad server that might forward it to a content delivery server (e.g., at "view.atdmt.com") to select certain ad content 198 to return to the user device. The log tag 197 can be sent to a pixel server (e.g., at "tags.bluekai.com") to log the event and process the logged information. As shown, the ad content 198 can comprise code for a banner ad 199 to be displayed along with a set of cruise search results rendered on a new instance of the web page $190_3$. The following figures and discussion describe various details pertaining to the herein disclosed techniques for ingesting user data (e.g., core tag request 194), according to some embodiments.

Figure 2A:
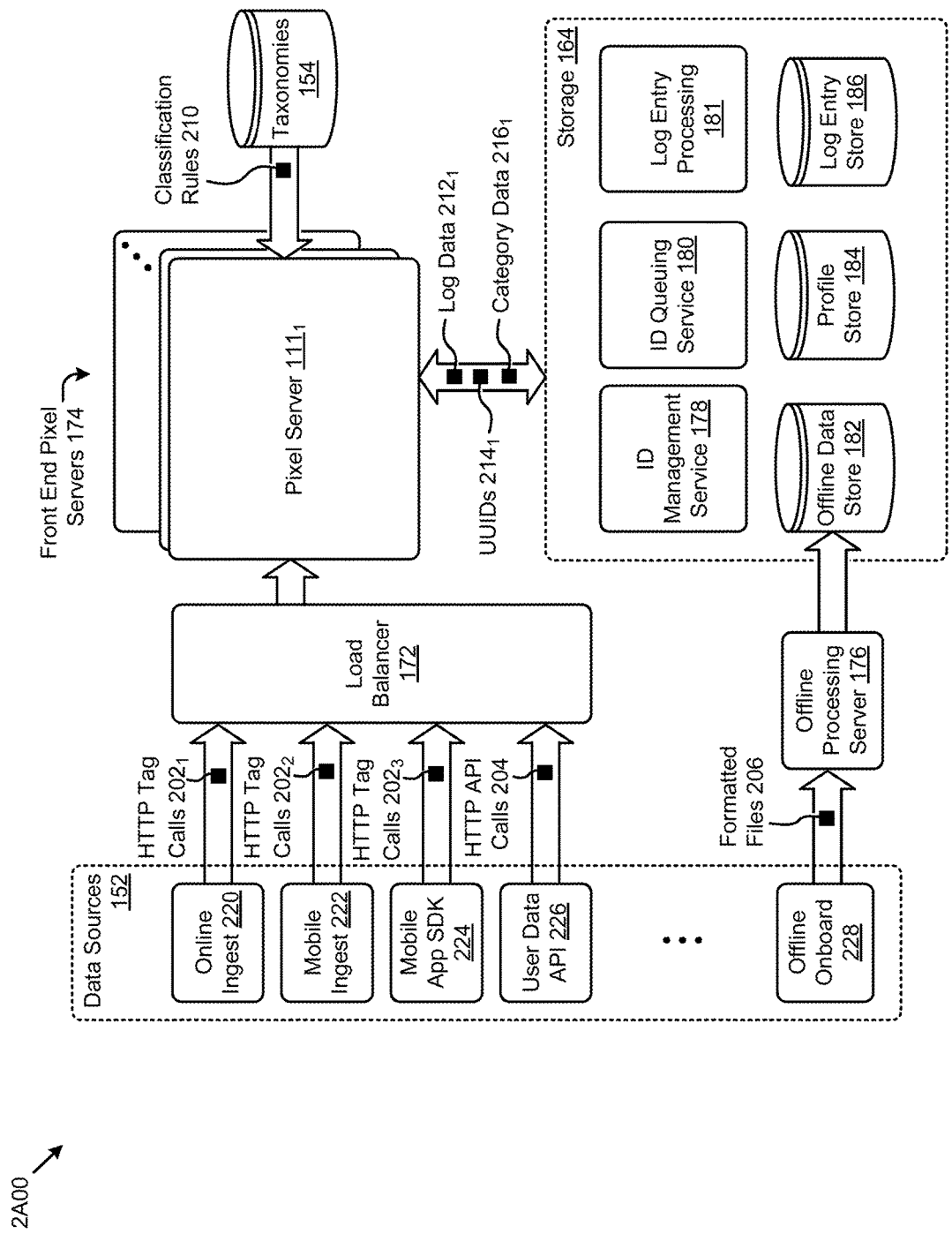
FIG. 2A depicts a data ingestion technique as implemented in systems for extending audience reach in messaging campaigns by linking user attribute records, according to an embodiment.

FIG. 2A depicts a data ingestion technique 2A00 as implemented in systems for extending audience reach in messaging campaigns by linking user attribute records. As an option, one or more variations of data ingestion technique 2A00 or any aspect thereof may be implemented in the context of the architecture and functionality of the embodiments described herein. Also, the data ingestion technique 2A00 or any aspect thereof may be implemented in any environment.

The embodiment shown in FIG. 2A depicts a portion of the system described in FIG. 1B that can be used for data ingestion. Also shown are various data communication methods (e.g., from data sources 152) for providing data to the system for ingestion. Specifically shown are an online ingest method 220, a mobile ingest method 222, a mobile app SDK method 224, a user data API method 226, and an offline onboard method 228. Other data communication methods are possible. The online ingest method and mobile ingest method can be implemented in web pages and/or websites and can comprise creating a container in the website to hold a core tag that can be configured to fire based on specified web page and/or user interaction events. Specifically, the container manages the collection and classification of user data extracted from the website. In some cases, the container can include JavaScript and HTML, code that collects explicitly defined data from the website, and then transfers that data in the form of a tag call (e.g., HTTP tag calls $202_1$ and HTTP tag calls $202_2$) to the load balancer 172 and then on to the front end pixel servers 174. By including a unique site identifier or site ID associated with the website, the front end pixel servers 174 can identify the source of the data and take corresponding actions. For example, the user attributes ingested from "site123" can be classified according to the categories and rules associated with "site123". In some cases, a given publisher might have different site IDs for a desktop site (e.g., using the online ingest method) and a mobile site (e.g., using the mobile ingest method). For mobile application deployment, the mobile app SDK method can be integrated into the application to extract mobile user attributes from the application screens (e.g., product page visits, purchase intent signals, add-to-cart actions, conversions, etc.), and transfer the attributes (e.g., as phints) to the front end pixel servers 174 (e.g., using HTTP tag calls $202_3$).

The user data API 226 can further be used to transfer user attributes to the front end pixel servers 174 using HTTP API calls 204. For example, an on-demand direct ingest method can access onboard mobile data stored in a data warehouse, a CRM database, or any other offline source, using the user data API 226. In such cases, an ID swap can be used to map the encrypted IDs in the onboarded data to the anonymous UUIDs stored in storage 164. As an example, an HTTP API call might include the source and/or destination of the user data, the data center used for ID swaps, the site ID, and the API version. As further shown in FIG. 2A, other offline data can be ingested using the offline onboard method. As for the user data API method, the offline onboard method can also require that online match keys (e.g., hashed email address) be sent to the offline processing server 176 for appropriate handling of offline IDs. In some cases, user data using the offline onboard 228 method can be onboarded using formatted files 206. For example, the formatted files 206 can comprise one or more instances of a compressed, tab separated value (e.g., TSV) file that contains the offline user attributes to onboard to the offline data store 182. Further, each row in the offline file can represent a unique user, with the match keys for the user included in separate columns. Other columns can contain a pipe-delimited list of key-value pairs describing the user attributes.

When user data is received by the front end pixel servers 174 by one or more of the aforementioned methods, the ingestion process continues with preparing the data for various forms of storage. Specifically, certain user attributes are extracted from the ingested user data to compare to certain classification rules 210. The classification rules 210 from the taxonomies 154 determine certain categories that can be associated with the user attributes. For example, in the core tag request 194 of FIG. 1D, the phint key-value pairs (e.g., type=cruise, dest=AK, and dep=CA) might be mapped according to a classification rule to a category of "In-Market>Travel>Cruises". Such categories can be transferred from the front end pixel servers 174 to the storage 164 as certain category data $216_1$. Further, the front end pixel servers 174 can transfer certain log data $212_1$ and certain UUIDs $214_1$ associated with the ingested user attributes. Further details regarding these and other data structures implemented in the herein disclosed techniques are described as follows and throughout.

Figure 2B:
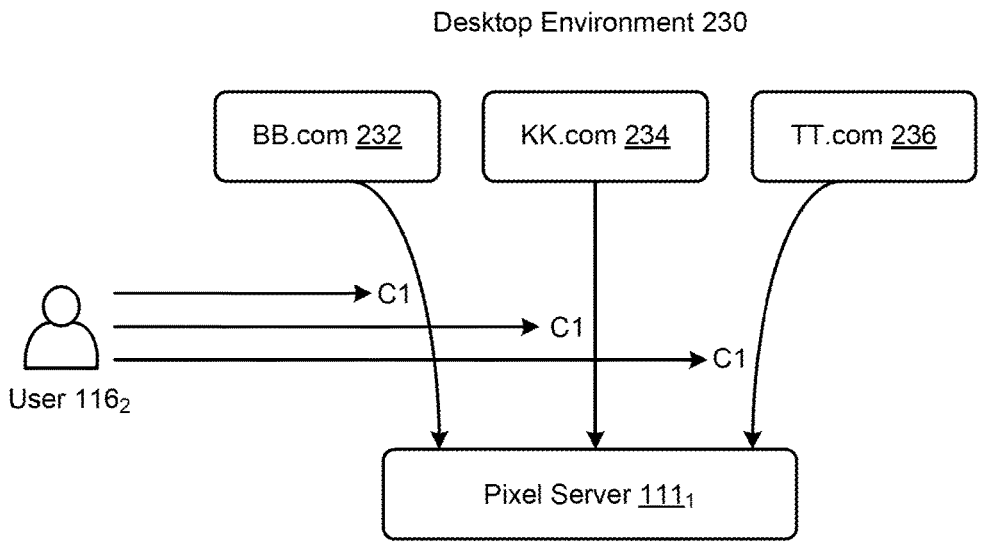
FIG. 2B is a comparison chart to compare user attribute tracking in web environments as compared to user tracking in mobile device environments, according to an embodiment.
Figure 2B:
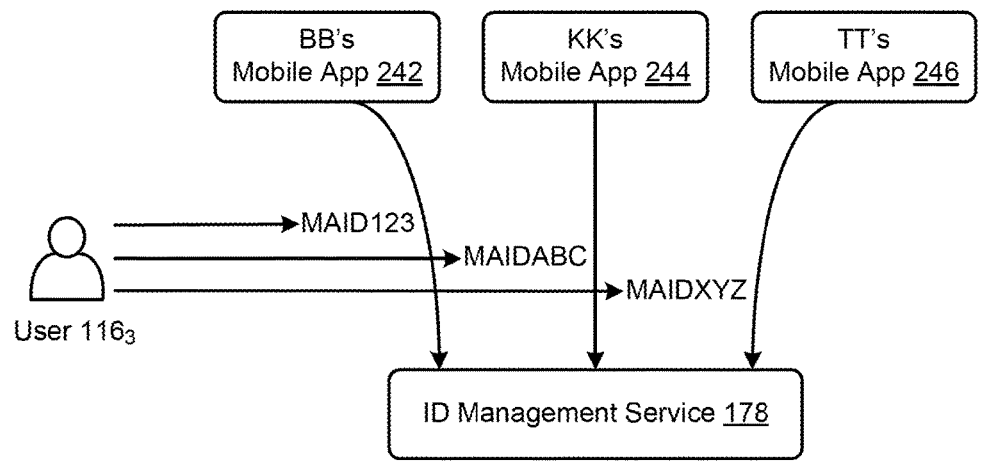

FIG. 2B is a comparison chart 2B00 to compare user attribute tracking in web environments as compared to user tracking in mobile device environments. As an option, one or more variations of comparison chart 2B00 or any aspect thereof may be implemented in the context of the architecture and functionality of the embodiments described herein. Also, the comparison chart 2B00 or any aspect thereof may be implemented in any environment.

The comparison chart 2B00 contrasts user attribute tracking in a desktop environment 230 (see top portion of FIG. 2B) as compared with user attribute tracking in a mobile environment 240. For example, user attribute tracking in a desktop environment 230 can represent the sending of data from the online ingest 220 (see FIG. 2A). Also, for example, user attribute tracking in a mobile environment 240 can represent the sending of data from the mobile app SDK 224 (see FIG. 2A). As shown in the top portion of FIG. 2B, a user $116_2$ visits a first site (e.g., BB.com 232) and a cookie C1 is saved to the device (e.g., desktop computer) used by the user $116_2$. The cookie C1 can comprise a user data record describing various attributes of the user $116_2$ (e.g., behaviors, interests, browsing history, location, devices, etc.). The user $116_2$ can later visit a second site and a third site (e.g., KK.com 234, and TT.com 236, respectively) and, in each case, the cookie C1 is accessed and possibly updated. There is a one-to-one relationship between the user $116_2$ and the cookie C1, and the pixel server $111_1$ can recognize a single user from the cookie C1 and can ingest the cookie C1 information to associate one or more categories describing the user $116_2$ with one or more user profiles.

In contrast, and as shown in the lower portion of FIG. 2B, each mobile application (e.g., website BB's mobile app 242, website KK's mobile app 244, website TT's mobile app 246, etc.) can have an associated mobile advertiser ID or MAID (e.g., MAID123, MAIDABC, and MAIDXYZ, respectively). The MAIDs, sometimes more generally referred to as device IDs (e.g., Apple's IDFA or Android ID), can comprise a device data record describing various attributes of the device used by the user $116_3$ (e.g., locations, WiFi networks, websites visited, etc., etc.). When the user $116_3$ launches and uses BB's mobile app 242, an association between the user $116_3$ and MAID123 data might be formed. Also, an association between the user $116_3$ and MAIDABC data might be formed, as well as an association between user $116_3$ and MAIDXYZ data. The ID management service 178 can receive the MAID and user data to match devices to users (e.g., cross-device matching) by creating associations between devices based on various data (e.g., login information, connection IP addresses, WiFi networks used, websites visited, etc.) and methods (e.g., assigning accuracy tiers, performing probabilistic mapping, etc.). Such associations (e.g., links) are described in more detail herein.

Other types of IDs that can be used to track user attributes include hash IDs, mobile statistical IDs, and partner private IDs. All types of IDs as disclosed and used herein can be used and exchanged without violating the privacy laws or privacy expectations of any individuals. IDs as discussed herein and as are used in the disclosed systems are embodied as unique numbers (e.g., global IDs (GUIDs) or hashes of IDs (HIDs)). Such unique numbers do not include personally-identifiable information. For example, hash IDs can be derived from non-personally identifiable information or, hash IDs can be hashed versions of commonly available personal identifiers, such as email addresses and phone numbers. The resulting unique numbers do not include personally-identifiable information. Mobile statistical IDs can be statistical IDs created in the mobile web and mobile application context. Partner private IDs can be private IDs that partners (e.g., data providers) provide to link to anonymous UUIDs used in the data management platform 160. Such partner private IDs can apply to multiple environments such as desktop and mobile. Household IDs, for addressable TV targeting, and IP addresses, to serve as a probabilistic ID, might also be used. Embodiments of the data management platform 160 can implement data exchanges to access online resources such as first-party and third-party cookies, as well as to access to mobile device IDs and to process statistical IDs. Such access and processing facilitates:

cookie-to-cookie linkage and data delivery,
cookie-to-mobile linkage and data delivery,
mobile-to-cookie linkage and data delivery,
mobile-to-mobile linkage and data delivery,
as well as forming and processing linkages involving combinations of ID nodes, regardless of any particular ID type or combination, and regardless of any type of delivery context.

Figure 2C:
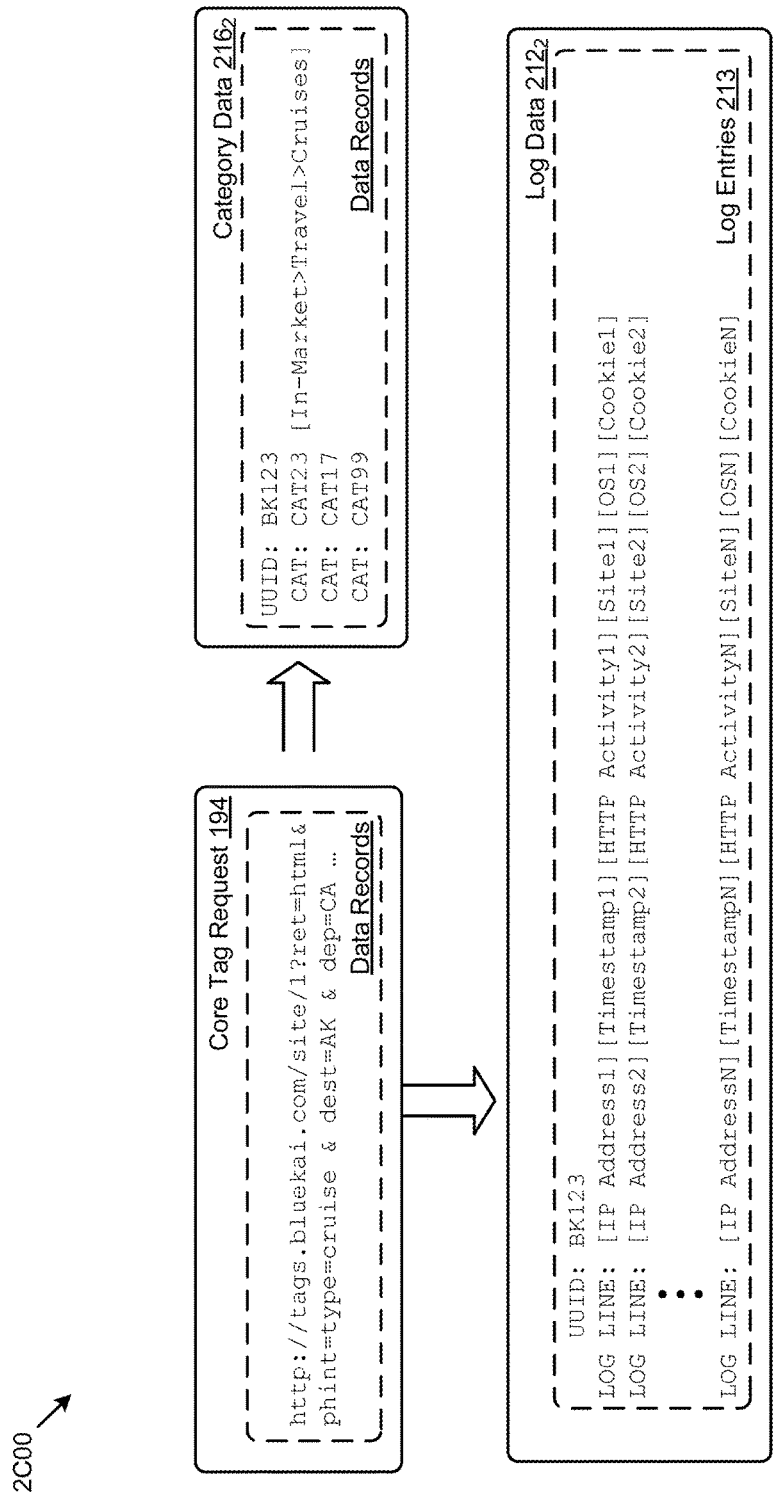
FIG. 2C is a diagram depicting a selection of data records used in systems for extending audience reach in messaging campaigns by linking user attribute records, according to some embodiments.

FIG. 2C is a diagram 2C00 depicting a selection of data records used in systems for extending audience reach in messaging campaigns by linking user attribute records. As an option, one or more variations of diagram 2C00 or any aspect thereof may be implemented in the context of the architecture and functionality of the embodiments described herein. Also, the diagram 2C00 or any aspect thereof may be implemented in any environment.

The data records shown in diagram 2C00 are an example of certain category data $216_2$ and log data $212_2$ that might be extracted from the core tag request 194 when ingested by the pixel servers $111_1$. For example, log data $212_2$ (e.g., logging instrumented data) comprises a user ID (e.g., UUID: BK123) and a plurality of log data records associated with the user. A log data record (e.g., generated from on-line browsing) comprises various signals (e.g., IP address, timestamp, site, operating system or OS, cookie reference, etc.) that can be used in tracking user activity (e.g., when online, sites visited, etc.). For example, one of the log entries 213 can correspond to receipt and ingestion of the core tag request 194. Further, category data $216_2$ comprises a user ID (e.g., UUID: BK123) and a plurality of categories (e.g., CAT: CAT23, CAT17, CAT99, etc.) associated with the user. Specifically, "CAT23" for "In-Market>Travel>Cruises" can be associated with the user attributes (e.g., phint key-value pairs) comprising the core tag request 194. One embodiment of a user interface for establishing such associations between user attributes and categories is described in FIG. 2D.

Figure 2D:
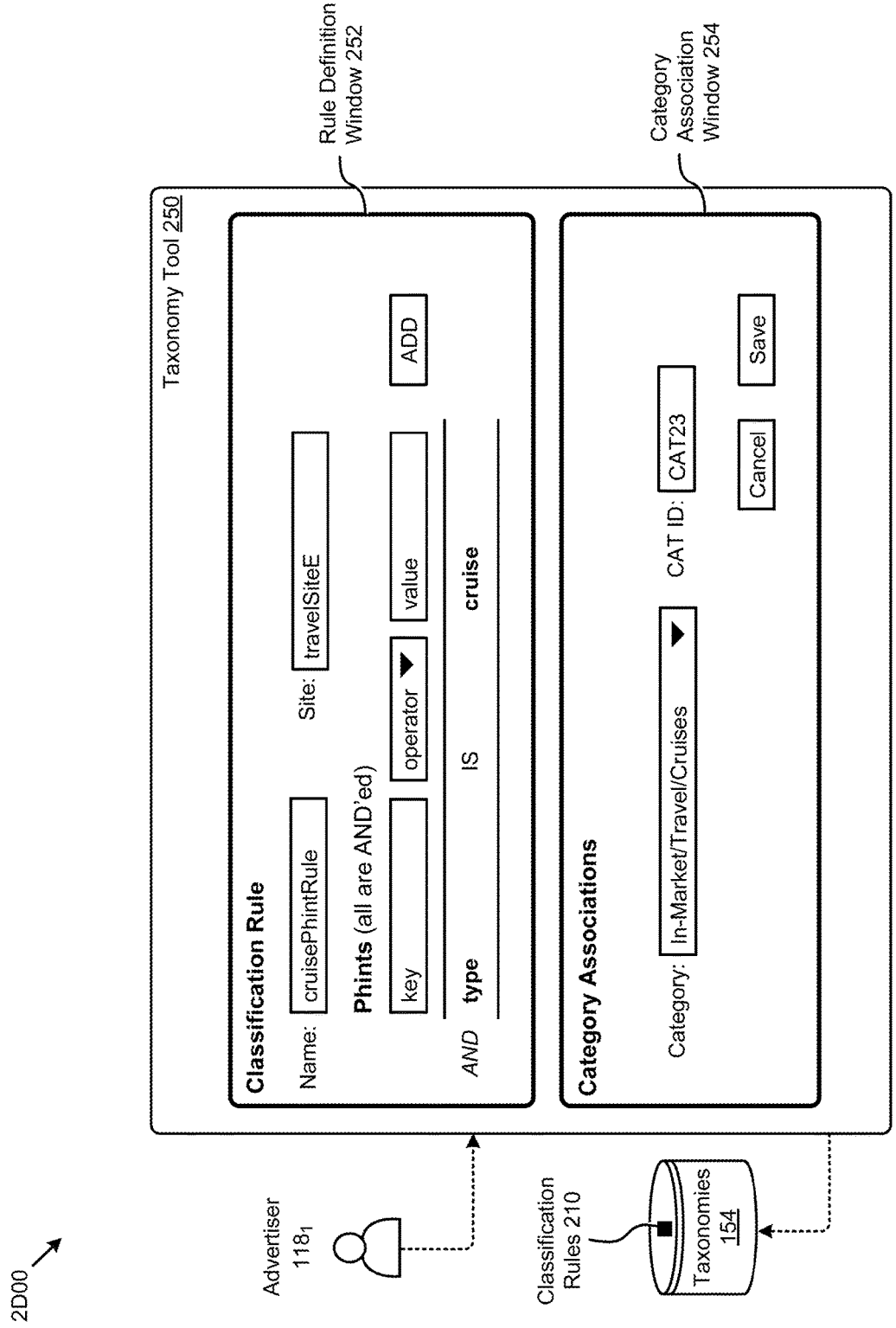
FIG. 2D presents a view of a user interface for managing a classification taxonomy in systems for extending audience reach in messaging campaigns by linking user attribute records, according to an embodiment.

FIG. 2D presents a view of a user interface 2D00 for managing a classification taxonomy in systems for extending audience reach in messaging campaigns by linking user attribute records. As an option, one or more variations of user interface 2D00 or any aspect thereof may be implemented in the context of the architecture and functionality of the embodiments described herein. Also, the user interface 2D00 or any aspect thereof may be implemented in any environment.

Specifically, the user interface 2D00 shown in FIG. 2D can be used by an advertiser $118_1$ to establish various classification rules 210 to be used (e.g., by front end pixel servers 174) for classification of ingested user attributes. In one or more embodiments, the user interface 2D00 can be included in a taxonomy tool 250 operating on one or more computing devices (e.g., advertiser interface device 109, etc.). More specifically, the user interface 2D00 can comprise a rule definition window 252 and a category association window 254. As shown, the rule definition window 252 can present various input entry elements (e.g., dropdown selections, text boxes, etc.) through which the advertiser $118_1$ can associate various classification rules with a given category. For example, the advertiser $118_1$ can specify a rule named "cruisePhintRule" for the website "travelSiteE" that triggers when the key "type" is equal to "cruise". Other operators (e.g., "contains") are possible. Other key-value relationships can be added and associated to one another by a logical "AND". In some cases, a specific URL can comprise the basis for the rule. The advertiser $118_1$ can further select a category to be mapped to the user when the rule condition is satisfied. The categories can be defined by the advertiser $118_1$ and/or selected from a provided list. As shown, the advertiser $118_1$ selected "In-Market>Travel>Cruises" (e.g., with ID=CAT23) to be associated with the rule shown in the rule definition window 252. When the advertiser $118_1$ clicks "Save", the rule will be stored in the classification rules 210 in the taxonomies 154 and used during the ingestion process to classify incoming user attributes. The taxonomies can change over time, and the classification rules can be applied and re-applied over user attributes to determine one or more categories associated with a respective user. Further, certain taxonomy permissions can be created to share specific portions of a taxonomy with a data buyer.

Figure 3A:
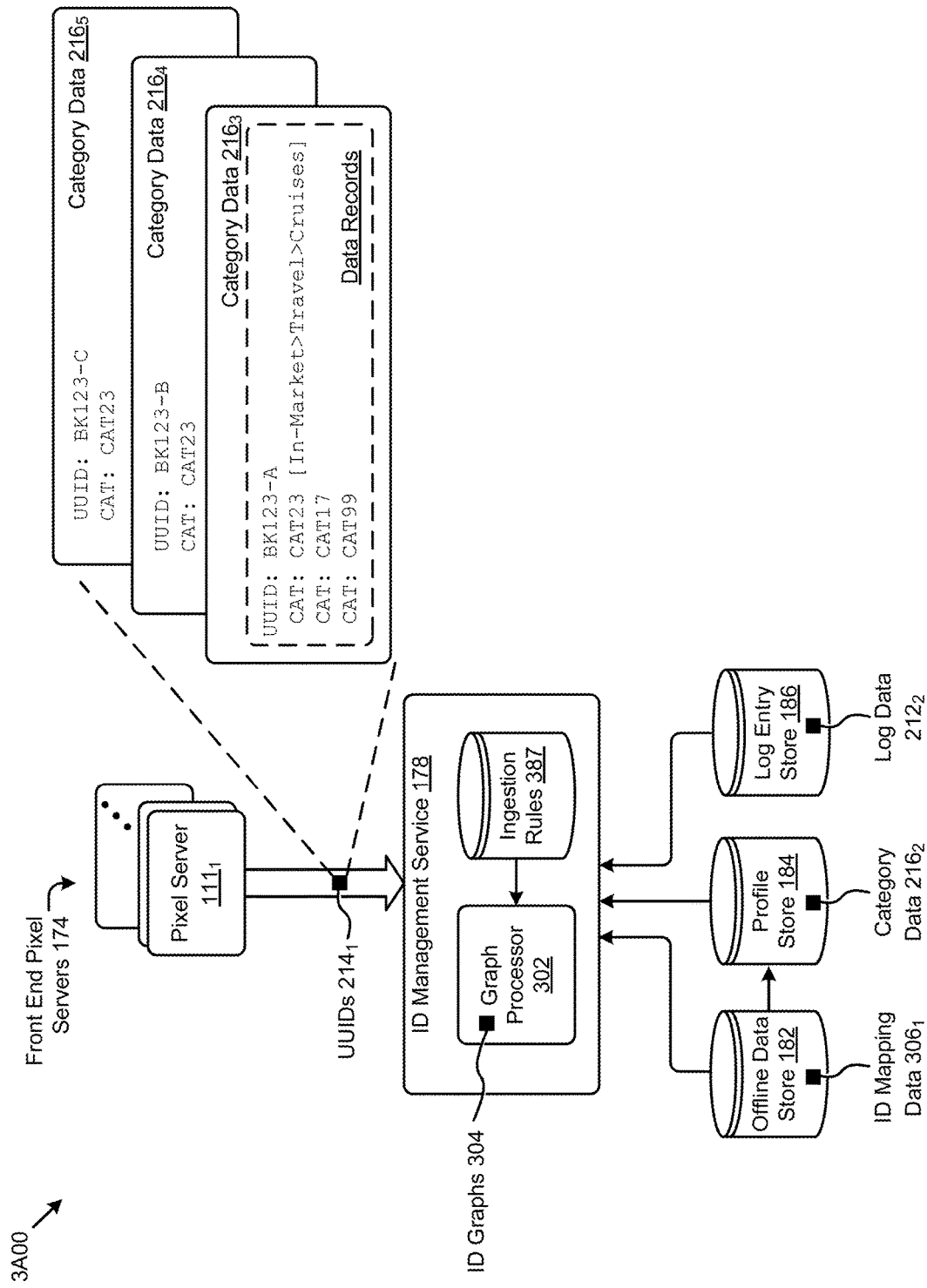
FIG. 3A depicts an ID management technique as implemented in systems for extending audience reach in messaging campaigns by linking user attribute records, according to an embodiment.

FIG. 3A depicts an ID management technique 3A00 as implemented in systems for extending audience reach in messaging campaigns by linking user attribute records. As an option, one or more variations of ID management technique 3A00 or any aspect thereof may be implemented in the context of the architecture and functionality of the embodiments described herein. Also, the ID management technique 3A00 or any aspect thereof may be implemented in any environment.

The embodiment shown in FIG. 3A depicts a portion of the system described in FIG. 1B that can be used for data storage. Also shown are various subsystem components and data structures related to the ID management technique 3A00. Specifically, the ID management service 178 is shown receiving UUIDs $214_1$ from the front end pixel servers 174 into a graph processor 302. The graph processor 302 constructs and stores certain ID graphs 304 linking together the various aforementioned IDs. The graph processor 302 generates the ID graphs 304, in part using various data stored in the offline data store 182, the profile store 184, and log entry store 186 such as ID mapping data $306_1$, category data $216_2$, and log data $212_2$, respectively. Further details pertaining to the graph processor 302 and ID graphs 304 are described below and throughout the embodiments and environments described herein. Graphs can be store in node and edge data structures (e.g., using special purpose linked lists), or graphs can be stored as relations between nodes and edges (e.g., in a relational database management system).

In some situations, multiple IDs can be received contemporaneously (e.g., UUID=BK123-A, UUID=BK123-B, UUID=BK123-C), and each one of the multiple IDs might refer to the same (or different) categories using codification of category data (e.g., category data $216_3$, category data $216_4$, category data $216_5$). As shown, the ID processor 302 can use rules (e.g., ingestion rules 387) to choose or determine which linkages to generate, and where to store the linkage and any respective data. Strictly as examples based on the incoming IDs shown in FIG. 3A, the rules could specify linkages and storage nodes as follows:

Rule1: Given (BK123-A, BK123-B, and BK123-C), apply all links and store in all nodes as depicted in (BK123-A<->BK123-B, BK123-B<->BK123-C, BK123-A<->BK123-C), where "<" means store in node to left, "-" means generate a link", and ">" means store in node to right.

Rule2: Given (BK123-A, BK123-B, and BK123-C), apply certain links and store only in some nodes as depicted in (BK123-A<->BK123-B, BK123-A<->BK123-C (but not BK123-B<->BK123-C) where "<" means store in node to left, "-" means generate a link", and ">" means store in node to right.

Rule3: Given (BK123-A, BK123-B, and BK123-C), apply certain links and store only in some nodes as depicted in (BK123-A->BK123-B, BK123-B->BK123-C, BK123-C->BK123-A), where "<" means store in node to left, "-" means generate a link", and ">" means store in node to right.

Other rules for generating linkages and for data storage can be similarly codified and fired.

Figure 3B:
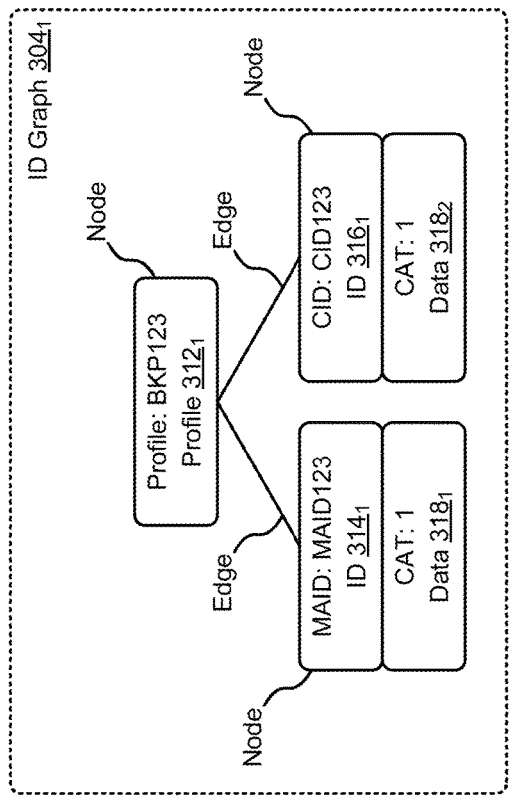
FIG. 3B is a schematic view of linked IDs as are used in systems for extending audience reach in messaging campaigns by linking user attribute records, according to an embodiment.

FIG. 3B is a schematic view 3B00 of linked IDs as are used in systems for extending audience reach in messaging campaigns by linking user attribute records. As an option, one or more variations of schematic view 3B00 or any aspect thereof may be implemented in the context of the architecture and functionality of the embodiments described herein. Also, the schematic view 3B00 or any aspect thereof may be implemented in any environment.

An ID graph (e.g., ID graph $304_1$) serves to link multiple data records (e.g., IDs, category data, etc.) together to carry the attributes of a given user. An edge or link represents an association that connects IDs (e.g., a user profile identifier or ID, a mobile advertiser identifier or MAID, a carrier identifier or CID, a statistical identifier or StatID, a hashed information identifier or HID, etc.). An ID is a unique identifier (e.g., UUID). Data corresponding to the unique identifier can be stored with an association to the unique identifier, and such data can be retrieved using the unique identifier as a key. Such data can conform to any syntax and/or semantics.

Further details regarding general approaches to generation, use and management of statistical IDs are described in U.S. application Ser. No. 14/791,074, titled "TUNABLE STATISTICAL IDS" filed on Jul. 2, 2015, which is hereby incorporated by reference in its entirety.

More specifically, the schematic view 3B00 comprises an ID graph $304_1$ having three nodes and two edges. The node for user profile ID BKP123 (see profile $312_1$) has two edges, which serve to link two IDs, namely MAID123 (see ID $314_1$) and CID123 (see ID $316_1$). Each of MAID123 and CID123 has associated category data, in this case data pertaining to CAT=1 (see data $318_1$ and data $318_2$). Techniques for managing IDs and associated data, such as can be used to extend audience reach in messaging campaigns by linking user attribute records, are discussed in FIG. 3C and FIG. 3D.

Figure 3C:
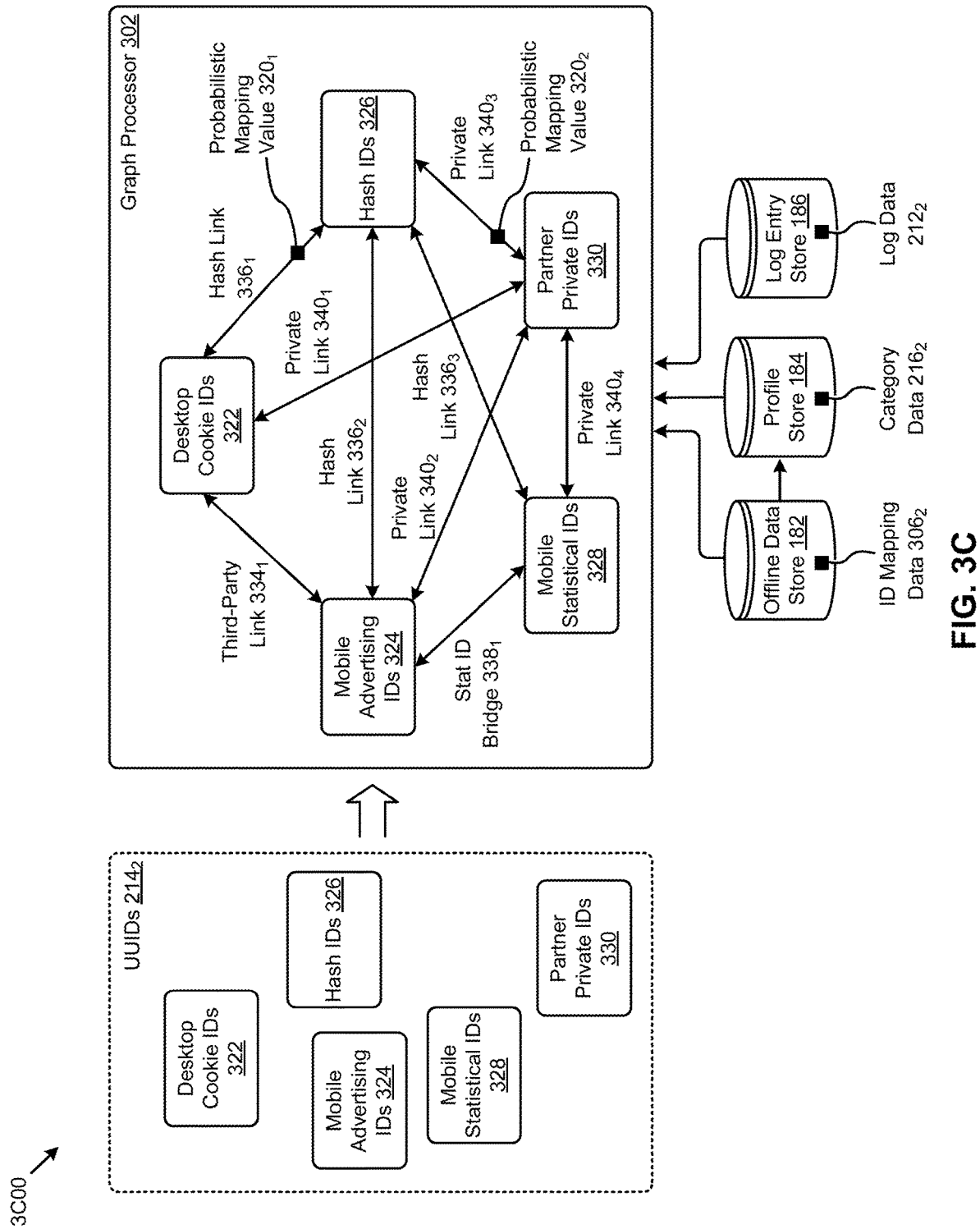
FIG. 3C depicts a data flow through a graph processor that is used as a component in systems for extending audience reach in messaging campaigns by linking user attribute records, according to some embodiments.

FIG. 3C depicts a data flow 3C00 through a graph processor that is used as a component in systems for extending audience reach in messaging campaigns by linking user attribute records. As an option, one or more variations of data flow 3C00 or any aspect thereof may be implemented in the context of the architecture and functionality of the embodiments described herein. Also, the data flow 3C00 or any aspect thereof may be implemented in any environment.

The data flow 3C00 comprises a flow from certain UUIDs $214_2$ (e.g., as may have been provided by a pixel server at ingestion) to the graph processor 302 where various links are applied to the UUIDs $214_2$. Specifically, the UUIDs $214_2$ comprise instances of certain IDs earlier described, such as desktop cookie IDs 322, mobile advertiser IDs 324, hash IDs 326, mobile statistical IDs 328, and partner private IDs 330. When the UUIDs $214_2$ are first ingested, the assignment of IDs to users and/or to other IDs is not known, yet the graph processor 302 can link the IDs in an ID graph. In this example, the graph processor 302 has access to various data (e.g., ID mapping data $306_2$, category data $216_2$, and log data $212_2$) and rules that can be used to link certain portions of the UUIDs $214_2$. In some cases, the links are based on an ID and have a hub and spoke model, where the link is the hub and the connected IDs are spokes. Such ID-based links can reach any of the connected IDs without having to make a link "hop" (e.g., going from one link to another). Specifically, the ID-based links shown include hash links (e.g., hash link $336_1$, hash link $336_2$, hash link $336_3$), statistical ID bridges (e.g., stat ID bridge $338_1$), partner private ID links (e.g., private link $340_1$, private link $340_2$, private link $340_3$, private link $340_4$), household ID links (e.g., that link members of a household and/or group), and IP address links (e.g., a probabilistic link). More specifically, hash links enable partners (e.g., those participating in a match network) to take advantage of links from the Hash IDs connected with other IDs in the ecosystem. Any link can have one or more respective probabilistic mapping values (e.g., probabilistic mapping value $320_1$, probabilistic mapping value $320_2$, etc.). Probabilistic ID links (e.g., such as in the form of statistical ID bridges) can serve to link users that might appear both in mobile web environments and also in mobile app environments. Such probabilistic ID linking can be based on IP addresses, timestamps, common categories, and other attributes.

Partner private links can be provided by a partner for private use among the partner's ID spaces. In other cases, the links are not based on IDs, and are provided by partners that might not have an ID associated with the link. Such links might further not have a transitive property. For example, if ID-A=ID-B and ID-B=ID-C, ID-A might not equal ID-C. Specifically, the third-party link $334_1$ can represent such a link that is not based on an ID. For example, third-party link $334_1$ might be based on a probabilistic mapping (e.g., using a probabilistic mapping value for each tier). A probabilistic mapping value can refer to a probability that an ID within a class can be used as a proxy to correctly and accurately identify a particular user. In one specific example, the probabilistic mapping of an ID to a hashed email address (see class 1) is ranked high (e.g., having a high probabilistic mapping value) but not as high as, for instance, a hashed social security number (see class 0), because a person can have multiple email addresses. Further, as shown, the carrier ID is ranked higher (e.g., having a higher probabilistic mapping value) than the probabilistic mapping value of a mobile advertiser ID (MAID) because a user can reset their MAID and/or there is more of a chance that the system may encounter a user with two MAIDs. However, if the same carrier ID with two MAIDs is encountered, they can be linked. In general, the higher the ID space and its probabilistic mapping value is in the hierarchy, the closer that ID associates to an actual user. In some cases, an ID classified into a lower tier ID can be linked to an ID in a higher tier, and such a linked ID can be processed as separate IDs or events, or can be processed as a single ID or event.

Strictly as one example, a probabilistic ID link can be formed on the basis of a known or suspected relationship between one or more desktop cookies (e.g., see desktop cookie IDs 322) and advertiser-provided information (e.g., see the mobile advertiser IDs 324).

As earlier mentioned, the graph processor 302 can use various data and rules to construct the ID graphs shown in FIG. 3C and described herein. Such a hierarchy of rules can be read by a computer. A human readable representation of such rules is presented in the following FIG. 3D.

FIG. 3D is a hierarchy chart depicting an ID tiering rule regime 3D00 to be used by graph processors in systems for extending audience reach in messaging campaigns by linking user attribute records. As an option, one or more variations of ID tiering rule regime 3D00 or any aspect thereof may be implemented in the context of the architecture and functionality of the embodiments described herein. Also, the ID tiering rule regime 3D00 or any aspect thereof may be implemented in any environment.

As shown in FIG. 3D, the hierarchy chart comprises ID spaces ranked in order. The order is based on a quantification of the accuracy of the ID and how closely the ID maps to an actual user. As shown, the ID tiers nearer the top of the chart (e.g., Tier "0", "A", "B", "C", etc.) are deemed to have a higher accuracy or confidence of being associated with a particular actual user. The ID tiers nearer the bottom of the chart (e.g., Tier "J", "I", "H", "G", etc.) are deemed to have a lower accuracy or confidence of being associated with a particular actual user. In some cases, the ID tier description (e.g., carrier ID, partner-generated ID, etc.) and/or the nature of the data record indicates the origin of a respective incoming ID (e.g., see origin indication 342, characteristics of the origin 343, and nature of data record 344). In one specific example, a hashed email address (see class 1) is ranked high but not as high as, for instance, a hashed social security number (see class 0), because a person can have multiple email addresses. Further, as shown, the carrier ID is ranked higher than a mobile advertiser ID (MAID) because a user can reset their MAID and/or there is more of a chance that the system may encounter a user with two MAIDs. However, if the same carrier ID with two MAIDs is encountered, they can be linked. In general, the higher the ID space is in the hierarchy, the closer that ID associates to an actual user. In some cases, an ID classified into a lower tier ID can be linked to an ID in a higher tier, and such a linked ID can be processed as separate IDs or events, or can be processed as a single ID or event.

Any characteristic 346 of the hierarchy can be used as a proxy for an accuracy indication, and an accuracy indication can be used, possibly in combination with other aspects of the hierarchy and/or origin to decide when, and/or how to link IDs (e.g., to merge, to bridge, etc.). In addition to the shown aspects (e.g., characteristics 346), an ID or an event that precipitates an ID can include an IP address and/or a timestamp, and such aspects can be used in the determination of an accuracy tier. An accuracy indication can further be used in the processes of ingestion, storage, targeting, and delivery as implemented in by graph processors in systems for extending audience reach in messaging campaigns by linking user attribute records.

The aforementioned graph processors (e.g., a graph processor within the ID management service 178) can be invoked to emit all or sub-portions of an ID graph. Any such emitted IDs or links can be used in marketing scenarios as well as in non-direct marketing scenarios (e.g. analytics, data science, or lookalike modelling). The aforementioned embodiment of the ID management service 178 for targeting and delivery can perform analytics, data science, or lookalike modelling. In one particular setting, the ID management service 178 can identify users who match a particular set of descriptors, and an emitted ID graph or sub-portions thereof can be used for marketing analytics, marketing lookalikes, or pattern analysis.

Further, a confidence score, and/or an accuracy indication, and/or any combination can be used to determine whether or not to take a particular delivery action. For example, one delivery option relies on rules or tests that deliver only the highest quality IDs (e.g., based on the rules or tests) and their categories. As another example, another delivery option allow all links to be used, regardless of the quality or nature or quantification of the edge links between IDs in the ID graph or regardless of the nature or hierarchy attributes of the linked IDs themselves.

One possible set of hierarchy attributes (e.g., classes) is given as follows:

Class 0 is the highest class and only includes the person ID tier. Class 0 contains IDs that most uniquely identifies a person.

Class 1 includes ID tiers generated by emails either from a product or from a verified partner ID that is based on an email. For the most part, the highest tiers of IDs that can be collected online will mostly fall within Class 1.

Class 2 includes ID tiers that are typically seen with other partner IDs. These ID tiers can help link web to web, web to app, and app to app. Class 2 tiers include carrier IDs, mobile advertiser IDs, and first-party and third-party desktop cookie IDs.

Class 3 includes the ID tier of verified partner-generated first party IDs that are device and/or browser limited in scope. This means that that these IDs can identify a device but not a person such as a hashed email might do.

Class 4 includes the ID tiers that are deterministic but do not merge, such as the unverified partner-generated IDs.

Class 5 includes ID tiers that generate statistical IDs (e.g., referring to the herein-described uses of StatIDs).

Class 6 includes ID tiers that generate statistical IDs that other's own.

Class A is a class of IDs that can encompass one or more tiers of IDs. The class tries to group together tiers of IDs that have some relationship. The class definition is mainly for organizational and better visual representation of the table.

Another possible set of hierarchy attributes (e.g., tiers) is given as follows:

An ID tier describes a set of ID spaces that are similar in nature but may be owned by different partners. The ranking of ID tiers are important because they serve in part to determine whether to link, merge or bridge.

Tier 0 includes an ID space that is based on the actual ID of the person. This can include a hashed social security number or data that identifies whether a person owns multiple email addresses, etc. There can only be one Tier 0 ID per user profile. Tier 0 IDs are deterministic, trusted, and initiate a link.

Tier A includes ID spaces that are based on an email (hashed) from a product that one owns such as Eloqua, Responsys, etc. IDs in Tier A are first party IDs that are based on hashed email. Tier A IDs are deterministic, trusted, and can serve to initiate a link.

Tier B includes ID spaces that fall within verified partner generated first party IDs, which are user local in scope. IDs in Tier B are partner first party IDs that are based on hashed email. Tier B IDs are deterministic, trusted, and can initiate a link.

Tier C includes ID spaces that are carrier IDs. Carrier IDs (CIDs) can also be rotated and the storage of this type of ID is covered in a global rules section. Tier C IDs are deterministic, untrusted (owned by someone else), and can initiate a link.

Tier D includes ID spaces that are mobile advertising device IDs. Tier D IDs are deterministic, untrusted, and can initiate a link.

Tier E includes a first party ID space that is browser based and not hashed email based. Tier C IDs are deterministic, trusted, and initiate a link.

Tier F includes a third party ID space. Tier F IDs are deterministic, trusted, and initiate a link.

Tier G includes the verified partner-generated first party IDs that are device-local or browser-local in scope. Note that this is different from Tier B IDs which are email-local in scope. IDs in Tier G are partner first party IDs that are not based on hashed email. Tier G IDs are deterministic, trusted, and can initiate a link.

Tier H includes the unverified partner-generated ID. IDs in Tier G are partner first party IDs that can be hashed email-based or browser-/device-based. The reason why these IDs are in this tier is because they have not been verified by the pixel server. Once they are verified, they will be in either Tier G or Tier B. Tier H IDs are deterministic, untrusted (unverified), and generally do not initiate a link.

Tier I includes statistical IDs that are generated by the pixel server. If the pixel server were to be used by a vendor to generate a StatID, it would still fall into this tier because it is a StatID. IDs in Tier I are probabilistic, trusted, and do not initiate a link.

Tier J includes statistical IDs that are generated by partners. Various processes can determine if the statistical IDs provided are probabilistic or deterministic. If they are probabilistic, then they would fall into this tier. IDs in Tier J are probabilistic. They are deemed to be untrusted to the extent that they do not initiate a link.

Figure 4A:
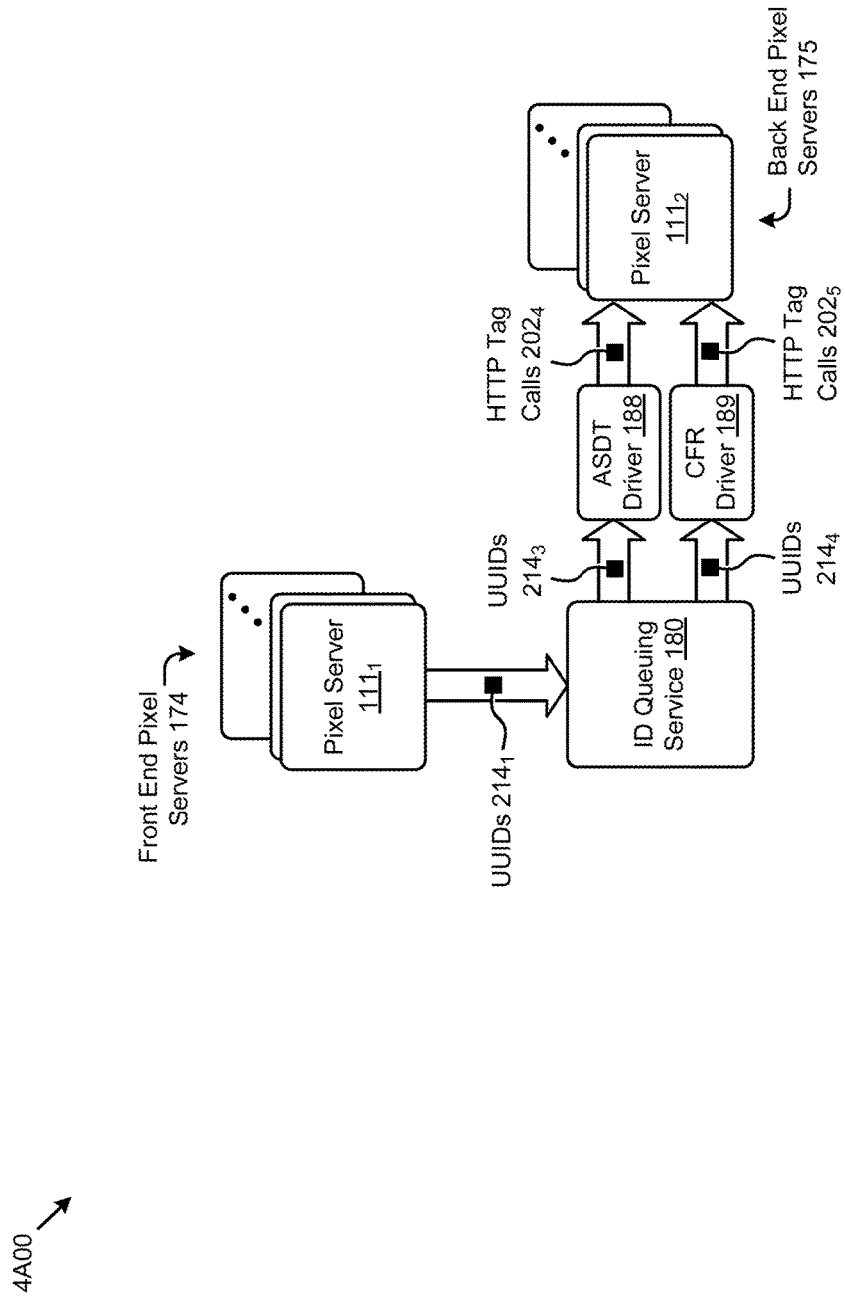
FIG. 4A depicts an asynchronous ID queuing technique as implemented in systems for extending audience reach in messaging campaigns by linking user attribute records, according to an embodiment.

FIG. 4A depicts an asynchronous ID queuing technique 4A00 as implemented in systems for extending audience reach in messaging campaigns by linking user attribute records. As an option, one or more variations of asynchronous ID queuing technique 4A00 or any aspect thereof may be implemented in the context of the architecture and functionality of the embodiments described herein. Also, the asynchronous ID queuing technique 4A00 or any aspect thereof may be implemented in any environment.

The embodiment shown in FIG. 4A depicts a portion of the system described in FIG. 1B and related data structures that can be used for implementing the asynchronous ID queuing technique 4A00. Specifically, the ID queuing service 180 is shown receiving UUIDs $214_1$ from the front end pixel servers 174. The ID queuing service 180 has various instances of queued UUIDs (e.g., UUIDs $214_3$ and UUIDs $214_4$) to the ASDT driver 188 and the CFR driver 189, respectively. Specifically, the ASDT driver 188 processes each instance of the UUIDs $214_3$ received to issue a respective instance of the HTTP tag calls $202_4$ to the back end pixel servers 175 for asynchronous (e.g., offline) processing (e.g., targeting and delivery). Further, the CFR driver 189 receives portions of the UUIDs $214_4$ in batches, and issues certain HTTP tag calls $202_5$ associated with the batch to the backend pixel servers 175. In one or more embodiments, the techniques provided, in part, by the ID queuing service 180 and the CFR driver 189 serve to enable simulation of user touchpoints (e.g., website visits), yet without the delay of waiting for the touchpoint to occur. For example, using the ID queuing service 180 and the CFR driver 189 to target the most recent 30 days of UUIDs, the reach of a new campaign can be quickly modeled and/or a retargeting campaign audience can be immediately delivered to a campaign. Log messages can be parsed individually or in streams or in batches (e.g., see log entry processing 181) and stored in any format, possibly in a markup language format and/or including metadata tags to identify fields within a log message.

Figure 4B:
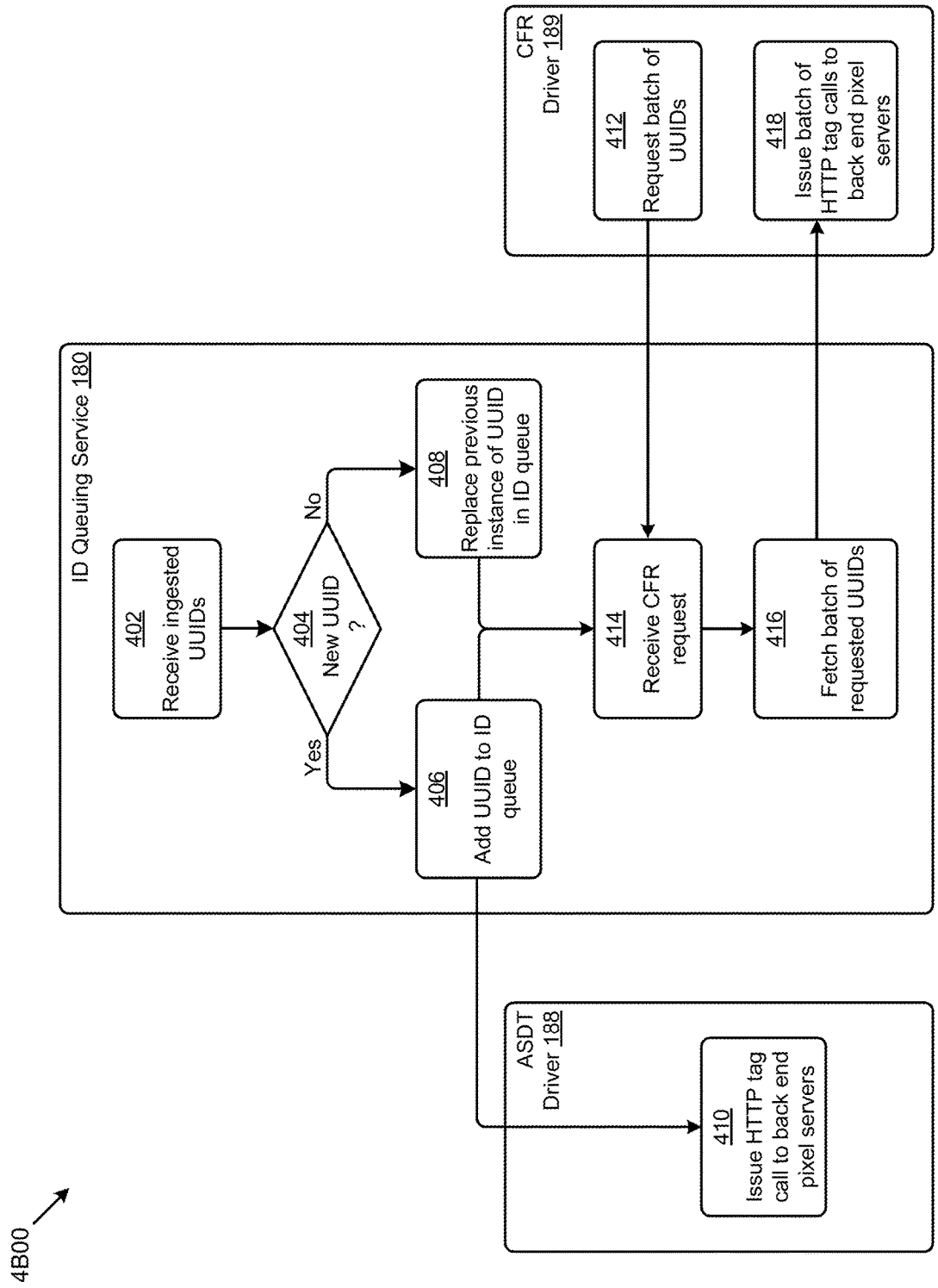
FIG. 4B presents a logic flow as used for asynchronous processing of user web page visits as implemented in systems for extending audience reach in messaging campaigns by linking user attribute records, according to an embodiment.

One embodiment of a logic flow pertaining to the operations of the ID queuing service 180, the ASDT driver 188, and the CFR driver 189 are described as pertains to FIG. 4B.

FIG. 4B presents a logic flow 4B00 as used for asynchronous processing of user web page visits as implemented in systems for extending audience reach in messaging campaigns by linking user attribute records. As an option, one or more variations of logic flow 4B00 or any aspect thereof may be implemented in the context of the architecture and functionality of the embodiments described herein. Also, the logic flow 4B00 or any aspect thereof may be implemented in any environment.

The logic flow 4B00 shown in FIG. 4B comprises various steps and operations that can be performed by the ID queuing service 180, the ASDT driver 188, and the CFR driver 189, described herein. Specifically, logic flow 4B00 can commence with the ID queuing service 180 receiving an ingested UUID (see step 402). If the UUID is new (see decision 404), the UUID can be added to the queue (see step 406). A new UUID can further be forwarded to the ASDT driver 188, where an HTTP tag call to the back end pixel servers 175 for the new UUID can be issued (see step 410). If the UUID received by the ID queuing service 180 is not new, the previous instance of the UUID will be replaced with the new instance (see step 408). While the ID queuing service 180 continues to receive and queue UUIDs, the CFR driver 189 might request a batch of UUIDs (see step 412). The IQ queuing service 180 can receive the CFR request (see step 414) and fetch the batch of UUIDs requested (see step 416). For example, the batch size can be based on various performance constraints, such as the number of servers (e.g., back end pixel servers 175) available for downstream processing. The batch size can alternatively be based on a specified analysis time window (e.g., 30 days). The CFR driver 189 can then issue a batch of HTTP tag calls to the back end pixel servers (see step 418). In some cases, the simulated visits issued by the CFR driver 189 can be logged as log data in log entry store 186.

Figure 5A:
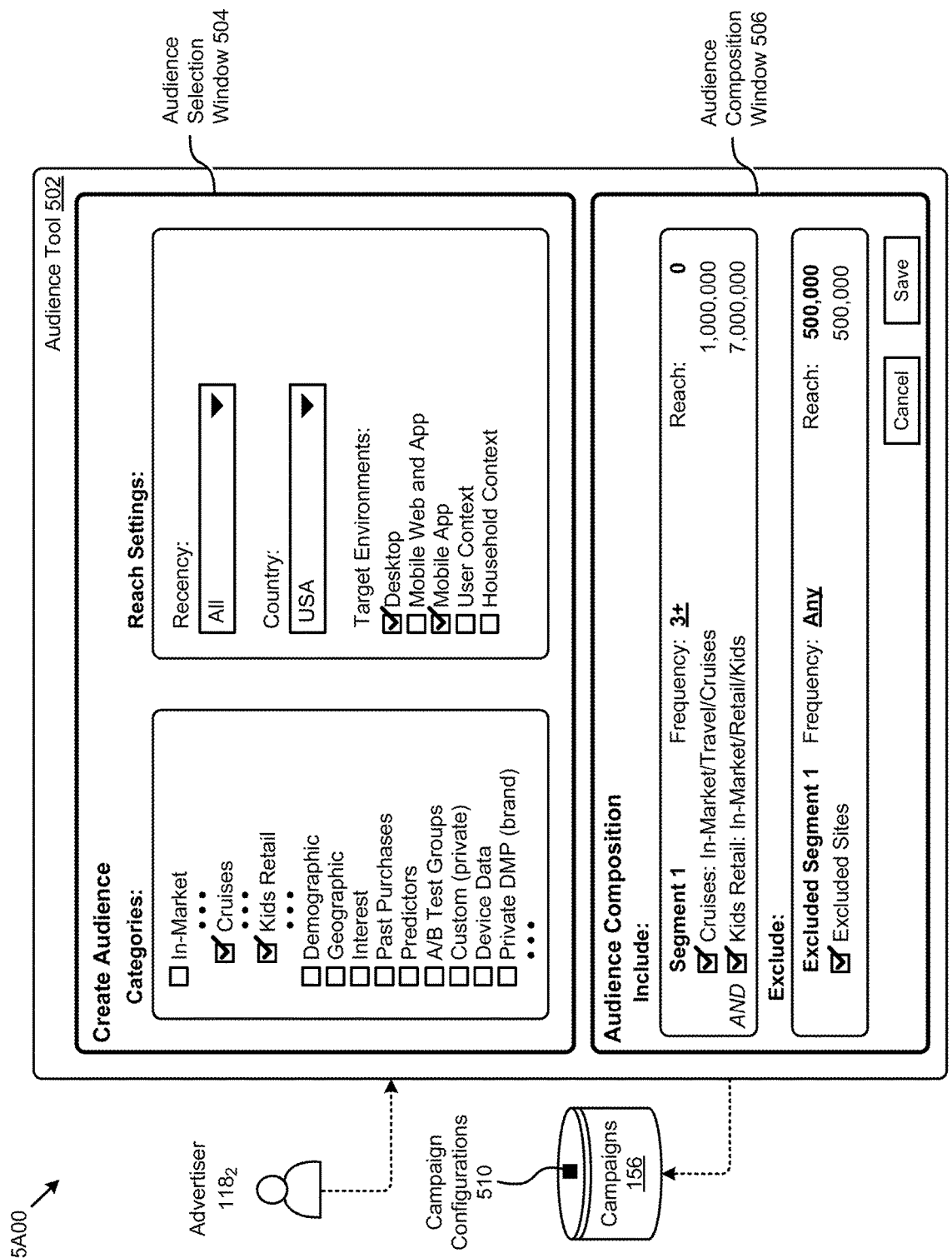
FIG. 5A presents a view of a user interface for managing an audience in systems for extending audience reach in messaging campaigns by linking user attribute records, according to an embodiment.

FIG. 5A presents a view of a user interface 5A00 for managing an audience in systems for extending audience reach in messaging campaigns by linking user attribute records. As an option, one or more variations of user interface 5A00 or any aspect thereof may be implemented in the context of the architecture and functionality of the embodiments described herein. Also, the user interface 5A00 or any aspect thereof may be implemented in any environment.

Specifically, the user interface 5A00 shown in FIG. 5A can be used by an advertiser $118_2$ to establish certain campaign configurations 510 to be used (e.g., by front end pixel servers 174 and back end pixel servers 175) for targeting and delivery of users against associated messaging campaigns. In one or more embodiments, the user interface 5A00 can be included in an audience tool 502 operating on one or more computing devices (e.g., advertiser interface device 109, etc.). More specifically, the user interface 5A00 can comprise an audience selection window 504 and an audience composition window 506. As shown, the audience selection window 504 can present various input entry elements (e.g., dropdown selections, text boxes, etc.) through which the advertiser $118_2$ can associate various categories and reach settings with a given audience. For example, the advertiser $118_2$ might want to find users in the desktop and mobile app environments (e.g., see "Desktop" and "Mobile App" selections) who are in market for both cruises and kids retail products (e.g., see "Cruises" and "Kids Retail" selections). The advertiser $118_2$ might believe that this target audience resembles families with kids who might be interested in a cruise line promotion. The advertiser $118_2$ might specifically want to reach this target audience in the mobile app environment since existing mobile media campaigns are running through a partner (e.g., AppNexus).

As shown in the audience composition window 506, the selections by the advertiser $118_2$ yields a reach of "0", yet the "Cruise" and "Kids Retail" categories have a respective reach (e.g., number of unique users seen over the last 30 days) of 1,000,000 and 7,000,000. In this case, there is no inventory for "Cruise" AND "Kids Retail" since the ID graph links among the selected categories and environments have not been applied. Other options shown in the user interface 5A00 include the "Recency" option, which specifies the maximum number of days that can elapse since a user was last tagged with a category attribute to still qualify for a target audience. In the illustrated example, "All" days is selected (e.g., the default or 90 days). The "Country" option specifies the one or more countries to target. Another option is the "Frequency" option, which specifies the number of times users have qualified for a category since they were initially tagged with that category. Optionally, an advertiser can "Exclude" certain segments from the target audience. For example, if you include users in the In-Market>Travel>Cruises category yet exclude users in the Demographic>Premium Demographic>Income>$0-$14,999 and Demographic>Premium Demographic>Income>$15,000-$19,999 categories, those users who are in-market for a cruise yet are in the specified lower incomes are not included in your target audience. In the example shown in FIG. 5A, certain "Excluded Sites" are part of the specified target audience.

Figure 5B:
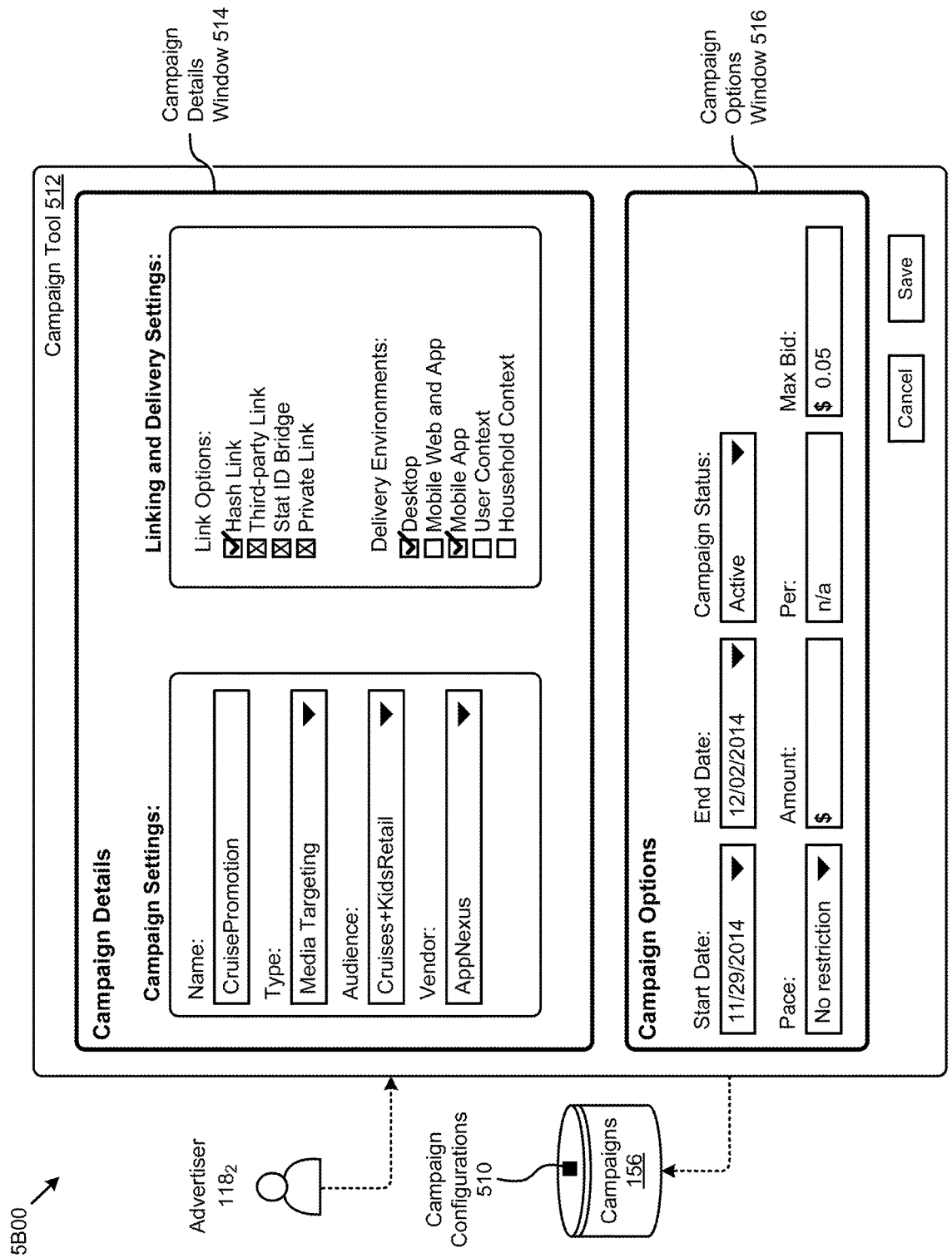
FIG. 5B presents a view of a user interface for managing a campaign in systems for extending audience reach in messaging campaigns by linking user attribute records, according to an embodiment.

When all settings have been selected and specified, the advertiser $118_2$ can click "Save" and the audience can be used in one or more campaigns, as described in FIG. 5B.

FIG. 5B presents a view of a user interface 5B00 for managing a campaign in systems for extending audience reach in messaging campaigns by linking user attribute records. As an option, one or more variations of user interface 5B00 or any aspect thereof may be implemented in the context of the architecture and functionality of the embodiments described herein. Also, the user interface 5B00 or any aspect thereof may be implemented in any environment.

Specifically, the user interface 5B00 shown in FIG. 5B can be used by an advertiser $118_2$ to establish certain campaign configurations 510 to be used (e.g., by front end pixel servers 174 and back end pixel servers 175) for targeting and delivery of users against associated messaging campaigns. In one or more embodiments, the user interface 5B00 can be included in a campaign tool 512 operating on one or more computing devices (e.g., advertiser interface device 109, etc.). More specifically, the user interface 5B00 can comprise a campaign details window 514 and a campaign options window 516. As shown, the campaign details window 514 can present various input entry elements (e.g., dropdown selections, text boxes, etc.) through which the advertiser $118_2$ can specify various targeting, linking, and delivery settings for a given campaign. For example, the advertiser $118_2$ can specify a "Media Targeting" campaign named "CruisePromotion" that has a target audience of "Cruises+KidsRetail" (e.g., see FIG. 5A) and is executed through "AppNexus". Other campaign types can include cost per stamp (CPS), cost per mile (CPM), flat fee, dynamic creative optimization, site-side optimization, search, and other types. The "Delivery Environment" determines where the target audience is to be sent. In the case shown, the advertiser $118_2$ has selected "Desktop" and "Mobile App". For example, the advertiser $118_2$ might deliver the audience to the mobile app environment since the advertiser $118_2$ has mobile app targeting campaigns running within AppNexus with budget usage and audience reach goals. "Link Options" can be automatically selected and ordered by reach then cost. In some cases, the link options can be based on a tiered regime, such as that described in FIG. 3D. Delivery inventory can show the additional inventory that each link option will add to the delivery environments. In this case, the advertiser $118_2$ has accepted the automated selection of the hash links, and the other link options are not selectable since they are not adding any additional inventory.

In the campaign option window 516, the "Start Date", "End Date", and "Campaign Status" can be specified. Further, various commercial settings (e.g., "Pace", "Max Bid", etc.) are available to the advertiser $118_2$. Clicking "Save" in the campaign tool 512 will save the specifications to the campaign configurations 510 and any active campaigns can be used for targeting and delivery as described below.

Figure 6A:
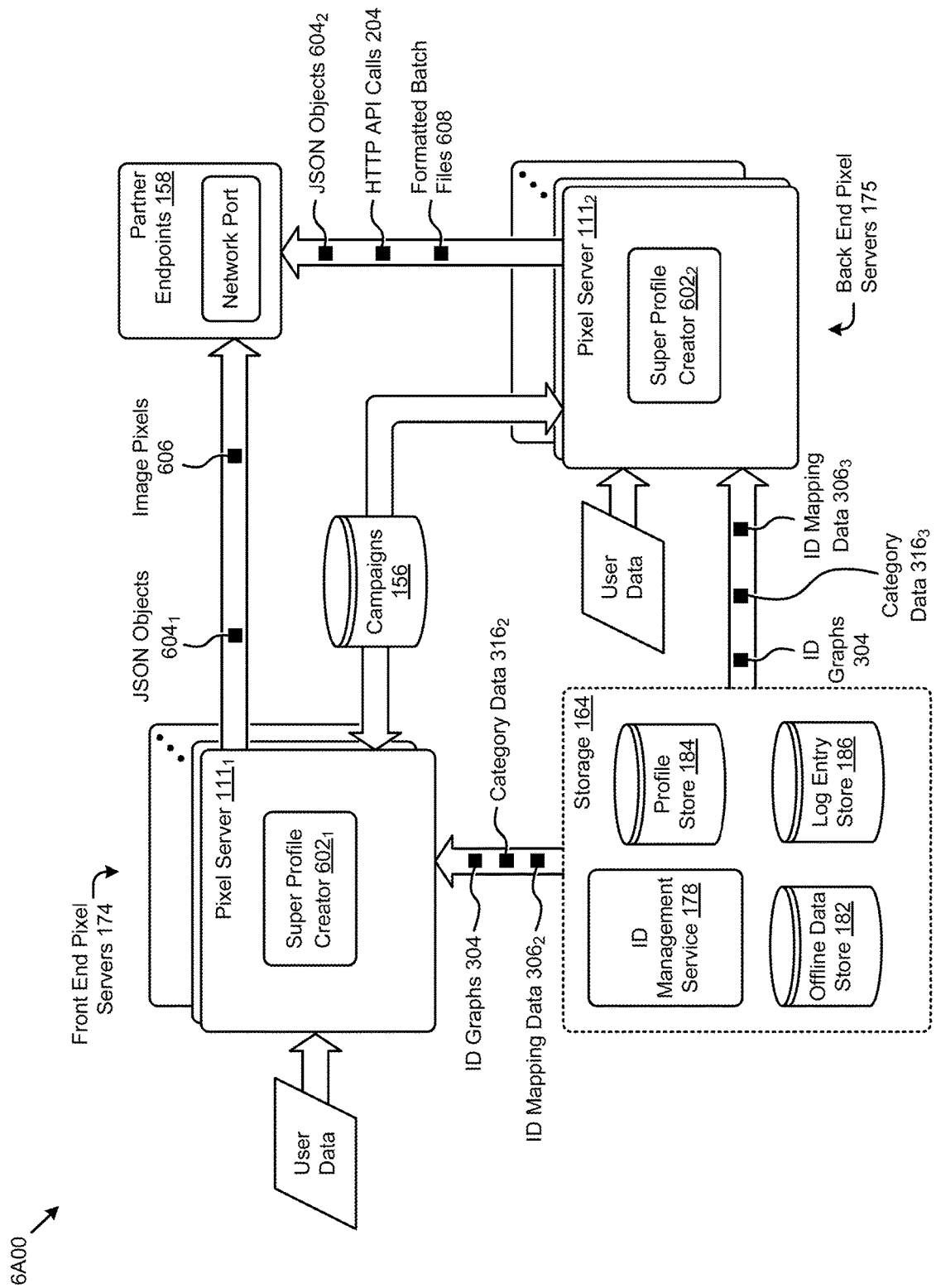
FIG. 6A depicts targeting and delivery portions of a data handling technique as implemented in systems for extending audience reach in messaging campaigns by linking user attribute records, according to an embodiment.

FIG. 6A depicts targeting and delivery portions of a data handling technique 6A00 as implemented in systems for extending audience reach in messaging campaigns by linking user attribute records. As an option, one or more variations of a data handling technique 6A00 or any aspect thereof may be implemented in the context of the architecture and functionality of the embodiments described herein. Also, the data handling technique 6A00 or any aspect thereof may be implemented in any environment.

The embodiment shown in FIG. 6A depicts a portion of the system described in FIG. 1B that can be used for targeting and delivery operations in systems for extending audience reach in messaging campaigns by linking user attribute records. Also shown are various subsystem components and data structures related to the pixel servers (e.g., pixel server $111_1$ and pixel server $111_2$). Specifically, pixel server $111_1$ is shown receiving ID graphs 304, ID mapping data $306_2$, and category data $316_2$ to be used for targeting users for certain campaigns 156 in response to ingested user data. Such targeting at the pixel server $111_1$ can be performed, in part, by a super profile creator $602_1$. Certain attributes associated with the corpus of users matching a given messaging campaign can be delivered to the relevant partner endpoints (e.g., certain constituents of the partner endpoints 158), using JSON objects $604_1$, image pixels 606, and other protocols and structures for electronic communication over a network (e.g., using http protocol through a network port). For example, campaign data can be received in JSON objects $604_1$ directly by the web page hosting a core tag container. As another example, image pixels 606 can transfer campaign data to a cookie and/or a profile store in real-time. Further, pixel server 111₂ is shown receiving instances of ID graphs 304, ID mapping data 306₃, and category data 316₃, to be used for targeting users for certain campaigns 156 in response to ingested user data. Such targeting at the pixel server 111₂ can be performed, in part, by a super profile creator 602₂. Certain attributes associated with the corpus of users matching a given messaging campaign can be delivered to the relevant partner endpoints (e.g., certain constituents of the partner endpoints 158) using JSON objects 604₂, HTTP API calls 204, formatted batch files 608 (e.g., delivered hourly, daily, etc.), and other protocols and structures for electronic communication over a network. For example, the HTTP API calls 204 can programmatically transfer category-level user data using a server-side API. In some embodiments, the aforementioned output store 183 stores formatted batch files to be delivered to a partner endpoint.

The foregoing targeting and delivery operations can be implemented using the techniques described below and herein.

FIG. 6B1 illustrates an ID transfer technique 6B100 as implemented in systems for extending audience reach in messaging campaigns by linking user attribute records. As an option, one or more variations of ID transfer technique 6B100 or any aspect thereof may be implemented in the context of the architecture and functionality of the embodiments described herein. Also, the ID transfer technique 6B100 or any aspect thereof may be implemented in any environment.

In the ID transfer technique 6B100 shown, when the targeted ID is seen online or is available for an asynchronous campaign match (e.g., via the CFR driver 189), the selected links connected to other IDs outside of the targeted environment, yet part of the delivery environment can only transfer wins from the targeted ID to the delivery IDs. All links connecting IDs in the delivery environment that are not part of the targeted environment exhibit a "transfer" behavior.

In the example shown in FIG. 6B1, if ID CID456 is the targeted ID (e.g., for CAT: 1, 2) that is seen online, and IDs MAID789 and MAID999 are both part of the delivery environment yet not part of the target environment, then the third-party links (e.g., third-party link 334₂ and third-party link 334₃) will only transfer category matches from ID CID456 to IDs MAID789 and MAID999. Categories within IDs MAID789 and MAID999 (e.g., CAT: 3, 4, 5, 6) will not be available to match the campaign.

FIG. 6B2 illustrates an ID amalgamation technique 6B200 as implemented in systems for extending audience reach in messaging campaigns by linking user attribute records. As an option, one or more variations of ID amalgamation technique 6B200 or any aspect thereof may be implemented in the context of the architecture and functionality of the embodiments described herein. Also, the ID amalgamation technique 6B200 or any aspect thereof may be implemented in any environment.

In the ID amalgamation technique 6B200 shown, when the targeted ID is seen online or is available for an asynchronous campaign match (e.g., via the CFR driver 189), the selected links connected to other IDs in the target environment retrieve all of the categories from those IDs first before the campaign match is performed. All links connecting IDs in the targeted environment exhibit an "amalgamation" behavior.

In the example shown in FIG. 6B2, if ID CID456 was seen online and the target audience targeted IDs CID456, MAID789, and HASH99, then the hash links (e.g., hash link 336₄ and hash link 336₅) will retrieve all categories within those IDs (e.g., CAT: 1, 2, 3, 4) and present the full combination of categories for campaign matching. In some cases, the amalgamated categories is assigned a unique identifier (e.g., SP123) in a "super profile", as discussed further in FIG. 6C.

Figure 6C:
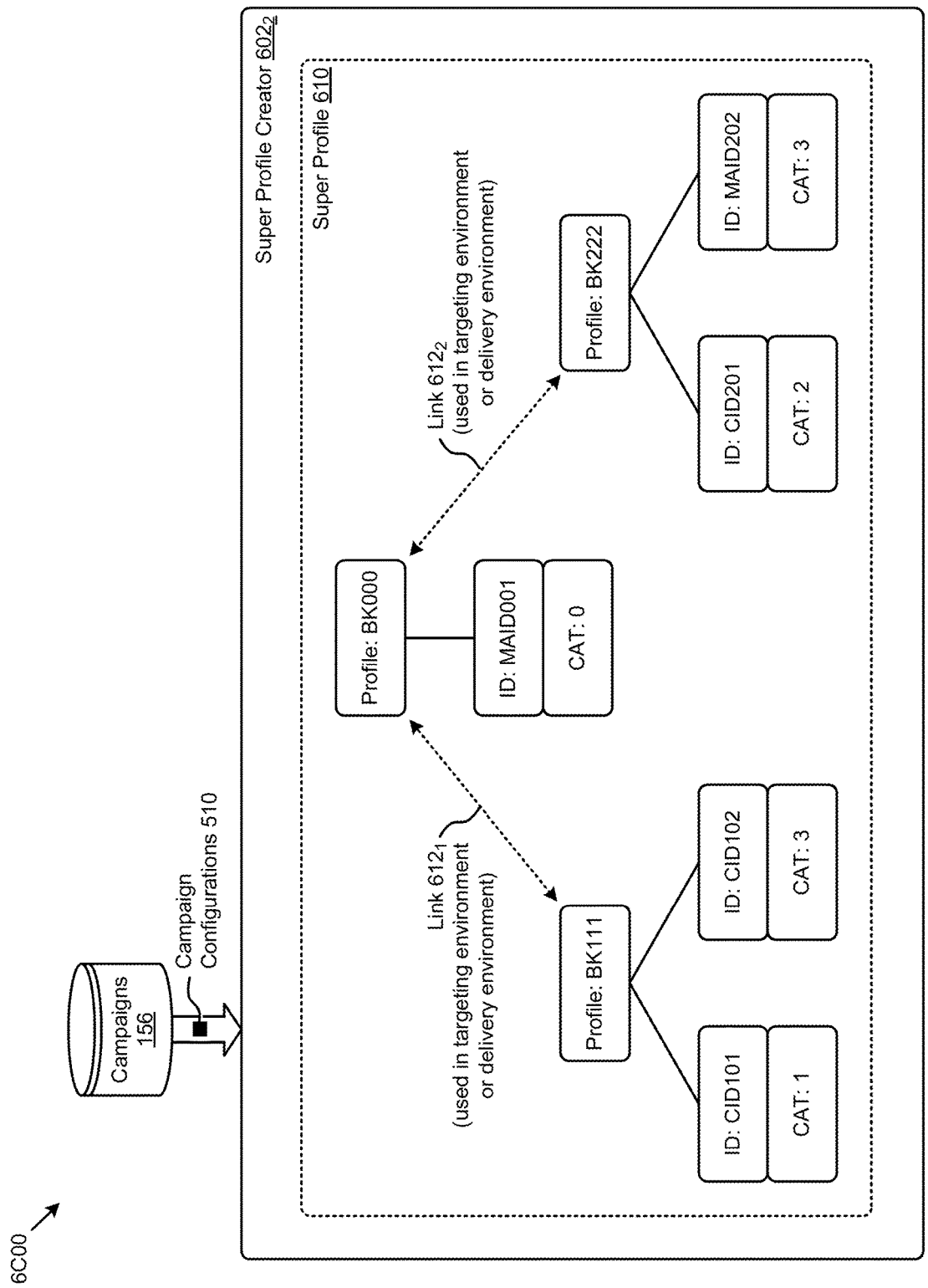
FIG. 6C illustrates a profile amalgamation technique as implemented in systems for extending audience reach in messaging campaigns by linking user attribute records, according to an embodiment.

FIG. 6C illustrates a profile amalgamation technique 6C00 as implemented in systems for extending audience reach in messaging campaigns by linking user attribute records. As an option, one or more variations of profile amalgamation technique 6C00 or any aspect thereof may be implemented in the context of the architecture and functionality of the embodiments described herein. Also, the profile amalgamation technique 6C00 or any aspect thereof may be implemented in any environment.

The profile amalgamation technique 6C00 shown in FIG. 6C depicts three profiles: profile BK111 linking CID101 and CID102 having category data CAT:1 and CAT:3, respectively; profile BK222 linking CID201 and MAID202 having category data CAT:2 and CAT:3, respectively; and profile BK000 linking MAID001 having category data CAT:0. Further shown are a link 612₁ associating BK000 and BK111, and a link 612₂ associating BK000 and BK222. When the profiles are matched against one or more campaigns, encountering BK000 will invoke a call for link 612₁ and link 612₂ (e.g., from the ID management service 178), and a super profile 610 can be constructed for matching to the campaigns. For example, the super profile 610 comprises CAT:0, 1, 2 and 3, enabling more campaign matches (e.g., extended reach) as compared to each profile.

In some embodiments, certain ID spaces and/or link types can be specified in the campaign configurations 510 (e.g., see "Link Options" in FIG. 5B). Parameters used in campaign configurations can specify and/or limit (e.g., filter) the IDs and/or links that can be used (e.g., by super profile creator 602₂) in the targeting environment (e.g., targeting links) and/or the delivery environment (e.g., delivery links). In some cases, a super profile creator configuration (spcConfig) file can comprise the ID and link filters configured for one or more campaigns. In these cases, when a tag call is received, the spcConfig file can be read to determine the extent of link traversal required for the call context. When certain links are enabled in the spcConfig file, the super profile creator 602₂ can query the ID management service 178 for the corresponding links associated with the current state of link traversal (if the ID management server 178 has not already provided such links). For example, in the profile amalgamation technique 6C00 shown, the spcConfig file might specify that one or both of link 612₁ and link 612₂ is not allowed, such that the construction (e.g., by the ID management service 178) of the resulting super profile would be different than the super profile 610.

Further embodiments exemplifying such linking and super profile creation are described infra.

Figure 6D:
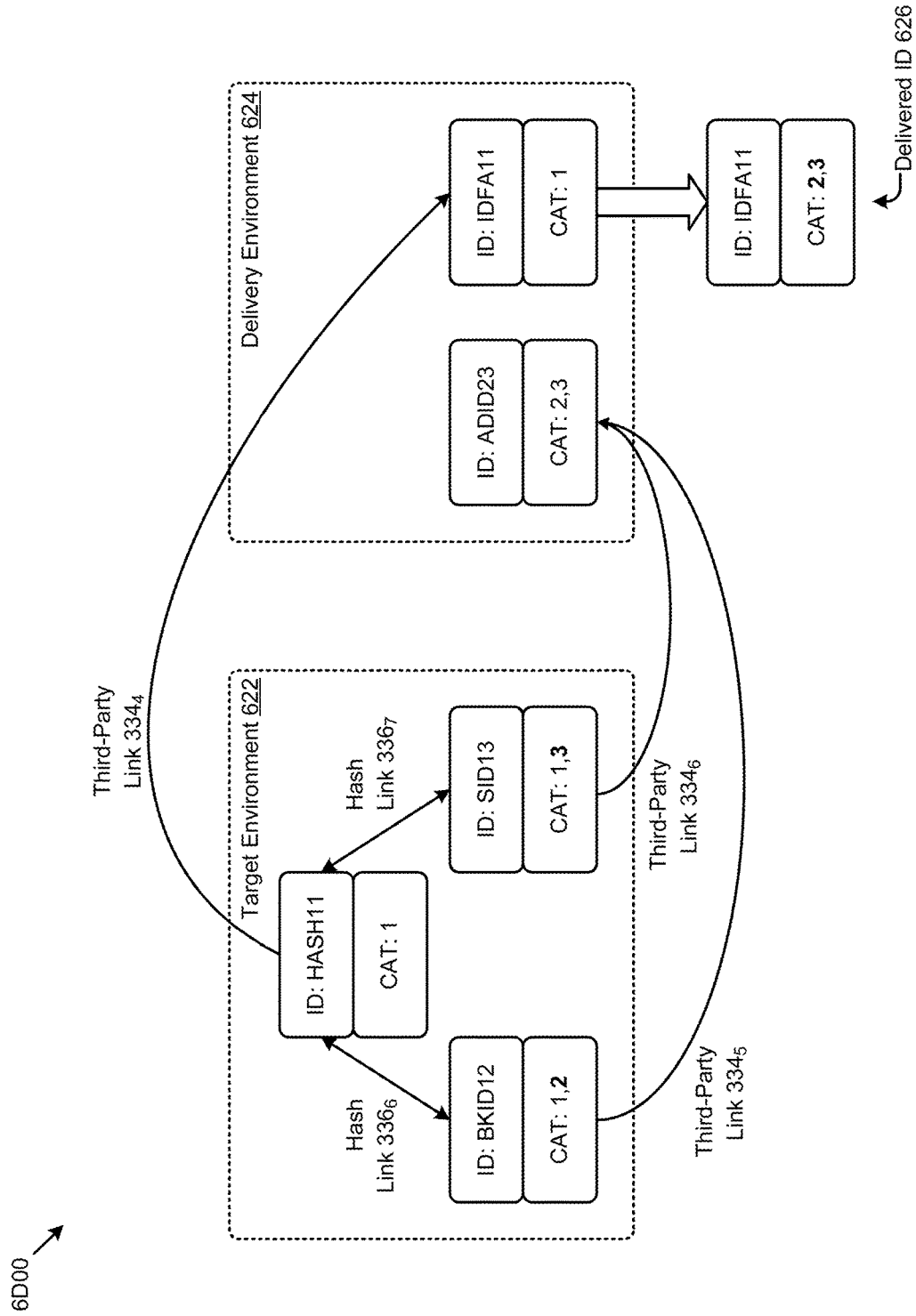
FIG. 6D illustrates an ID linking scenario as implemented in systems for extending audience reach in messaging campaigns by linking user attribute records, according to an embodiment.

FIG. 6D illustrates an ID linking scenario 6D00 as implemented in systems for extending audience reach in messaging campaigns by linking user attribute records. As an option, one or more variations of ID linking scenario 6D00 or any aspect thereof may be implemented in the context of the architecture and functionality of the embodiments described herein. Also, the ID linking scenario 6D00 or any aspect thereof may be implemented in any environment.

The ID linking scenario 6D00 illustrates how the herein disclosed techniques can enable selection of a target audience consisting of categories from multiple ID spaces (e.g., environments), perform operations such as AND, OR and/or Exclude (e.g., "NOT") in each of the ID spaces, and deliver the resulting audience to a different ID space or set of ID spaces. Such a scenario might occur when a partner wants to target actions that a user has taken in multiple ID spaces, yet reach the user in one or more different ID spaces. In this scenario, one or more links might amalgamate multiple IDs in the target environments, yet only transfer the data to the delivery environment. For example, an advertiser may want to target users who have purchased products both in an online desktop environment and mobile web environment, but deliver media to those users in the mobile app environment to entice them to purchase products in the mobile app environment.

Specifically, as shown, a target environment 622 comprises the IDs HASH111, BKID12, and SID13. Further, as indicated, the target audience comprises CAT:2 and CAT:3. Two IDs, ADID23 and IDFA11 are shown in a delivery environment 624. While third-party link 334$_5$ links BKID12 to ADID23, and third-party link 334$_6$ links SID13 to ADID23, no data is transferred to ADID23 because the links do not connect BKID12 and SID13, so the target audience of CAT:2 AND CAT:3 is not available for a match. Further, while ADID23 comprises CAT:2 and CAT:3, ADID23 is not part of the target environment 622 and is also not available for the campaign match.

As shown, IDFA11 does deliver CAT:2 AND CAT:3 (see delivered ID 626). Since BKID12 and SID13 are linked by HASH11 (e.g., through hash link 336$_6$ and by hash link 336$_7$), and since BKID12 and SID13 are within the target environment 622, node HASH11 serves to amalgamate BKID12 and SID13. As such, the categories within BKID12 and SID13 (e.g., CAT: 1, 2, 3) are available for a campaign match. In this case, HASH11 enables the target audience of CAT:2 AND CAT:3 to match the campaign. Further, since HASH11 is also connected to IDFA11 through third-party link 334$_4$, CAT:2 and CAT:3 can be transferred to IDFA11 for delivery.

FIG. 6E1 is a flow diagram 6E100 showing online desktop ingestion and storage examples as used in systems for extending audience reach in messaging campaigns by linking user attribute records. As an option, one or more variations of flow diagram 6E100 or any aspect thereof may be implemented in the context of the architecture and functionality of the embodiments described herein. Also, the flow diagram 6E100 or any aspect thereof may be implemented in any environment.

The flow diagram 6E100 can commence with a user (e.g., user 116$_2$ on user device 114$_2$) shopping for headphones in a desktop environment (see step 632) such as a website on a laptop computer. The website responds to the user activity by issuing a core tag call comprising a hashed ID (e.g., hashed email address) and user data (see step 634). The IDs and data are ingested and the user attributes are classified for "In-Market>Headphones" in BKID123 and HASH123 (see step 636). Further, BKID123 and HASH123 are linked by a hash link 336$_8$ (see step 638). At a later time, the user shops for kids clothes in the desktop environment (see step 642). The website responds to the user activity by issuing a core tag call comprising certain user data (see step 644). The ID and data are ingested and the user attributes are classified for "In-Market>Kids Retail" in BKID123 (see step 646), and the IDs are linked by a corresponding hash link (see step 648). As shown, BKID123 now contains both "Headphones" and "Kids Retail".

FIG. 6E2 is a flow diagram 6E200 showing mobile application ingestion and storage examples as used in systems for extending audience reach in messaging campaigns by linking user attribute records. As an option, one or more variations of flow diagram 6E200 or any aspect thereof may be implemented in the context of the architecture and functionality of the embodiments described herein. Also, the flow diagram 6E200 or any aspect thereof may be implemented in any environment.

The flow diagram 6E200 can commence with the user (e.g., user 116$_2$ on user device 114$_3$) shopping for headphones in a mobile application environment (see step 652), such as a shopping application on a smart phone. The mobile app responds to the user activity by issuing a core tag call from the app SDK comprising a mobile app ID and user data (see step 654). The ID and data are ingested and the user attributes are classified for "In-Market>Headphones" in MAID123 (see step 656). Further, MAID123 and HASH123 are linked by a hash link 336$_8$ (see step 658). At a later time, the user shops for cruises on a mobile travel application (see step 662). The mobile app responds to the user activity by issuing a core tag call from the app SDK comprising a mobile app ID and certain user data (see step 664). The ID and data are ingested and the user is tagged for "In-Market>Cruises" in MAID123 (see step 667) and the IDs are linked by a corresponding hash link (see step 668). As shown, MAID123 now contains both "Headphones" and "Cruises", and remain linked by hash link 336$_8$. Also HASH123 now contains both "Headphones" and "Cruises" (e.g., the tag for "In-Market>Cruises is stored in the data portions of the nodes for both of the linked IDs).

Figure 6F:
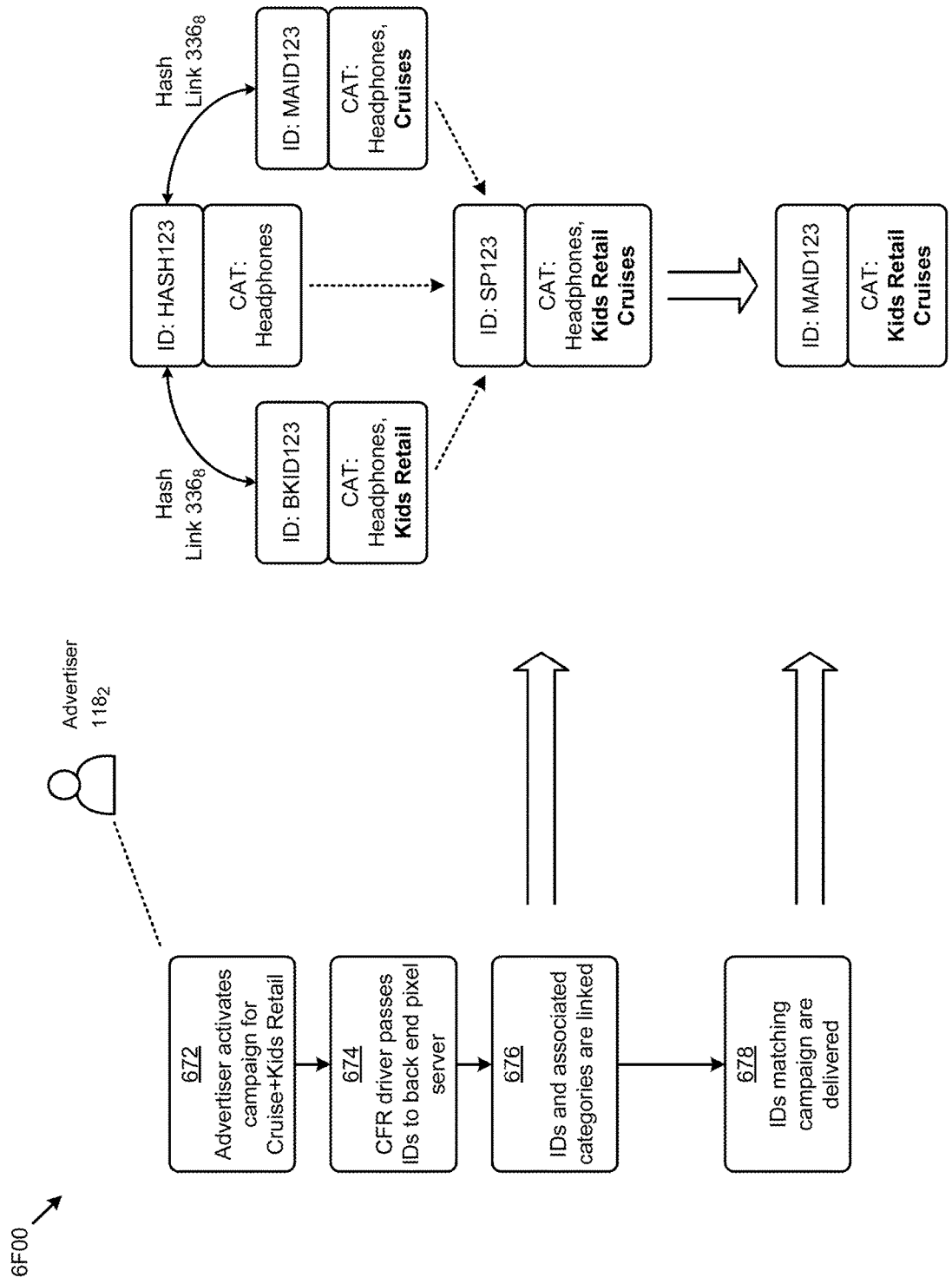
FIG. 6F is a flow diagram showing targeting and delivery examples as used in systems for extending audience reach in messaging campaigns by linking user attribute records, according to an embodiment.

FIG. 6F is a flow diagram 6F00 showing targeting and delivery examples as used in systems for extending audience reach in messaging campaigns by linking user attribute records. As an option, one or more variations of flow diagram 6F00 or any aspect thereof may be implemented in the context of the architecture and functionality of the embodiments described herein. Also, the flow diagram 6F00 or any aspect thereof may be implemented in any environment.

The example shown in flow diagram 6F00 illustrate the herein disclosed techniques for extending audience reach in messaging campaigns by linking user attribute records. Specifically, the user 116$_2$ has shown interest in both "Kids Retail" (see BKID123 in FIG. 6E1) and in "Cruises" (see MAID123 in FIG. 6E2), yet those IDs are not associated. Using the herein disclosed techniques, the IDs can be linked to create a super profile that can be delivered to one or more campaigns, extending the reach of the campaign. More specifically, the flow diagram 6F00 can commence with an advertiser 118$_2$ activating a campaign for "Cruise+Kids Retail" (see step 672), such as the campaign described in FIG. 5B. The activated campaign can be immediately applied to the next batch of IDs issued to the back end pixel server 175 by the ID queuing service 180 and the CFR driver 189 (see step 674). During targeting and delivery operations executed at the back end pixel servers 175, the various IDs and categories associated with the user 116$_2$ can be linked, in part by the ID management service 178, and in part by the back end pixel servers 175 (see step 676). As shown in FIG. 6F, such linking creates the super profile SP123, having categories "Headphones", "Kids Retail", and "Cruises". The IDs matching the campaign configuration can then be delivered to a campaign and/or partner (see step 678). For example, the ID MAID123 with categories "Kids Retail"

and "Cruises" can be delivered to the selected execution partner or partners (e.g., AppNexus) for delivery of certain creative assets.

Determination of a target audience can be extended by varying a threshold value. If a particular probabilistic value of a linkage meets or exceeds a threshold value, then the nodes and respective data are included in the target audience. If a particular probabilistic value of a linkage does not meet the threshold value, then the linked nodes and respective data are not included in the target audience. By varying the threshold value audience reach can be extended.

Additional Embodiments of the Disclosure

Additional Practical Application Examples

Figure 7A:
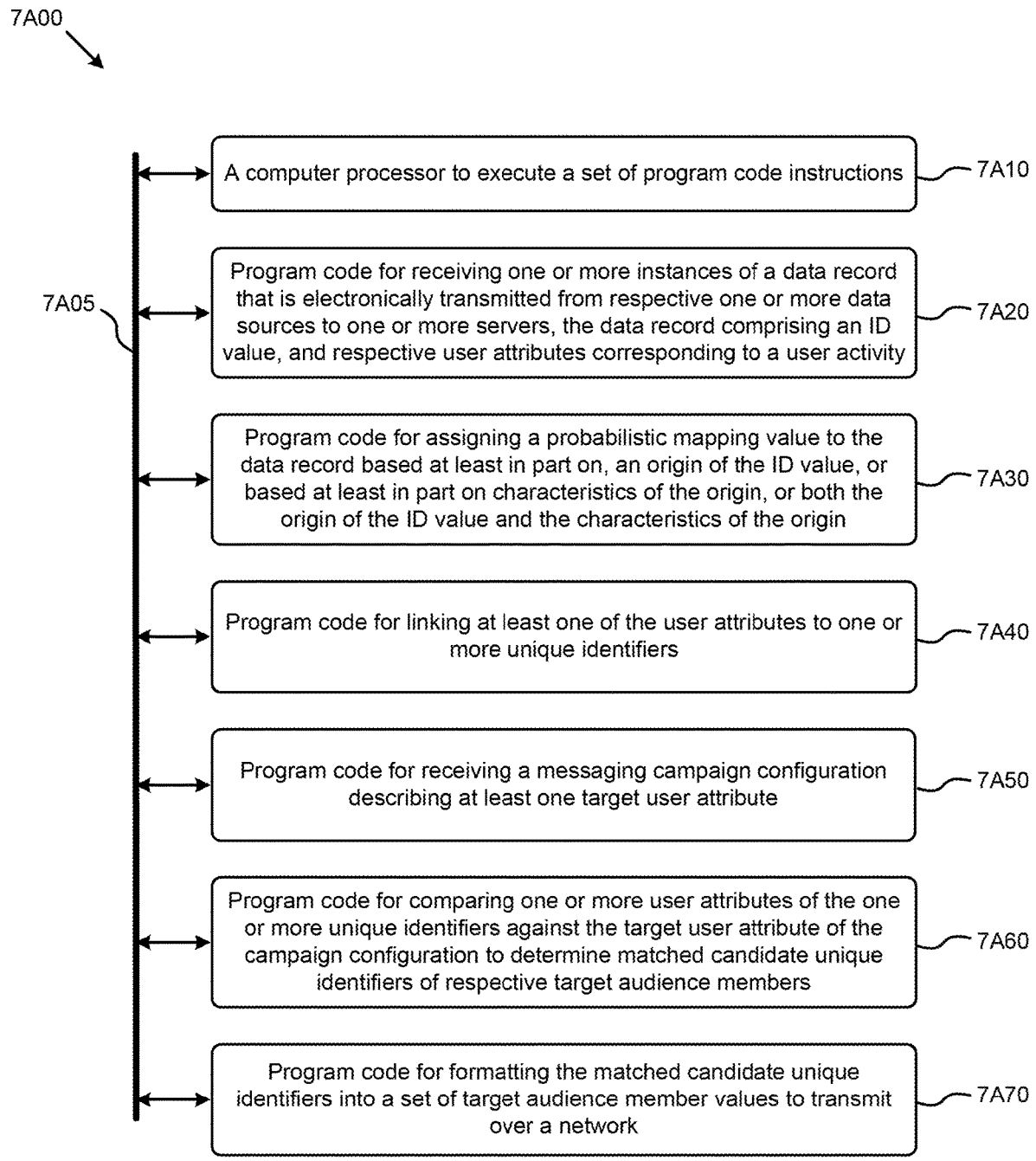
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the present system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for: receiving one or more instances of a data record that is electronically transmitted from respective one or more data sources to one or more servers, the data record comprising an ID value, and respective user attributes corresponding to a user activity (see module 7A20); assigning a probabilistic mapping value to the data record based at least in part on, an origin of the ID value, or based at least in part on characteristics of the origin, or both the origin of the ID value and the characteristics of the origin (see module 7A30); linking at least one of the user attributes to one or more unique identifiers (see module 7A40); receiving a messaging campaign configuration describing at least one target user attribute (see module 7A50); comparing one or more user attributes of the one or more unique identifiers against the target user attribute of the campaign configuration to determine matched candidate unique identifiers of respective target audience members (see module 7A60); and formatting the matched candidate unique identifiers into a set of target audience member values to transmit over a network (see module 7A70).

Figure 7B:
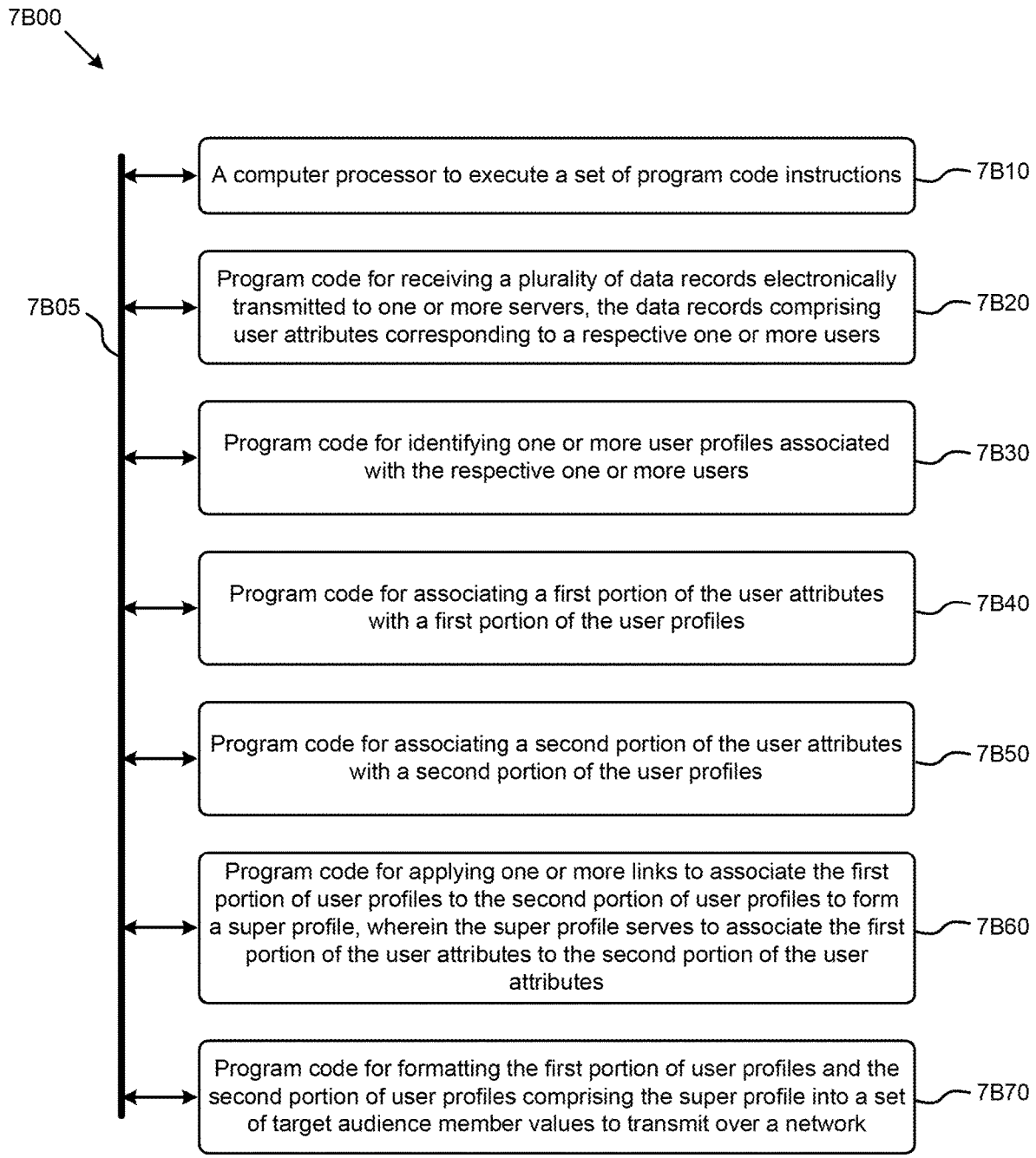

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the present system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising a computer processor to execute a set of program code instructions (see module 7B 10) and modules for: receiving a plurality of data records electronically transmitted to one or more servers, the data records comprising user attributes corresponding to a respective one or more users (see module 7B20); identifying one or more user profiles associated with the respective one or more users (see module 7B30); associating a first portion of the user attributes with a first portion of the user profiles (see module 7B40); associating a second portion of the user attributes with a second portion of the user profiles (see module 7B50); applying one or more links to associate the first portion of user profiles to the second portion of user profiles to form a super profile, wherein the super profile serves to associate the first portion of the user attributes to the second portion of the user attributes (see module 7B60); and formatting the first portion of user profiles and the second portion of user profiles comprising the super profile into a set of target audience member values to transmit over a network (see module 7B70).

System Architecture Overview

Additional System Architecture Examples

Figure 8A:
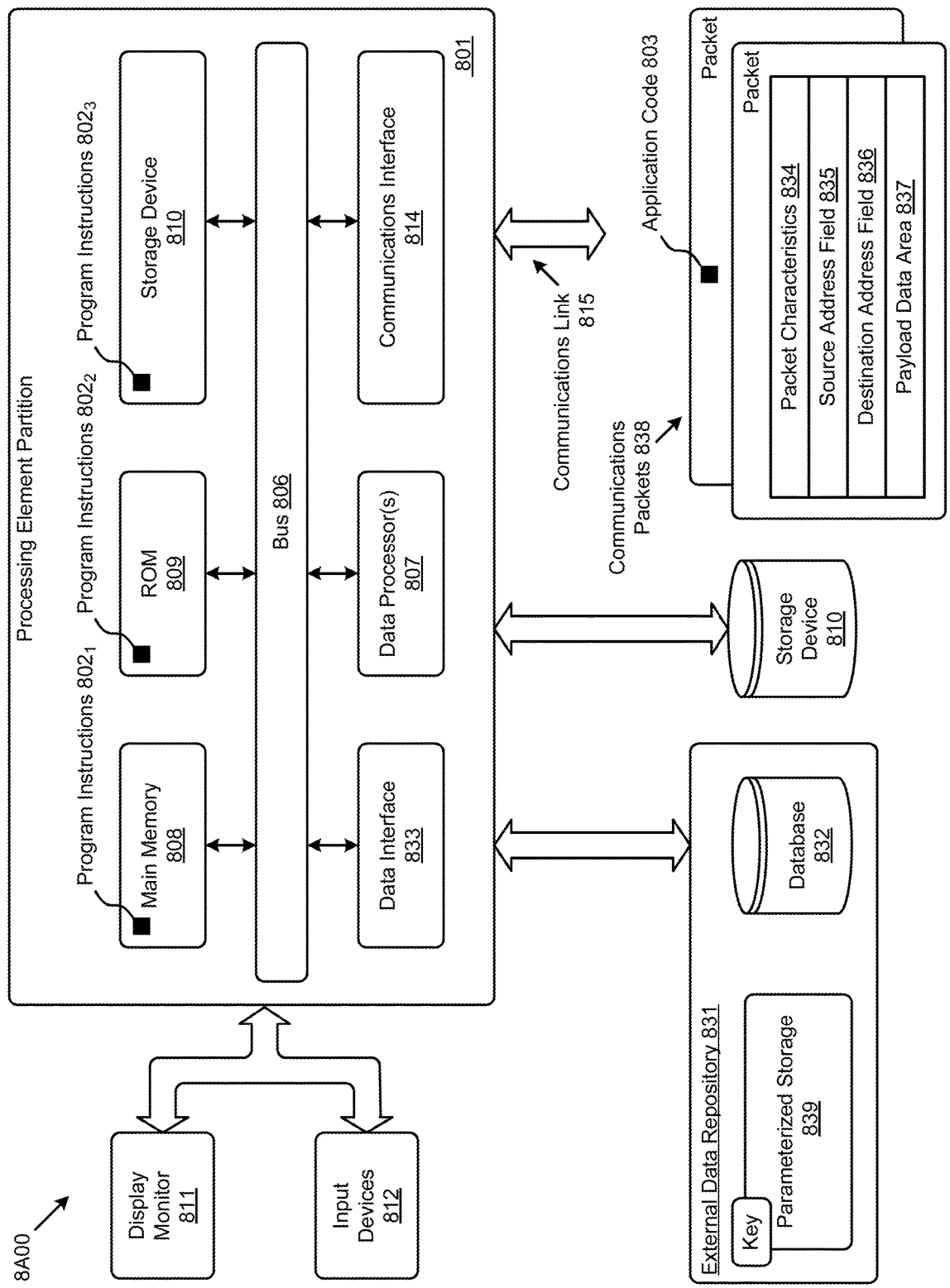
FIG. 8A, FIG. 8B, and FIG. 8C depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., data processor 807), a system memory (e.g., main memory 808, or an area of random access memory (RAM)), a non-volatile storage device or non-volatile storage area (e.g., read-only memory 809), an internal or external storage device 810 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the performance characteristics of systems for extending audience reach in messaging campaigns by linking user attribute records.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of extending audience reach in messaging campaigns by linking user attribute records). Such files or records can be brought into and/or stored in volatile or non-volatile memory.

Figure 8B:
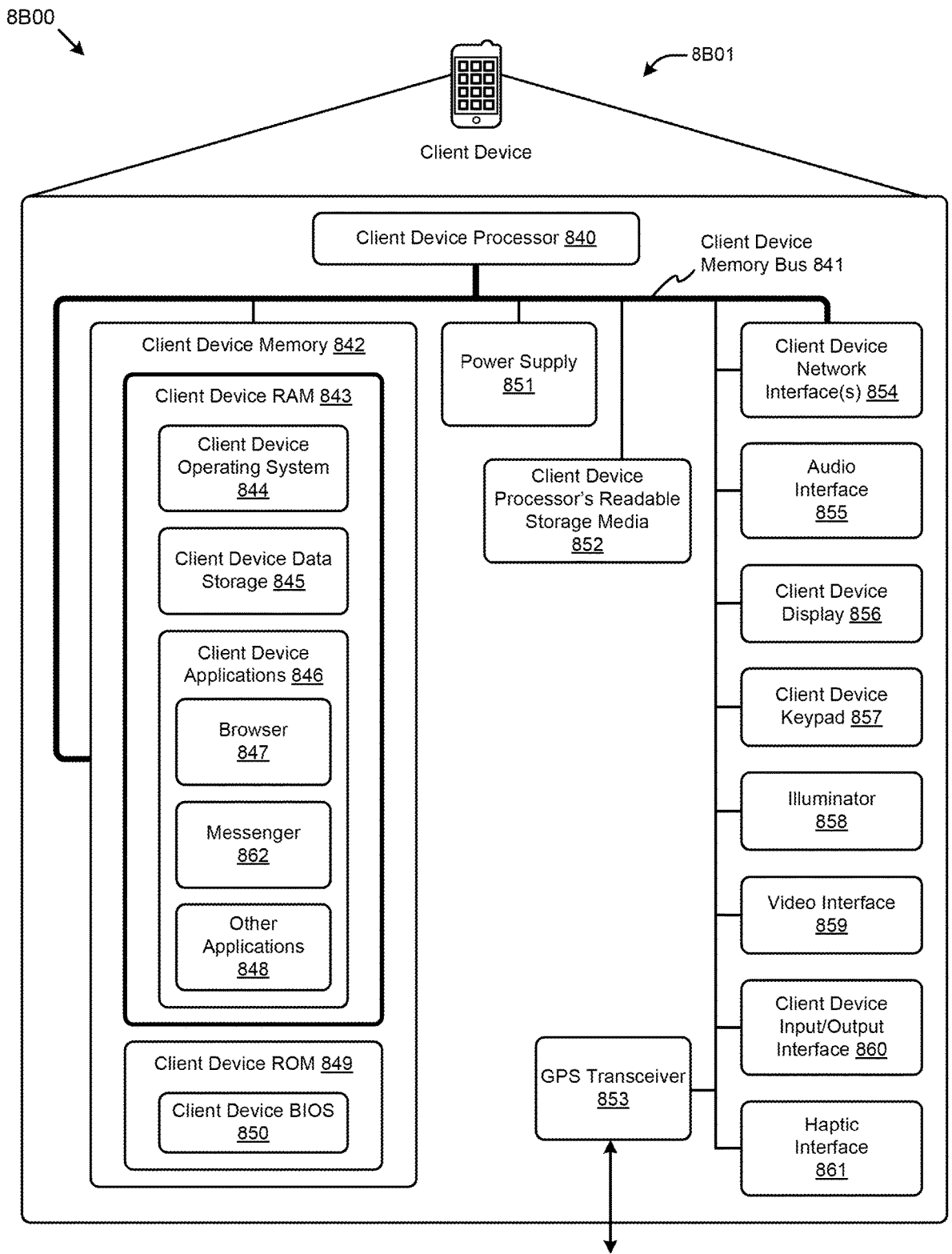

FIG. 8B depicts a block diagram 8B00 of an instance of a client device 8B01 that may be included in a system implementing instances of the herein-disclosed embodiments. Client device 8B01 may include many more or fewer components than those shown in FIG. 8B. Client device 8B01 may represent, for example, an embodiment of at least one of client devices as heretofore disclosed.

As shown in the figure, client device 8B01 includes a client device processor 840 in communication with a client device memory 842 via a client device memory bus 841. Client device 8B01 also includes a power supply 851, one or more client device network interfaces 854, an audio interface 855, a client device display 856, a client device keypad 857, an illuminator 858, a video interface 859, a client device IO interface 860, a haptic interface 861, and a GPS transceiver 853 for global positioning services.

The power supply 851 provides power to client device 8B01. A rechargeable or non-rechargeable battery may be used to provide power. The power may also be provided by an external power source such as an AC adapter or a powered docking cradle that supplements and/or recharges a battery.

A client device 8B01 may optionally communicate with a base station, or directly with another computing device. A client device network interface 854 includes circuitry for coupling a client device 8B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (MC).

An audio interface 855 is arranged to produce and receive audio signals such as the sound of a human voice. For example, audio interface 855 may be coupled to a speaker and microphone to enable telecommunication with others and/or generate an audio acknowledgement for some action.

A client device display 856 may be a liquid crystal display (LCD), gas plasma, light emitting diode (LED), or any other type of display used with a computing device. A client device display 856 may also include a touch sensitive screen arranged to receive input from an object such as a stylus or a digit from a human hand.

A client device keypad 857 may comprise any input device arranged to receive input from a user. For example, client device keypad 857 may include a push button numeric dial, or a keyboard. A client device keypad 857 may also include command buttons that are associated with selecting and sending images.

An illuminator 858 may provide a status indication and/or provide light. Illuminator 858 may remain active for specific periods of time or in response to events. For example, when the illuminator 858 is active, it may backlight the buttons on client device keypad 857 and stay on while the client device is powered. Also, the illuminator 858 may backlight these buttons in various patterns when particular actions are performed such as dialing another client device. An illuminator 858 may also cause light sources positioned within a transparent or translucent case of the client device to illuminate in response to actions.

A video interface 859 is arranged to capture video images such as a still photo, a video segment, an infrared video or the like. For example, the video interface 859 may be coupled to a digital video camera, a web-camera or the like. A video interface 859 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 8B01 comprise a client device IO interface 860 for communicating with external devices such as a headset, or other input or output devices not shown in FIG. 8B. The client device IO interface 860 can use one or more communication technologies such as a USB, infrared, Bluetooth™ port or the like. A haptic interface 861 is arranged to as a human interface device to facilitate interaction with a user of a client device. Such interaction can include tactile feedback to a user of the client device. For example, the haptic interface 861 may be employed to cause vibration of the client device 8B01 in a particular way (e.g., with a pattern or periodicity) and/or when interacting with one or another user.

A GPS transceiver 853 can determine the physical coordinates of client device 8B01 on the surface of the Earth. The GPS transceiver 853, in some embodiments, may be optional. The shown GPS transceiver 853 outputs a location such as a latitude value and a longitude value. However, the GPS transceiver 853 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 8B01 on the surface of the Earth. It is understood that under different conditions, a GPS transceiver 853 can determine a physical location within millimeters for client device 8B01; and in other cases, the determined physical location may be less precise such as within a meter or significantly greater distances. In certain embodiments, the client device 8B01 may provide other information that may be employed to determine a physical location of the device including, for example, a media access control (MAC) address, IP address, IP port identifier, or the like.

The client device memory 842 includes random access memory 843, read-only memory 849, and other computer-readable storage. The client device memory 842 illustrates an example of computer readable storage media (devices) for storage of information such as computer readable instructions, data structures, program modules or other data. The client device memory 842 stores a basic IO system (BIOS) in the embodiment of client device BIOS 850 for controlling low-level operation of client device 8B01. The memory also stores an operating system 844 for controlling the operation of client device 8B01. It will be appreciated that this component may include a general-purpose operating system such as a version of UNIX, or LINUX™, or a specialized client communication operating system such as Microsoft Corporation's Windows Mobile™ Apple Corporation's iOS™, Google Corporation's Android™, or the Symbian® operating system. The operating system may include or interface with a Java virtual machine module that enables control of hardware components and/or operating system operations via Java application programs.

The client device memory 842 further includes one or more instances of client device data storage 845, which can be used by client device 8B01 to store, among other things, client device applications 846 and/or other data. For example, client device data storage 845 may also be employed to store information that describes various capabilities of client device 8B01. The information may then be provided to another device based on any of a variety of events including being sent as part of a header during a communication, sent upon request or the like. Client device data storage 845 may also be employed to store social networking information including address books, buddy lists, aliases, user profile information or the like. Further, client device data storage 845 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 8B01, etc.

An instance of a client device processor's readable storage media 852 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store information and which can be accessed by a computing device. The aforementioned readable storage media may also be referred to herein as computer readable storage media.

The client device applications 846 may include computer executable instructions which, when executed by client device 8B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 846 may include, for example, a messenger 862, a browser 847, and other applications 848. Certain instances of other applications 848 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, the applications may collect and store user data that may be received from other computing devices in the environment.

A messenger 862 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 862 may be configured as an IM application such as AOL (America Online) instant messenger, Yahoo! messenger, .NET messenger server, ICQ or the like. In certain embodiments, the messenger 862 may be configured to include a mail user agent (MUA) such as Elm, Pine, message handling (MH), Outlook, Eudora, Mac Mail, Mozilla Thunderbird or the like. In another embodiment, the messenger 862 may be a client device application that is configured to integrate and employ a variety of messaging protocols including, but not limited, to various push and/or pull mechanisms for client device 8B01. In certain embodiments, the messenger 862 may interact with the browser 847 for managing messages. As used herein, the term "message" refers to any of a variety of messaging formats, or communications form including, but not limited to, email, SMS, IM, MMS, IRC or the like.

A browser 847 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 847 may enable a user of client device 8B01 to communicate with another network device as may be present in the environment.

Figure 8C:
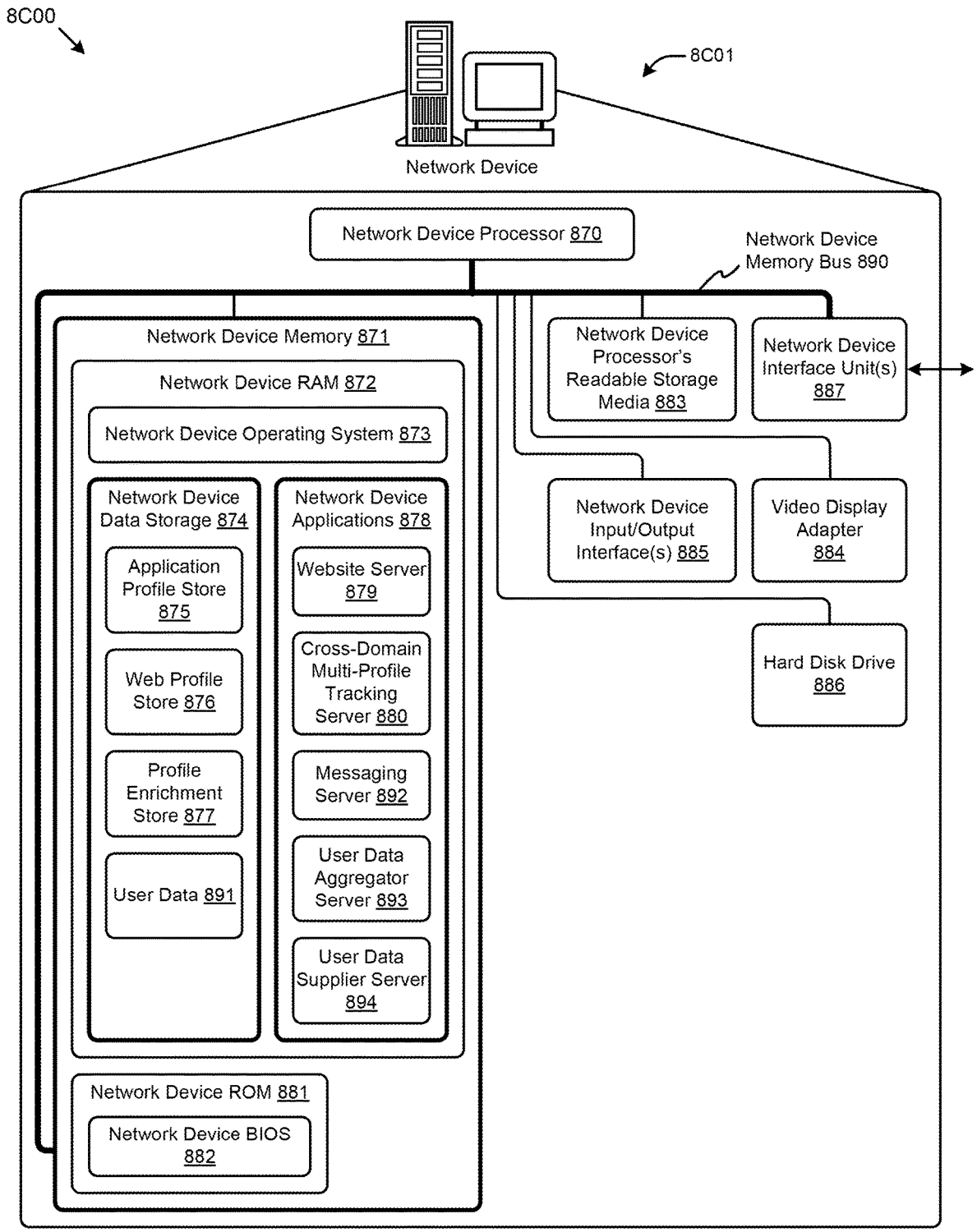

FIG. 8C depicts a block diagram 8C00 of an instance of a network device 8C01 that may be included in a system implementing instances of the herein-disclosed embodiments. Network device 8C01 may include many more or fewer components than those shown. Network device 8C01 may be configured to operate as a server, client, peer, a host, or any other device.

The network device 8C01 includes at least one instance of a network device processor 870, instances of readable storage media, one or more instances of a network interface unit 887, a network device IO interface 885, a hard disk drive 886, a video display adapter 884, and a network device memory 871, all in communication with each other via a network device memory bus 890. The network device memory generally includes network device RAM 872, network device ROM 881. Some embodiments include one or more non-volatile mass storage devices such as a hard disk drive 886, a tape drive, an optical drive, and/or a floppy disk drive. The network device memory stores a network device operating system 873 for controlling the operation of network device 8C01. Any general-purpose operating system may be employed. A basic input/output system (BIOS) is also provided in the form of network device BIOS 882 for controlling the low-level operation of network device 8C01. As illustrated in FIG. 8C, a network device 8C01 also can communicate with the Internet, or some other communications network, via a network interface unit 887, which is constructed for use with various communication protocols including the TCP/IP protocol. A network interface unit 887 is sometimes known as a transceiver, a transceiving device, or a network interface card (MC). Network device 8C01 also comprises a network device IO interface 885 for communicating with external devices such as a keyboard or other input or output devices. A network device IO interface 885 can use one or more communication technologies such as USB, infrared, Bluetooth™ or the like.

The storage devices as described above may use various types of computer readable media, namely tangible forms of non-volatile computer readable storage media and/or a client device processor's readable storage media 852 and/or a network device processor's readable storage media 883. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store information and which can be accessed by a computing device.

As shown, network device data storage 874 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 874 may further include program code, data, algorithms and the like, for use by a processor such as a network device processor 870 to execute and perform actions. In certain embodiments, at least some of the logical contents of network device data storage 874 might be stored on another component of network device 8C01 such as on a second instance of hard disk drive 886 or on an external/removable storage device.

The network device data storage 874 may further store any portions of application data and/or user data such as an application profile store 875, a web profile store 876, a profile enrichment store 877 and/or any user data collected. In some embodiments, user data 891 may store unique user data, non-unique user data, aggregated user data, and/or any combination thereof. User data 891 may include a variety of attributes such as a five digit zip code, an expanded nine digit zip code and the like.

The Network device data storage 874 may also store program code and data. One or more network device applications 878 may be loaded into network device data storage or any other mass memory, to be accessible to run with or as a part of network device operating system 873. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 892, website server 879, user data aggregator server 893, a cross-domain multi-profile tracking server 880, and/or user data supplier server 894 may also be included within or implemented as application programs.

A messaging server 892 may include virtually any computing component or components configured and arranged to forward messages from message user agents and/or other message servers, or to deliver messages to a local message store such as network device data storage 874 or the like. Thus, a messaging server 892 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 892 may also be managed by one or more components of the messaging server 892. Thus, the messaging server 892 may also be configured to manage SMS messages; IM, MMS, IRC, or RSS feeds; mIRC; or any of a variety of other message types. In certain embodiments, the messaging server 892 may enable users to initiate and/or otherwise conduct chat sessions, VOIP sessions or the like.

A website server 879 may represent any of a variety of information and services that are configured to provide content, including messages, over a network to another computing device. Thus, a website server 879 can include, for example, a web server, a file transfer protocol (FTP) server, a database server, a content server or the like. A website server 879 may provide the content including messages over the network using any of a variety of formats including, but not limited to WAP, HDML, WML, SGML, HTML, XML, compact HTML (cHTML), extensible HTML (xHTML) or the like. A website server 879 may also be configured to enable a user of a client device to browse websites, upload user data, view and interact with advertisements or the like.

A user data aggregator server 893 is configured to aggregate user data to be provided to user data buyers for advertising campaigns. In certain embodiments, a user data aggregator server 893 may be configured to receive collected user data from a user data supplier server 894. In some embodiments, a user data aggregator server 893 may receive a query for user data. Based on the query, a user data aggregator server 893 may generate a plurality of subsets of aggregated user data. In some embodiments, user data aggregator server 893 may be included in a network device.

A user data supplier server 894 is configured to collect user data. In certain embodiments, the user data supplier server 894 may be configured to provide the collected user data to user data aggregator server 893. In some embodiments, the user data supplier server 894 may collect and/or provide unique user data and/or non-unique user data. In certain embodiments, the user data supplier server 894 may aggregate the collected user data. In some embodiments, the user data supplier server 894 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online user activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Ingestion

Some embodiments of the present disclosure address the problem of ingesting multiple online user profiles coming from different input sources and some embodiments are directed to approaches for receiving user data into multiple ID spaces, and associating the IDs of two or more disparate sets of online user data for the same online user. More particularly, disclosed herein and in the accompanying figures are exemplary environments, methods, and systems for associating disparate online data collected for the same online user.

With the proliferation of mobile devices (e.g., smartphones, tablets, etc.), the average person now operates multiple devices and/or uses these devices at different times of the day for various online activities (e.g., work, email, web browsing, online shopping, watching TV, watching movies, etc.). These same persons also access the Internet through multiple different portals, and perform different disparate or similar online activities. To improve the effectiveness (e.g., conversion rate, optimized media spend, etc.) of online advertising campaigns (e.g., using behavioral targeting), advertisers have a need to associate a given user with all the data collected from the online activity of that user. The advertiser wants to know the varied interests and habits of that user in order to reach that user with targeted campaigns.

Various approaches for associating disparate online data collected for the same online user are disclosed. For example, one approach considers a primary IDs (PIDs) from cookie-centric environments and associates to secondary IDs (SIDs) as have been received from mobile and/or cookie-less environments. Such environment can include sources such as from mobile advertising IDs (MAIDS) and/or from hashed emails, hashed phone numbers, etc. Unfortunately, a naïve application of such association techniques can have the side effect of decreasing advertising space (e.g., screens). In some cases, this approach defeats support file-to-server or server-to-server communications that could be used to send data against the SIDs. What's needed is the ability to look up data (e.g., user-demographic data) from one or more ID spaces and deliver selected data against a different (yet associated) ID space.

In some embodiments, associating disparate online data collected for the same online user can be implemented by receiving user data from multiple data sources, assigning each set of user data to an ID space, and then forming an association or mapping between the two or more sets of user data. In some embodiments, the sets of user data are associated by linkages. In some embodiments, the sets of user data are associated by a mapped IDs (e.g., using mapping IDs or a user handles). In an embodiment, all of the data included in associated sets of data comprise a super profile. In one embodiment, a subset of data is delivered to various data consumers. It is noted that the mappings link together user data by mapping the ID value of the data record to a different ID value. There may be any number of datasets and ID values that map together in any combination, and thus the statement of a mapping of "a" ID value, "a" ID space, "a" data record", or "a" dataset refers to the mapping of any number of one or more ID values, ID spaces, data records, or datasets.

Figure 9:
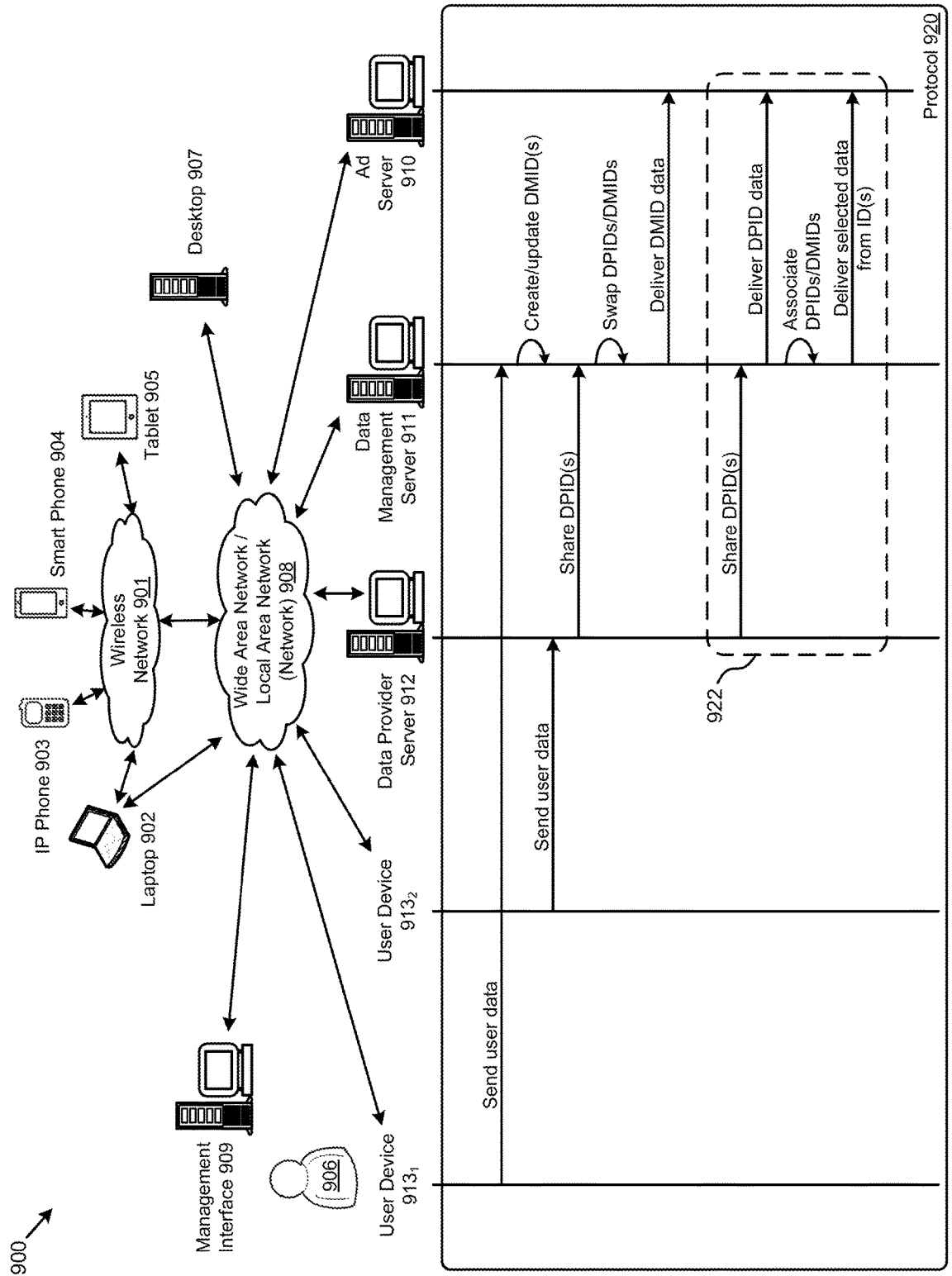
FIG. 9 depicts an environment that supports intersystem communication used when associating disparate online data collected for the same online user, according to one embodiment.

FIG. 9 depicts an environment 900 that supports inter-system communication used when associating disparate online data collected for the same online user. As an option, one or more instances of environment 900 or any aspect thereof may be implemented in the context of the architecture and functionality of the embodiments described herein. Also, environment 900 or any aspect thereof may be implemented in any desired environment.

As shown in FIG. 9, environment 900 comprises one or more instances of data management server 911, one or more instances of data provider server 912, one or more instances of ad server 910, one or more instances of management interface server 909, and a plurality of user devices 913 (e.g., user device $913_1$ and user device $913_2$). The plurality of user devices 913 can represent one of a variety of other devices (e.g., a desktop 907, a laptop 902, an IP phone 903, a smart phone 904, a tablet 905, etc.). The aforementioned servers and devices can communicate through a wireless network and a network 908 (e.g., a wide area network (WAN), a local area network (LAN), etc.). A protocol 920 depicts operations and communications on and among the plurality of user devices 913, data provider server 912, data management server 911, and ad server 910. In the example shown in protocol 920, a single user 906 operates both user device $913_1$ and user device $913_2$. The aforementioned servers and devices in environment 900 are designed and configured to enable user device $913_1$ to send user data (e.g., from user 906 browsing activities on laptop 902) to data management server 911, which can use the data to create or update a profile for user 906 referenced by one or more PIDs (e.g., data management IDs, DMIDs). User device $913_2$ can further send user data (e.g., from user 906 app usage on smart phone 904) to one or more instances of data provider server 912, which can reference the data by one or more SIDs (e.g., data provider IDs, DPIDs), and share the SIDs with data management server 911. Data management server 911 can then swap the DMIDs and DPIDs (e.g., primary and secondary IDs, respectively), allowing transfer of DMID data (e.g., using a cookie from data management server 911) to the ad server 910 based on the DPID. The aforementioned steps illustrate that all data transfers traverse a DMID.

The additional steps 922 of protocol 920 highlight some of the characteristics of the herein-disclosed techniques for associating disparate online data collected for the same online user. Specifically, such techniques allow data provider server 912 to share one or more DPIDs to data management server 911 and for data management server 911 to directly deliver DPID data to ad server 910. In this case, no DMID is required. Further, steps 922 show that data management server 911 can associate (e.g., map) one or more DPIDs to one or more DMIDs. These associations allow data management server 911 to deliver selected data to ad server 910 based on one or more DPIDs or one or more DMIDs. The associations further provide an improved resolution of disparate and fragmented IDs back to a more robust definition of the behaviors (e.g., interests, buying tendencies, etc.) of a single individual. These techniques further provide the ability to manage association confidence (e.g., deterministic, probabilistic, etc.) against audience reach targets.

Figure 10:
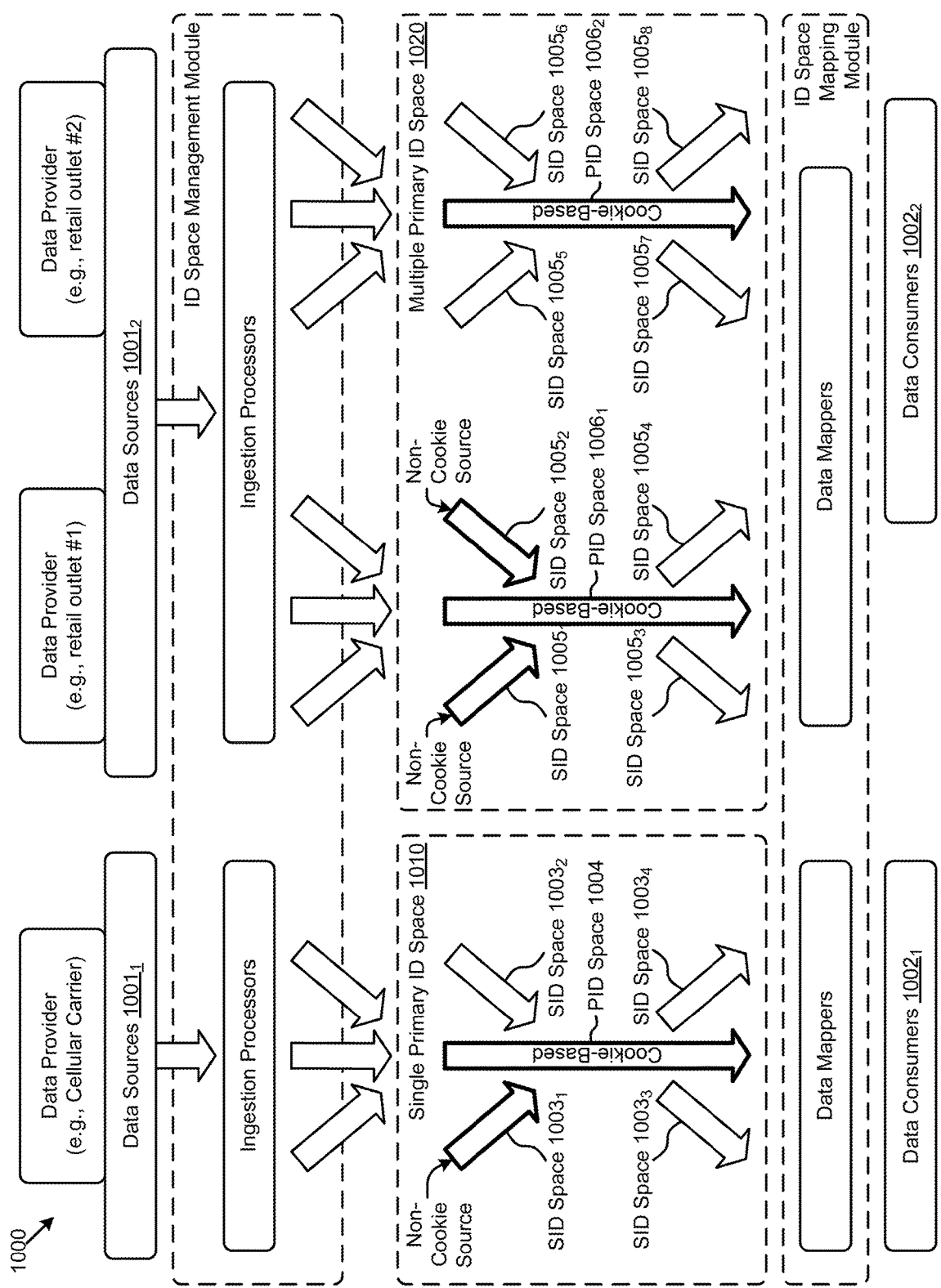
FIG. 10 presents a chart to contrast single ID spaces from multiple ID spaces, according to an embodiment.

FIG. 10 presents a chart 1000 to contrast single ID spaces from multiple ID spaces. As an option, one or more instances of chart 1000 or any aspect thereof may be implemented in the context of the architecture and functionality of the embodiments described herein. Also, chart 1000 or any aspect thereof may be implemented in any desired environment.

Specifically, chart 1000 depicts a single primary ID space 1010 and a multiple primary ID space 1020. In single primary ID space 1010, data from data sources $1001_1$ (e.g., the plurality of user devices 913, data provider server 912, etc.) in SID space $1003_1$, SID space $1003_2$, and PID space 1004 can be delivered to data consumers $1002_1$ (e.g., ad server 910) through PID space 1004, SID space $1003_3$, and SID space $1003_4$. In multiple primary ID space 1020, data from data sources $1001_2$ in SID space $1005_1$, SID space $1005_2$, and PID space $1006_1$ can be delivered to data consumers $1002_2$ through PID space $1006_1$, SID space $1005_3$, and SID space $1005_4$. In multiple primary ID space 1020, however, two or more primary ID spaces are allowed. Specifically shown in chart 1000 is a second primary ID space comprising PID space $1006_2$, SID space $1005_5$, SID space $1005_6$, SID space $1005_7$, and SID space $1005_8$, as shown, additional primary ID spaces are made accessible to ingestion processors and to data mappers. Each ID space has a list of attributes to describe the qualities of the ID space. In one embodiment, for example, ID identifiers (e.g., UIDH, MoPub, BKUUID, etc.) of an ID are a 4-byte subset of the 12-byte profile index. For example, internal IDs (e.g., cookie and statistical IDs from data management server 911) can be assigned to ID subset 0x00, and external IDs UIDH, first-party ID, and MAID can be assigned to ID subset 0x01, 0x02, and 0x03, respectively.

Chart 1000 shows in both single primary ID space 1010 and multiple primary ID space 1020 that PIDs and SIDs from various data sources can be associated together and delivered to various data consumers. Legacy approaches can have multiple primary ID spaces with associated secondary ID spaces, but these primary ID spaces are not connected together. The only way that data can be transferred to multiple PIDs is through similar SIDs associated with those PIDs as shown in multiple ID space 1020. For example, if the same hashed email SID (e.g., in SID space 1005$_2$ and SID space 1005$_5$) is associated with two PIDs (e.g., in PID space 1006$_1$ and PID space 1006$_2$) then data can be ingested from data sources 1001$_2$ (e.g., through an offline match against the hashed email) to both PIDs. The association of PIDs and SIDs is done through an ID swap, page-wise hint (e.g., phint-based) ID swap, an offline match key (e.g., where the match key is the SID), etc. Multiple primary ID space 1020, in conjunction with a system that supports associating disparate online data collected for the same online user, allows for more creative data injection or delivery possibilities (e.g., deliver data based on an SID). Further, the SIDs are associated with the PIDs to provide more extensive data to the data consumers.

Figure 11:
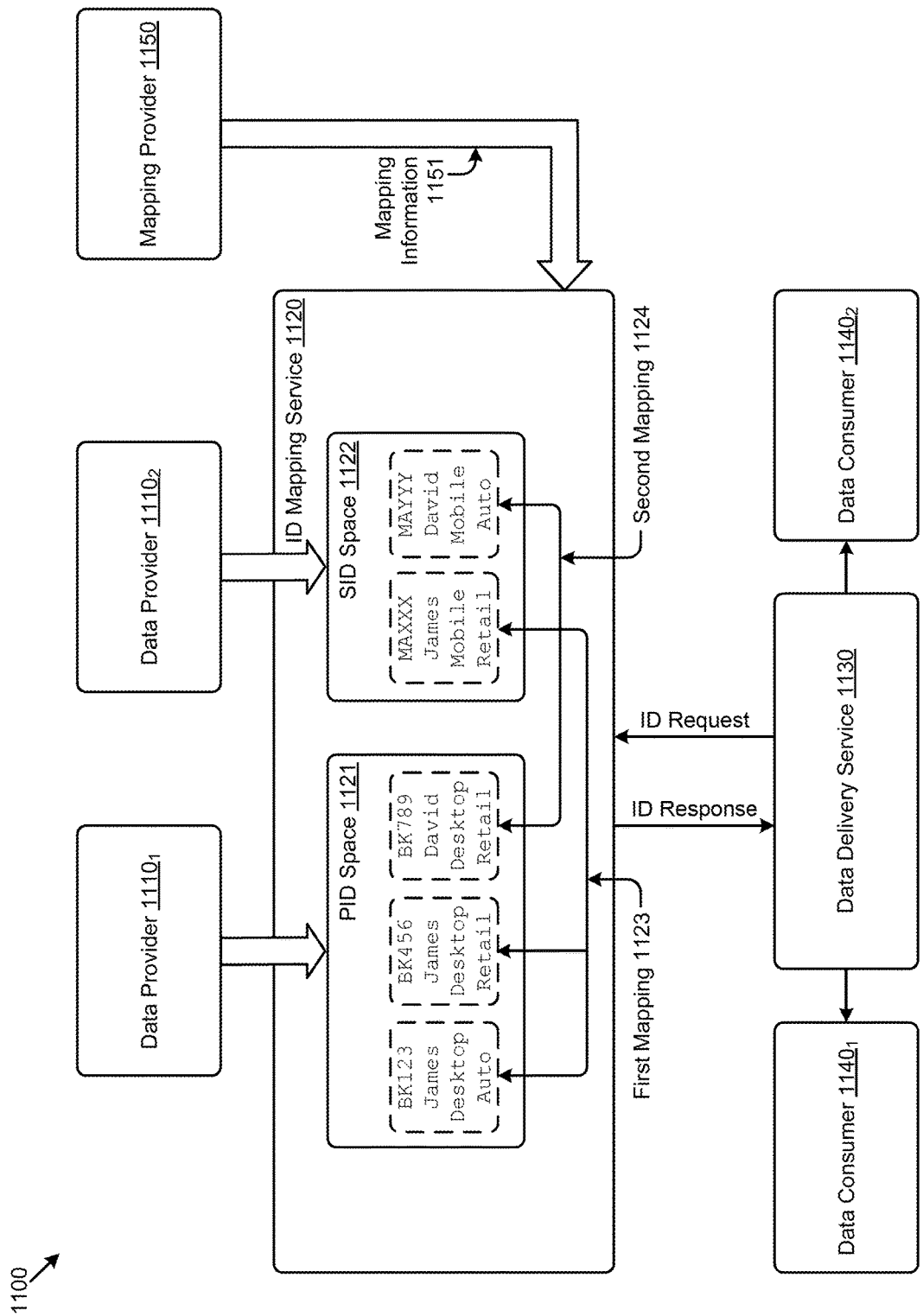
FIG. 11 is a schematic showing how a combined online user profile can be generated by associating disparate online data collected for the same online user, according to one embodiment.

FIG. 11 is a schematic 1100 showing how a combined online user profile can be generated by associating disparate online data collected for the same online user. As an option, one or more instances of schematic 1100 or any aspect thereof may be implemented in the context of the architecture and functionality of the embodiments described herein. Also, the schematic 1100 or any aspect thereof may be implemented in any desired environment.

As shown in FIG. 11, schematic 1100 comprises a plurality of data providers 1110, an ID mapping service 1120, a data delivery service 1130, and a plurality of data consumers 1140. In some embodiments, ID mapping service 1120 can be configured to be part of an ID-as-a-service or IDaaS system. Data provider 1110$_1$ collects and sends user data into a PID space 1121 of ID mapping service 1120, referenced by IDs BK123, BK456, and BK789. Also, data provider 1110$_2$ collects and sends user data into a SID space 1122 of ID mapping service 1120, referenced by IDs MAXXX and MAYYY. ID mapping service 1120 further determines a first mapping 1123 associating IDs BK123, BK456, and MAXXX, and determines a second mapping 1124 associating IDs BK789 and MAYYY. In some embodiments, first mapping 1123 and second mapping 1124 are intended to link user data determined to be from the same user based on various data (e.g., login information, connection IP addresses, Wi-Fi networks used, websites visited, etc.) and methods (e.g., deterministic matching, probabilistic matching, confidence levels, tiers, etc.). In one or more embodiments, a set of mapping information 1151 (e.g., first mapping 1123, second mapping 1124, etc.) can be delivered by one or more instances of a mapping provider 1150. The mapping information 1151 can be ingested by an ID mapping server at various ingestion points (e.g., anywhere data is received) to associate IDs. Various protocols for delivery of the mapping information 1151 can be used, for example by using offline files (e.g. text files), via online HTTP/HTTPS calls, via direct server-to-server calls (e.g., REST service API, user data API, etc.), via mobile application calls, or via browser application calls (e.g., Javascript). When data delivery service 1130 sends an ID request (e.g., based on an ad campaign target audience) to ID mapping service 1120, an ID response is sent from ID mapping service 1120 including, for example, user data against a particular ID. Strictly as one example, a request for ID MAXXX can return the category "in market auto" (e.g., from BK123) since first mapping 1123 associates MAXXX and BK123. In other embodiments, first mapping 1123 and second mapping 1124 can generate "super profiles" of all the user data from the IDs connected by each mapping. Data delivery service 1130 can then deliver the user data to the plurality of data consumers 1140 as needed.

Figure 12:
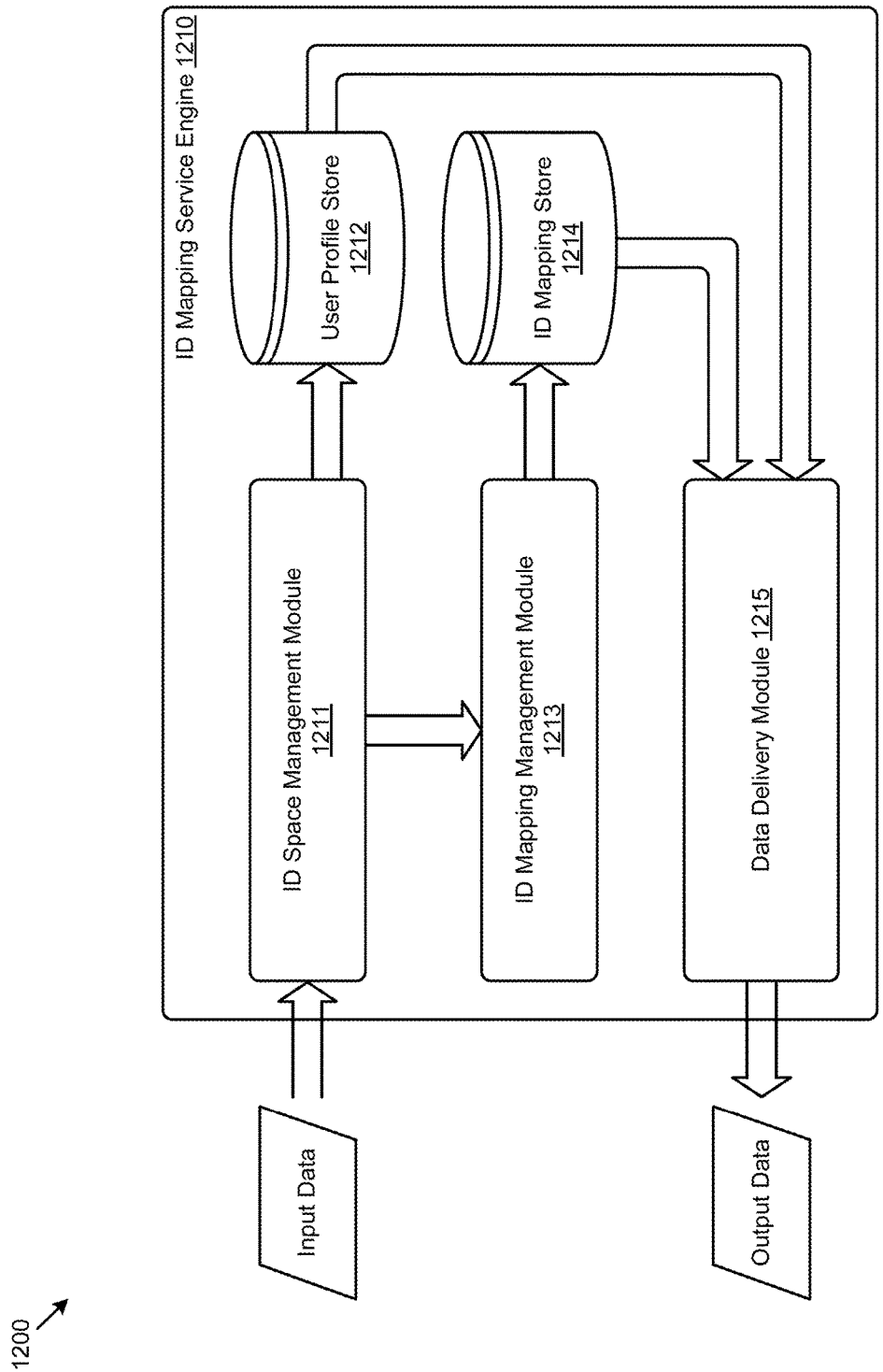
FIG. 12 is a flow through components of a system used to combine online user data, according to some embodiments.

FIG. 12 is a flow 1200 through components of a system used to combine online user data. As an option, one or more instances of flow 1200 or any aspect thereof may be implemented in the context of the architecture and functionality of the embodiments described herein. Also, the flow 1200 or any aspect thereof may be implemented in any desired environment.

FIG. 12 shows input data (e.g., user data, IDs, mapping information, etc.) flowing into an ID mapping service engine 1210 and output data (e.g., user categories, IDs, etc.) being delivered by ID mapping service engine 1210. Specifically, an ID space management module 1211 receives the input data and allocates it to various ID spaces. ID space management module 1211 can also save data to a user profile store 1212 for immediate or future use. An ID mapping management module 1213 will create, modify, delete, and query associations between the IDs in ID space management module 1211, using external mapping information as may be provided, for example, by a partner. ID mapping management module 1213 will store these associations in ID mapping store 1214 as needed. When a request for data is made, a data delivery module 1215 will use the information in ID mapping store 1214 and user profile store 1212 to deliver the needed data to the requestor (e.g., data consumer, ad server, etc.). In some embodiments, the modules comprising ID mapping service engine 1210 can be implemented in a single computing system (e.g., a server), and in other embodiments, the modules comprising ID mapping service engine 1210 can be implemented in multiple computing systems. In some embodiments, other computing systems, modules, devices, can be used to support ID mapping service engine 1210.

The herein-disclosed methods, systems, and computer program products for associating disparate online data collected for the same online user offer several characteristics, according to some embodiments. Specifically, primary ID spaces consisting of public transaction IDs can be created. For example, in the case of direct ingest, MAIDs in an offline file can be received, and these IDs do not tie to any BK cookie ID or BKSID. In order to enable direct data ingest and delivery against these IDs, the MAIDs are enabled as primary ID spaces. MAIDs are considered public transaction IDs because they are used by multiple data providers and buyers and are not specific to a particular partner. Also, primary ID spaces consisting of partner IDs can be created. This is important when partners may want transact directly against their ID space and not have to tie their ID space against a primary ID (e.g., BKSID). For example, partners such as MoPub may ask that ingestion and delivery of data against their MoPub ID be enabled without tying back to a BKSID for accuracy purposes. This can be a requirement for location-based targeting.

A primary ID can have a primary ID time to live, and a secondary ID can have a secondary ID time to live. The time to live (TTL) for each can be independently generated and managed, and a time to live value (e.g., a number of days, a number of weeks, a number of months, etc.) can be ascribed a respective ID. Further, Secondary ID TTLs can override primary IDs. This allows partners such as a cellular phone carrier to lengthen the expiration of BK cookie IDs when their partner IDs (e.g., secondary IDs) are associated or tied to a BK cookie ID. There can be multiple reasons as to why an override feature is needed. For example, if a user's overlap among data providers is low, a single ID swap can expire in one system without the user coming back soon based on an expiration policy. The opportunity to target this user could be lost, even though they were online, but just not seen by one party for a while. In another case, such as a cellular phone carrier, a user may only log in once a month to check their mobile account on desktop, but still be fully online in mobile. The desktop user would be expired if their actions aren't seen according to expiration policies, and this would diminish the chance of targeting this desktop user in mobile via cellular phone carrier O2M.

Workflow

According to some embodiments, workflow for implementing techniques for associating disparate online data collected for the same online user can be as follows. For ID creation, a template is retrieved that includes all of the attributes and places to add values for those attributes. The template can be in form of a simple UI or document. Then, a primary ID can be created by entering all the values for the attributes. Finally, the new primary ID is reviewed. For ID browsing and selection, currently available IDs for editing are obtained. The expectation is that a list of current IDs can be made available so that the ID to edit can be selected. Once selected, the attribute values of an ID can be updated or the ID can be disabled. The format for entry can be in a form of a template as described for ID creation. For permissions setting, the allowed ingestion points of a primary ID space can first be determined. These ingestion points are, for example, online pixel/JS, user data API, and offline file via direct ingest.

Use Cases: Create ID and Update ID Space SLA

UserStory-1.0: Primary ID Space Creation SLA (one week) ((P1)): A data provider and/or data consumer (e.g., external customer, internal customer, customer of audience data, customer of marketing data, etc.) wants a newly requested Primary ID space to be "MVP functional" within one week (7 days) of Engineering beginning work on creating the ID. MVP functional means that it satisfies the ((P1)) user stories in ID space Creation v1.0. When the frequency of creating Primary IDs in Q2 and Q3 is low, the system is tasked primarily on global Primary ID spaces such as hashed PII. In such scenarios, a one week SLA is sufficient.

UserStory-1.1: Update ID Space Attribute SLA (one day) ((P1)): As a data provider and/or data consumer (e.g., external customer, internal customer, of audience data, of marketing data, etc.), I want to be able to update attributes in an already existing ID space (either Primary or Secondary) within one day of Engineering beginning work on updating the attributes. The one day SLA is necessary because the ID space is already functioning and embodiments will need to make sure do not block business processes for an extended length of time. Because the majority of this PRD focuses on Primary ID space creation and attributes, the only secondary ID attributes that implementers want to consider updating is the ID Space Time To Live (which is optional for a secondary ID space).

Use Cases: Create and Update ID Space Requirements

UserStory-2.0: Ability to Create Primary ID Spaces ((P1)): As a data provider and/or data consumer (e.g., external customer, internal customer, customer of audience data, customer of marketing data, etc.), I want the capability to request, through a UI or template, that Engineering create a new Primary ID space that is MVP functional. See Appendix C: Table of ID Attributes. Attributes that are prioritized as (1) are MVP functional requirements for ID Space Creation v1.0. I understand that the Table of ID Attributes reflects an initial scope and the actual attributes are subject to change after Engineering review and design.

UserStory-2.1: ID Key ((P1)): As a data provider and/or data consumer (e.g., external customer, internal customer, customer of audience data, customer of marketing data, etc.), I want the capability to create the default ID key name and have that default ID key name be able to be overridden by site IDs. First, while the capability to create a default ID key name is available to me, I understand that in some cases, Engineering may have a standard way of naming and I will adjust as necessary. Second, the default ID key name must be able to be overridden by site ID. The reason is that partners may already have another key that they are using to pass in data that is the same as the default ID key name and they need the ability to pass in data to both of these keys without conflict. For example, if a partner has a phint that they are already passing in called "IDFA" or "idfa", they should have the capability to override the ID key name of the Apple's mobile advertising "idfa" (assuming that this is the default ID key name that is being used) with any other name. This is enabled per site ID basis.

UserStory-2.2: ID Space Name ((P1)): As a data provider and/or data consumer (e.g., external customer, internal customer, customer of audience data, customer of marketing data, etc.), I want the capability to create or update an ID space name. The ID space name is a metadata field to identify the ID during searches, browsing and updating ID attributes. The ID space name does not need to be more than 256 characters. This metadata field is important when in the future, embodiments want to search or browse ID spaces and embodiments won't be able recognize an ID space by the ID Key. The name give us a short text of what the ID space is for example. Apple's ID for Advertising would be the ID Space Name for IDFA.

UserStory-2.3: ID Space Description ((P1)): A data provider and/or data consumer would want the capability to create or update an ID space description. The ID space description is a metadata field to help describe what the ID is during searches, browsing and updating the ID attributes. The ID space description does not need to be more than 1000 characters. This is a metadata field that adds more detail than the name of the ID. This will be useful in the future when embodiments want to view and edit the profile of an ID space and want more details about what the ID space is. For example, and ID space name might be a cellular phone carrier ID and the description might be something like, "this is <cellular phone carrier>'s partner private ID. Some key attributes are that they want to extend the BK cookie ID for any ID swapped with the cellular phone carrier's ID, etc."

UserStory-2.4: ID Space Time To Live ((P1)): A data provider and/or data consumer would want the capability to create or update an ID space Time to Live. The ID space Time to Live will be a single rule based on the expiration length in days from the last time the ID was last seen online from a tags call or through Direct Ingest (only affects Primary IDs via file or User Data API). The reason embodiments need an ID space TTL is because different IDs may have different expiration properties. For example a UIDH will have an ID space TTL of 10 days or less while an IDFA can have up to 45 days (the maximum today). In one situation, a BKSID has a TTL of 4 days. TTLs for Primary IDs are required while TTLs for Secondary IDs are optional. By default TTLs for Primary IDs will be 45 days. A Primary ID seen online or through a connected Secondary ID, or via Direct Ingest will count as a "user seen" against the TTLs for both the Primary ID and all Secondary IDs connected to the Primary ID.

UserStory-2.5: Continue Legacy and Future Support of Custom Secondary ID Space TTL Override of Primary ID Space TTL ((P1)): A data provider and/or data consumer would want the capability to request that a Primary ID's TTL be overridden by a Secondary ID's TTL. Some embodiments have this particular scenario in production where a cellular phone carrier's ID (NAID) that is ID swapped with a BK Cookie ID will lengthen the TTL of the BK Cookie ID to 45 days. At least one embodiment deploys a separate ID mapping service to continue to support this existing scenario plus additional similar scenarios, such as associating hashed email to BK Cookie ID.

UserStory-2.6: Secondary ID Space Time To Live Override Rules (P2 but must support legacy cellular phone carrier's implementations and future hashed email for match network): UserStory-2.6 is a possible/suggested implementation method for UserStory-2.5. A data provider and/or data consumer would want the capability to flag a Primary ID's TTL as able to be overridden to satisfy the following Time to Live override rules. These rules are: a Primary ID's TTL always takes precedence unless all of the following are true: (1) the Primary ID's TTL has been flagged as able to be overridden; (2) the Secondary ID TTL has been flagged as able to override the Primary ID TTL; and (3) the TTL of the Secondary ID is longer than that of the Primary ID. Once the following three conditions are true, then the Secondary ID TTL will override the Primary ID TTL. One reason that some embodiments configure the ability to flag a Primary ID's TTL as able to be overridden is because in some cases, the Primary ID's TTL should not be affected. An example is the TTL of a Cellular phone carrier's UIDH which are not to be overridden over Secondary IDs. The reason for the ability for Secondary IDs to override the Primary ID's TTL is because some Secondary IDs contain data that need to be preserved longer for targeting purposes such as hashed emails, etc. In other cases, partners such a Cellular phone carrier might want us to lengthen the expiration of a BK cookie ID when data is passed in against their Secondary ID. Because most Secondary ID TTLs will not override the TTL of a Primary ID, therefore, this setting is configurable.

UserStory-2.7: Maximum Length for Opt Out Time To Live ((P1)): A data provider and/or data consumer would want the Opt Out Time to Live to be 20 years. This matches the cookie expiration TTL as is shared by many companies. Because the new Primary IDs are not cookie based data structure keep these IDs opt out within the storage system until someone voluntarily opts back in. Any Secondary IDs connected to a Primary ID that has been opted out will also be opted out with the maximum Opt Out TTL. There has been some discussion as to if the Opt Out TTL needs to be configurable. There are reasons as to why to implement the Opt out TTL to be configurable: (1) save memory/disk space when storing opted out IDs are no longer effective in the system. For example, a UIDH that is opted out technically does not need a TTL that is longer than 7 days because that ID has rotated and is not used anymore. Therefore, keeping a UIDH that has been opted out for 20 years is an unnecessary storage requirement. The same may be true for BKSIDs which currently expire in 4 days. With model changes every quarter, keeping a BKSID opted out for 20 years may also be an unnecessary usage of space; and (2) maximize targeting capability. For example, if there are cases where an ID's stability/existence is clearly known to the end user and advertisers want to enable targeting when that ID's stability/existence is deemed to be invalid.

Use Cases: Disable ID Spaces

UserStory-4.0: Ability to Disable ID Spaces ((P1)): Definition: When an ID space is disabled, it means that all of the IDs in the ID space cannot receive or deliver data. A data provider and/or data consumer would want to be able to disable an ID space. Primary and Secondary ID spaces can be disabled independently, meaning that if I want to disable a Primary ID space, I don't have to disable the Secondary ID space of the same ID. When an ID space is disabled, it means that all of the IDs in the ID space cannot receive or deliver data. The IDs will expire out of the system naturally. For example, if a partner does not want to continue the partnership, the embodiment should have the ability to disable their ID spaces, both Primary and Secondary.

Use Cases: Permissions

UserStory-5.0: Ingestion Points Selection ((P1)): A data provider and/or data consumer would want to be able to create and update Primary ID space ingestion points. These ingestion points are (1) Online (Core JS/Pixel) (2) S2S User Data API, and (3) Direct Ingest—File. Every Primary ID can offline match into its own Primary ID by default. The ability to separately enable these ingestion points is necessary because some scenarios phase in ID spaces based on available functionality. For example, when IDFA is a Primary ID space, a configuration setting should disable the ability for partners to send data against the IDFA as a Primary ID space via Core JS/Pixel until the system is able to ingest data from at least 2 Primary ID spaces. Currently, data coming into Core JS/Pixel tags will be ingested into the BK Cookie or BKSID Primary ID space by default. During the period when the system can only ingest data against a single Primary ID space, then choose either the IDFA ID Space or the BKSID ID Space.

Use Cases: Inventory

UserStory-7.0: Inventory for Primary IDs ((P1)): This scenario makes sure that a Primary ID that is created is either a mobile or desktop audience so that these Primary IDs can be counted in inventory.

Use Cases: Support Requirements

UserStory-10.1: Opt Out of Primary ID: Every Primary ID has the ability to be opted out to protect user privacy. Users must be able to go to a website and either opt out directly from there, link to another site or download an app to opt out. Users may opt out of a Secondary ID which connects to a Primary ID. When a user opts out, the expectation is that they are opt out indefinitely.

UserStory-10.2: End Point Configuration to Accept Selected IDs: Subscriber to Client Services want the capability to determine which IDs can be sent to a particular endpoint. Endpoint partners may not be able to handle some types of IDs such as hashed mobile device IDs. Sending IDs that cannot be used by endpoints would be a waste of resources.

UserStory-10.3: Deliver Only ID Swapped IDs: As a subscriber to Client Services, the subscription provides the capability to configure an endpoint to only receive IDs that have been ID swapped. Endpoint partners may not want to receive IDs that they do not see in their system even if they can accept that ID space. This minimizes sending of IDs that endpoints may not be able to find.

Use Cases: Enhanced Embodiments

This story below relies in part on enable/disable or allow/deny permissions applied to an ID space such as ability to ingest, delivery and the Primary ID spaces that it can associate with.

UserStory-11.1: Enable Secondary IDs for Ingestion and/or for Delivery against Primary ID Space ((P1)): A data provider and/or data consumer would want to be able to create and update the list of Primary ID spaces that can be associated/ID swapped with the selected Secondary ID space. In particular a mechanism permits selection of the following: (1) Secondary ID space enabled for data ingestion for that specific Primary ID; (2) Secondary ID space enabled for data delivery for that specific Primary ID; (3) Both of the above can be selected. By default, without selecting the following, the Secondary ID space is not enabled for a Primary ID space. In some cases we only want a Secondary ID for data ingestion into a Primary ID space but never for data delivery. For example, a data provider can send us their partner ID as a Secondary ID into a Primary ID space but for security reasons and the fact that execution partners do not transact on the data provider's Secondary ID, the system should be configurable to disable the data provider's IDs from being delivered.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A computer-implemented method comprising:
   receiving, at a data management server, a set of communications from a user device in a cookie-centric environment;
   extracting, at the data management server, a first set of user attributes from the set of communications;
   determining, at the data management server and using one or more cookies associated with the set of communications, that each of the first set of user attributes correspond to a same user;
   generating a primary-ID-space data set that includes a primary ID and the first set of user attributes;
   storing the primary-ID-space data set at a data store;
   receiving a secondary-ID-space data set that includes a secondary ID and a second set of user attributes having been collected at a cookie-less environment or at a mobile environment;
   identifying one or more attributes that are represented in each of the first set of user attributes and the second set of user attributes;
   identifying one or more attribute types, each of the one or more attribute types identifying a type of an attribute of the one or more attributes;
   executing a set of function calls to access mapping information, the mapping information indicating that a subset of the first set of user attributes and a subset of the second set of user attributes correspond to the same user based on the one or more attributes that are represented in each of the first set of user attributes and the second set of user attributes and the one or more attribute types;
   generating a mapping between the primary-ID-space data set and the secondary-ID-space data set using the mapping information, wherein generating the mapping includes generating a probabilistic link between the primary-ID-space data set with the secondary-ID-space data set;
   receiving, from a client device, a query that includes the primary ID;
   generating, as a result of the mapping, a query response based on at least one of the second set of user attributes; and
   transmitting, to the client device, the query response, wherein the client device is configured to use the query response to select and transmit a same content to a particular user device associated with the primary-ID-space data set and to at least one other user device associated with the secondary-ID-space data set in response to receiving an ad tag from the respective user device.

2. The method of claim 1:
   wherein the primary-ID-space data set has a primary ID time-to-live (TTL) that indicates a first time period after which the primary-ID-space data set is to expire;
   wherein the secondary-ID-space data set has a secondary ID TTL that indicates a second time period after which the secondary-ID-space data set is to expire; and
   wherein the method further comprises: in response determining that the primary-ID-space data set is to be mapped to the secondary-ID-space data set:
   determining that the secondary ID TTL is longer than the primary ID TTL; and
   overriding the primary ID TTL with the secondary ID TTL, such that the primary-ID-space data set is configured to expire upon an elapsing of the second time period.

3. The method of claim 1, wherein at least one of the set of communications includes a tag call that was generated using a webpage pixel or JavaScript configured to automatically collect predefined types of data and to transmit the collected data.

4. The method of claim 1, wherein the second set of user attributes was collected by:
   associating each of a second set of communications with a same mobile device, same email address or same phone number; and
   extracting each of the second set of user attributes from the second set of communications.

5. The method of claim 1, further comprising:
   receiving another primary-ID-space data set that includes another primary ID and a third set of user attributes, the third set of user attributes having been collected at another cookie-centric environment;
   identifying at least one shared attribute that is represented in the third set of user attributes and at least one of the first set of user attributes and the second set of user attributes;
   determining that the other primary-ID-space data set is to be mapped to each of the primary-ID-space data set and the secondary-ID-space data set based on a type of the at least one shared attribute;
   generating one or more other mappings between the other primary-ID-space data set and the primary-ID-space data set and the secondary-ID-space data set;
   wherein the query response further includes at least one of the third set of user attributes.

6. The method of claim 1, wherein determining that the primary-ID-space data set is to be mapped to the secondary-ID-space data set includes:
   performing a deterministic-matching or probabilistic-matching technique to generate a match-strength value; and
   determining that the match-strength value exceeds a predefined threshold.

7. The method of claim 1, further comprising:
determining that the secondary-ID-space data set is to be enabled to avail the second set of user attributes to be accessible via query but not enabled to deliver any of the second set of user attributes within a query response, wherein the query response does not include the second set of user attributes.

8. A computer-program product tangibly embodied in a non-transitory machine-readable storage medium, including instructions configured to cause one or more data processors to perform actions including:
receiving a set of communications from a user device in a cookie-centric environment;
extracting a first set of user attributes from the set of communications;
determining, using one or more cookies associated with the set of communications, that each of the first set of user attributes correspond to a same user;
generating a primary-ID-space data set that includes a primary ID and the first set of user attributes;
storing the primary-ID-space data set at a data store;
receiving a secondary-ID-space data set that includes a secondary ID and a second set of user attributes having been collected at a cookie-less environment or at a mobile environment;
identifying one or more attributes that are represented in each of the first set of user attributes and the second set of user attributes;
identifying one or more attribute types, each of the one or more attribute types identifying a type of an attribute of the one or more attributes;
executing a set of function calls to access mapping information, the mapping information indicating that a subset of the first set of user attributes and a subset of the second set of user attributes correspond to the same user based on the one or more attributes that are represented in each of the first set of user attributes and the second set of user attributes and the one or more attribute types;
generating a mapping between the primary-ID-space data set and the secondary-ID-space data set using the mapping information, wherein generating the mapping includes generating a probabilistic link between the primary-ID-space data set with the secondary-ID-space data set;
receiving, from a client device, a query that includes the primary ID;
generating, as a result of the mapping, a query response based on at least one of the second set of user attributes; and
transmitting, to the client device, the query response, wherein the client device is configured to use the query response to select and transmit a same content to a particular user device associated with the primary-ID-space data set and to at least one other user device associated with the secondary-ID-space data set in response to receiving an ad tag from the respective user device.

9. The computer-program product of claim 8:
wherein the primary-ID-space data set has a primary ID time-to-live (TTL) that indicates a first time period after which the primary-ID-space data set is to expire;
wherein the secondary-ID-space data set has a secondary ID TTL that indicates a second time period after which the secondary-ID-space data set is to expire; and
wherein the actions further include, in response determining that the primary-ID-space data set is to be mapped to the secondary-ID-space data set:
determining that the secondary ID TTL is longer than the primary ID TTL; and
overriding the primary ID TTL with the secondary ID TTL, such that the primary-ID-space data set is configured to expire upon an elapsing of the second time period.

10. The computer-program product of claim 8, wherein at least one of the set of communications includes a tag call that was generated using a webpage pixel or JavaScript configured to automatically collect predefined types of data and to transmit the collected data.

11. The computer-program product of claim 8, wherein the second set of user attributes was collected by:
associating each of a second set of communications with a same mobile device, same email address or same phone number; and
extracting each of the second set of user attributes from the second set of communications.

12. The computer-program product of claim 8, wherein the actions further include:
receiving another primary-ID-space data set that includes another primary ID and a third set of user attributes, the third set of user attributes having been collected at another cookie-centric environment;
identifying at least one shared attribute that is represented in the third set of user attributes and at least one of the first set of user attributes and the second set of user attributes;
determining that the other primary-ID-space data set is to be mapped to each of the primary-ID-space data set and the secondary-ID-space data set based on a type of the at least one shared attribute;
generating one or more other mappings between the other primary-ID-space data set and the primary-ID-space data set and the secondary-ID-space data set;
wherein the query response further includes at least one of the third set of user attributes.

13. The computer-program product of claim 8, wherein determining that the primary-ID-space data set is to be mapped to the secondary-ID-space data set includes:
performing a deterministic-matching or probabilistic-matching technique to generate a match-strength value; and
determining that the match-strength value exceeds a predefined threshold.

14. The computer-program product of claim 8, wherein the actions further include:
determining that the secondary-ID-space data set is to be enabled to avail the second set of user attributes to be accessible via query but not enabled to deliver any of the second set of user attributes within a query response, wherein the query response does not include the second set of user attributes.

15. A system comprising:
one or more data processors; and
a non-transitory computer readable storage medium containing instructions which when executed on the one or more data processors, cause the one or more data processors to perform actions including:
receiving a set of communications from a user device in a cookie-centric environment;
extracting a first set of user attributes from the set of communications;

determining, using one or more cookies associated with the set of communications, that each of the first set of user attributes correspond to a same user;

generating a primary-ID-space data set that includes a primary ID and the first set of user attributes;

storing the primary-ID-space data set at a data store;

receiving a secondary-ID-space data set that includes a secondary ID and a second set of user attributes having been collected at a cookie-less environment or at a mobile environment;

identifying one or more attributes that are represented in each of the first set of user attributes and the second set of user attributes;

identifying one or more attribute types, each of the one or more attribute types identifying a type of an attribute of the one or more attributes;

executing a set of function calls to access mapping information, the mapping information indicating that a subset of the first set of user attributes and a subset of the second set of user attributes correspond to the same user based on the one or more attributes that are represented in each of the first set of user attributes and the second set of user attributes and the one or more attribute types;

generating a mapping between the primary-ID-space data set and the secondary-ID-space data set using the mapping information, wherein generating the mapping includes generating a probabilistic link between the primary-ID-space data set with the secondary-ID-space data set;

receiving, from a client device, a query that includes the primary ID;

generating, as a result of the mapping, a query response based on at least one of the second set of user attributes; and transmitting, to the client device, the query response, wherein the client device is configured to use the query response to select and transmit a same content to a particular user device associated with the primary-ID-space data set and to at least one other user device associated with the secondary-ID-space data set in response to receiving an ad tag from the respective user device.

16. The system of claim 15:

wherein the primary-ID-space data set has a primary ID time-to-live (TTL) that indicates a first time period after which the primary-ID-space data set is to expire;

wherein the secondary-ID-space data set has a secondary ID TTL that indicates a second time period after which the secondary-ID-space data set is to expire; and wherein the actions further include, in response determining that the primary-ID-space data set is to be mapped to the secondary-ID-space data set:

determining that the secondary ID TTL is longer than the primary ID TTL; and overriding the primary ID TTL with the secondary ID TTL, such that the primary-ID-space data set is configured to expire upon an elapsing of the second time period.

17. The system of claim 15, wherein at least one of the set of communications includes a tag call that was generated using a webpage pixel or JavaScript configured to automatically collect predefined types of data and to transmit the collected data.

18. The system of claim 15, wherein the second set of user attributes was collected by:

associating each of a second set of communications with a same mobile device, same email address or same phone number; and extracting each of the second set of user attributes from the second set of communications.

19. The system of claim 15, wherein the actions further include:

receiving another primary-ID-space data set that includes another primary ID and a third set of user attributes, the third set of user attributes having been collected at another cookie-centric environment;

identifying at least one shared attribute that is represented in the third set of user attributes and at least one of the first set of user attributes and the second set of user attributes;

determining that the other primary-ID-space data set is to be mapped to each of the primary-ID-space data set and the secondary-ID-space data set based on a type of the at least one shared attribute;

generating one or more other mappings between the other primary-ID-space data set and the primary-ID-space data set and the secondary-ID-space data set;

wherein the query response further includes at least one of the third set of user attributes.

20. The system of claim 15, wherein determining that the primary-ID-space data set is to be mapped to the secondary-ID-space data set includes:

performing a deterministic-matching or probabilistic-matching technique to generate a match-strength value; and determining that the match-strength value exceeds a predefined threshold.

* * * * *

UNITED STATES PATENT AND TRADEMARK OFFICE
CERTIFICATE OF CORRECTION

PATENT NO. : 10,572,903 B2
APPLICATION NO. : 14/995755
DATED : February 25, 2020
INVENTOR(S) : Wiener et al.

It is certified that error appears in the above-identified patent and that said Letters Patent is hereby corrected as shown below:

In the Specification

In Column 1, Line 21, delete ""EXPENDING" and insert -- "EXTENDING --, therefor.

In Column 1, Line 24, after "entirety" insert -- . --.

In Column 6, Line 62, after "158" insert -- . --.

In Column 6, Line 66, delete "1 C00" and insert -- 1C00 --, therefor.

In Column 7, Line 1, delete "1 C00" and insert -- 1C00 --, therefor.

In Column 8, Line 27, delete "HTML," and insert -- HTML --, therefor.

In Column 8, Line 46, delete "HTML," and insert -- HTML --, therefor.

In Column 9, Line 19, delete "HTML," and insert -- HTML --, therefor.

In Column 16, Line 41, delete "that that" and insert -- that --, therefor.

In Column 26, Line 19, delete "7B 10)" and insert -- 7B10) --, therefor.

In Column 37, Line 10, delete "(MAIDS)" and insert -- (MAIDs) --, therefor.

In Column 41, Line 33, delete "((P1)):" and insert -- (P1): --, therefor.

In Column 41, Line 39, delete "((P1))" and insert -- (P1) --, therefor.

In Column 41, Line 45, delete "((P1)):" and insert -- (P1): --, therefor.

Signed and Sealed this
Third Day of November, 2020

Andrei Iancu
*Director of the United States Patent and Trademark Office*

CERTIFICATE OF CORRECTION (continued)
U.S. Pat. No. 10,572,903 B2

In Column 41, Line 60, delete "((P1)):" and insert -- (P1): --, therefor.

In Column 42, Line 3, delete "((P1)):" and insert -- (P1): --, therefor.

In Column 42, Line 22, delete "((P1)):" and insert -- (P1): --, therefor.

In Column 42, Line 35, delete "((P1)):" and insert -- (P1): --, therefor.

In Column 42, Line 50, delete "((P1)):" and insert -- (P1): --, therefor.

In Column 43, Line 3, delete "((P1)):" and insert -- (P1): --, therefor.

In Column 43, Line 44, delete "((P1)):" and insert -- (P1): --, therefor.

In Column 44, Line 2, delete "((P1)):" and insert -- (P1): --, therefor.

In Column 44, Line 15, delete "((P1)):" and insert -- (P1): --, therefor.

In Column 44, Line 34, delete "((P1)):" and insert -- (P1): --, therefor.

In Column 44, Line 66, delete "((P1)):" and insert -- (P1): --, therefor.